(12) United States Patent
Motohashi

(10) Patent No.: US 12,511,853 B2
(45) Date of Patent: Dec. 30, 2025

(54) THREE-DIMENSIONAL SHAPE PROCESSING APPARATUS, THREE-DIMENSIONAL SHAPE PROCESSING SYSTEM, METHOD FOR CORRECTING THREE-DIMENSIONAL SHAPE INFORMATION, AND NON-TRANSITORY RECORDING MEDIUM

(71) Applicant: Naoki Motohashi, Kanagawa (JP)

(72) Inventor: Naoki Motohashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 140 days.

(21) Appl. No.: 18/444,158

(22) Filed: Feb. 16, 2024

(65) Prior Publication Data

US 2024/0320941 A1 Sep. 26, 2024

(30) Foreign Application Priority Data

Mar. 23, 2023 (JP) ................................. 2023-046127

(51) Int. Cl.
*G06T 19/20* (2011.01)

(52) U.S. Cl.
CPC .......... *G06T 19/20* (2013.01); *G06T 2200/24* (2013.01); *G06T 2219/2021* (2013.01)

(58) Field of Classification Search
CPC ...................................................... G06T 19/20
See application file for complete search history.

(56) References Cited

U.S. PATENT DOCUMENTS

| | | | |
|---|---|---|---|
| 2016/0232259 A1* | 8/2016 | Williams | G06F 30/00 |
| 2020/0320727 A1* | 10/2020 | Smolic | G06T 15/08 |
| 2023/0222729 A1 | 7/2023 | Motohashi | |
| 2023/0222730 A1 | 7/2023 | Motohashi et al. | |
| 2023/0377300 A1* | 11/2023 | Becker | H04N 5/265 |

FOREIGN PATENT DOCUMENTS

| | | |
|---|---|---|
| JP | 2017-211824 A | 11/2017 |
| JP | 2020-197979 A | 12/2020 |

* cited by examiner

*Primary Examiner* — Shivang I Patel
(74) *Attorney, Agent, or Firm* — Harness, Dickey & Pierce, P.L.C.

(57) ABSTRACT

A three-dimensional shape processing apparatus includes circuitry to selectively execute one of first correction processing and second correction processing designated by an instruction operation on an instruction-receiving display component. In the first correction processing, correction of three-dimensional shape information is executed based on an input operation. In the second correction processing, the correction of the three-dimensional shape information is executed based on stored processing pre-stored in a memory.

20 Claims, 32 Drawing Sheets

FIG. 5

| USER ID | TABLE FOR PROCESSING | | | POINT-CLOUD DATA |
|---|---|---|---|---|
| 1 | EXECUTION SEQUENCE | PROCESSING | MODE | XXXXXX |
| | 2 | NOISE REMOVAL | AUTOMATIC | XXXXXX |
| | 1 | REGISTRATION | MANUAL | XXXXXX |
| | 3 | SEGMENTATION | MIXED MODE | |
| | 4 | MODELING | AUTOMATIC | |
| 2 | EXECUTION SEQUENCE | PROCESSING | MODE | XXXXXX |
| | 1 | NOISE REMOVAL | MANUAL | XXXXXX |
| | 3 | SEGMENTATION | AUTOMATIC | XXXXXX |
| | 4 | MODELING | MANUAL | |
| | 2 | REGISTRATION | MIXED MODE | |

FIG. 6

| USER ID | TABLE FOR PROCESSING ||| 3D SHAPE INFORMATION |
|---|---|---|---|---|
| 1 | EXECUTION SEQUENCE | PROCESSING | MODE | XXXXXX <br> XXXXXX <br> XXXXXX |
|  | 2 | ADDITION | AUTOMATIC | |
|  | 1 | RESIZE | MANUAL | |
|  | 3 | MOVE | MIXED MODE | |
|  | 4 | DELETION | AUTOMATIC | |
|  | 5 | ALIGNMENT | AUTOMATIC | |
|  | 6 | UNIFICATION | MANUAL | |
|  | 7 | SEPARATION | MIXED MODE | |
| 2 | EXECUTION SEQUENCE | PROCESSING | MODE | XXXXXX <br> XXXXXX <br> XXXXXX |
|  | 1 | ADDITION | MANUAL | |
|  | 3 | RESIZE | AUTOMATIC | |
|  | 4 | MOVE | MANUAL | |
|  | 2 | DELETION | MIXED MODE | |
|  | 5 | ALIGNMENT | AUTOMATIC | |
|  | 7 | UNIFICATION | MANUAL | |
|  | 6 | SEPARATION | MIXED MODE | |

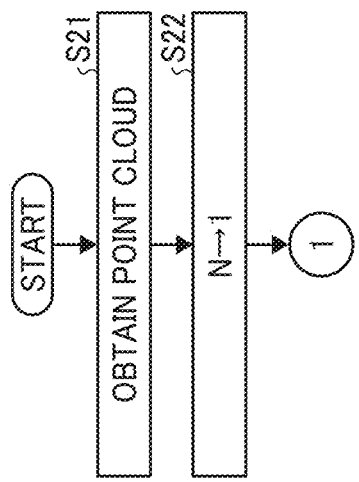

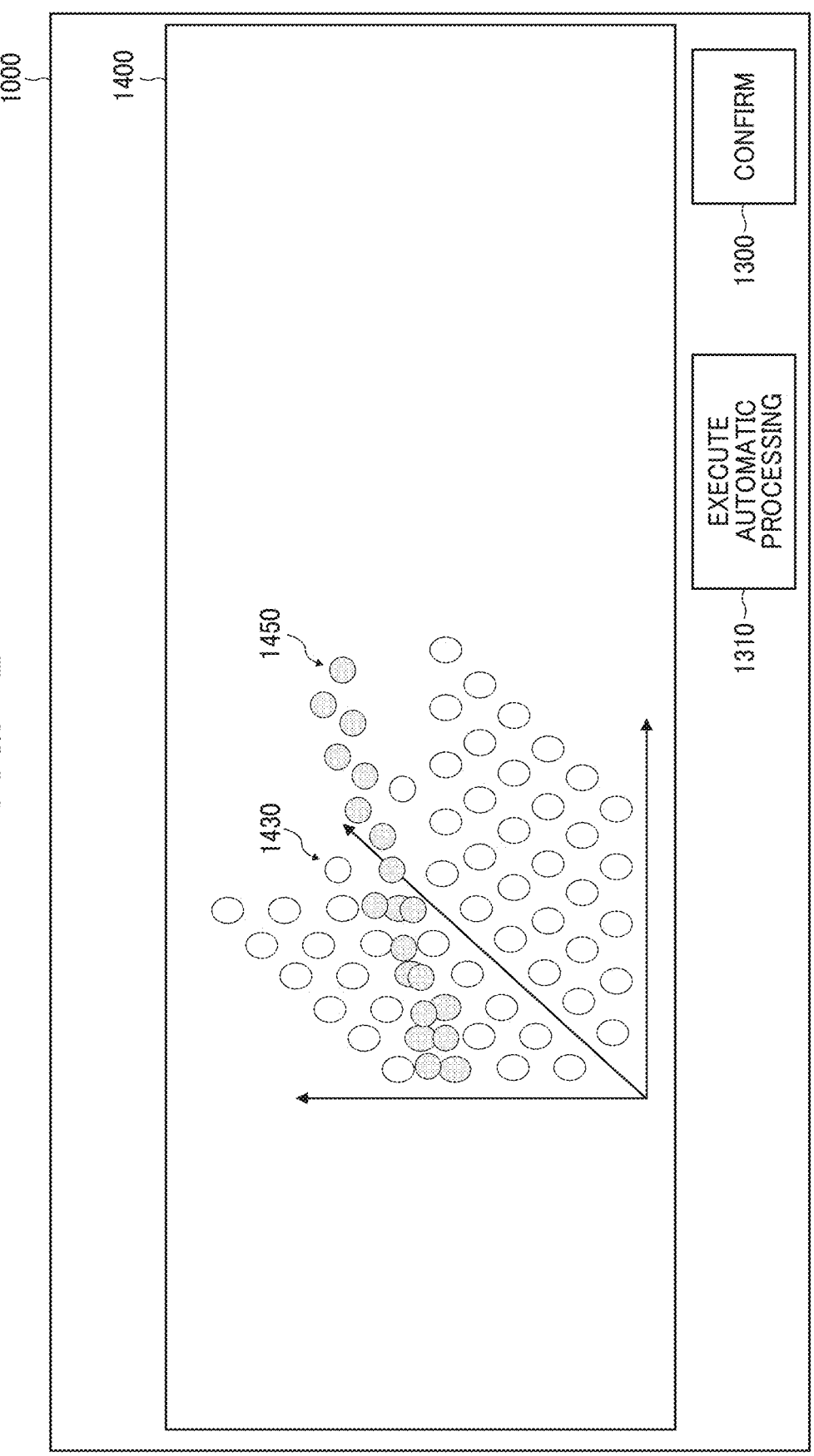

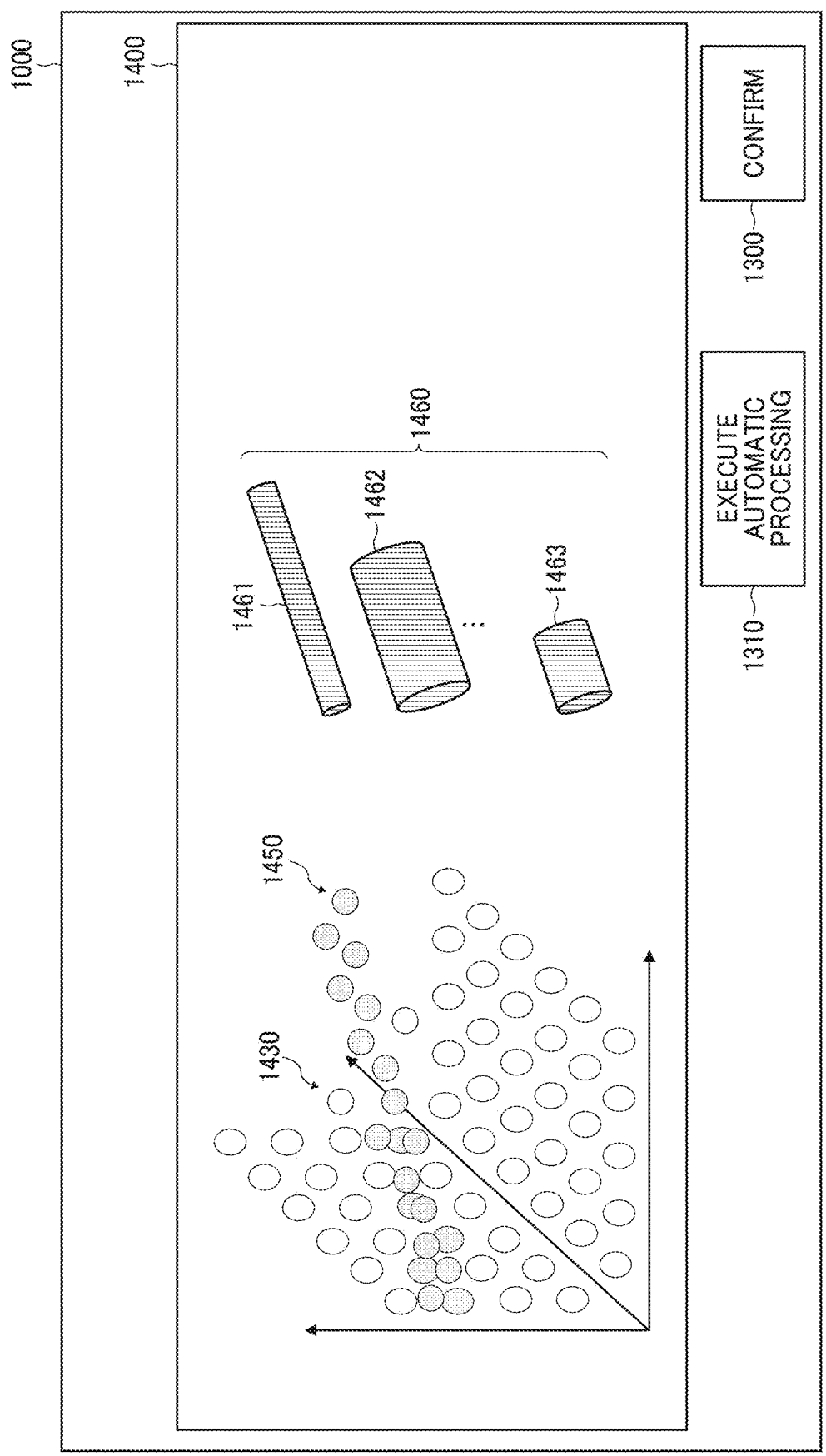

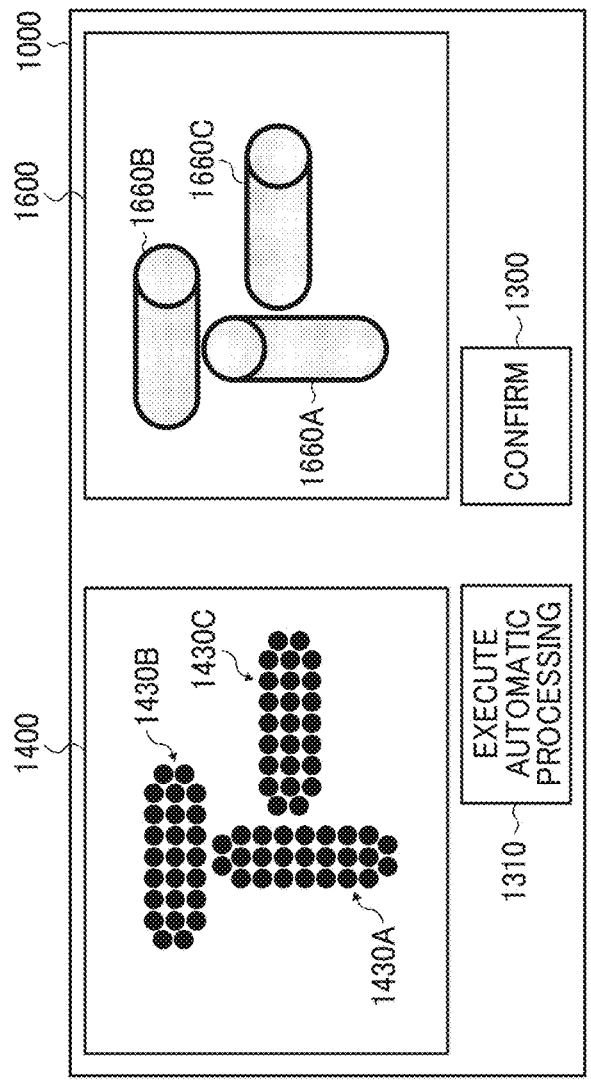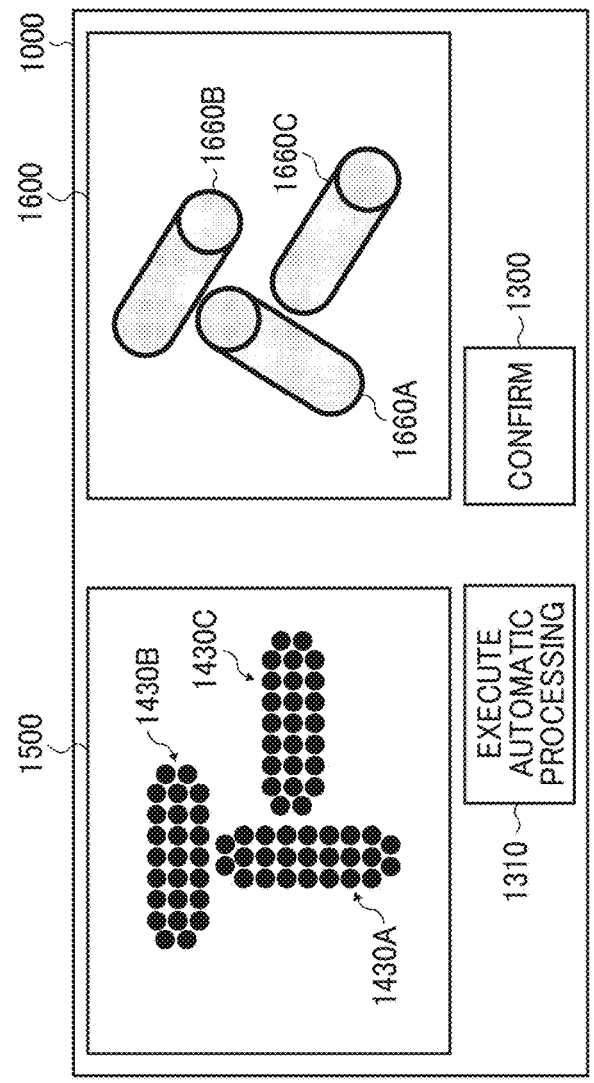

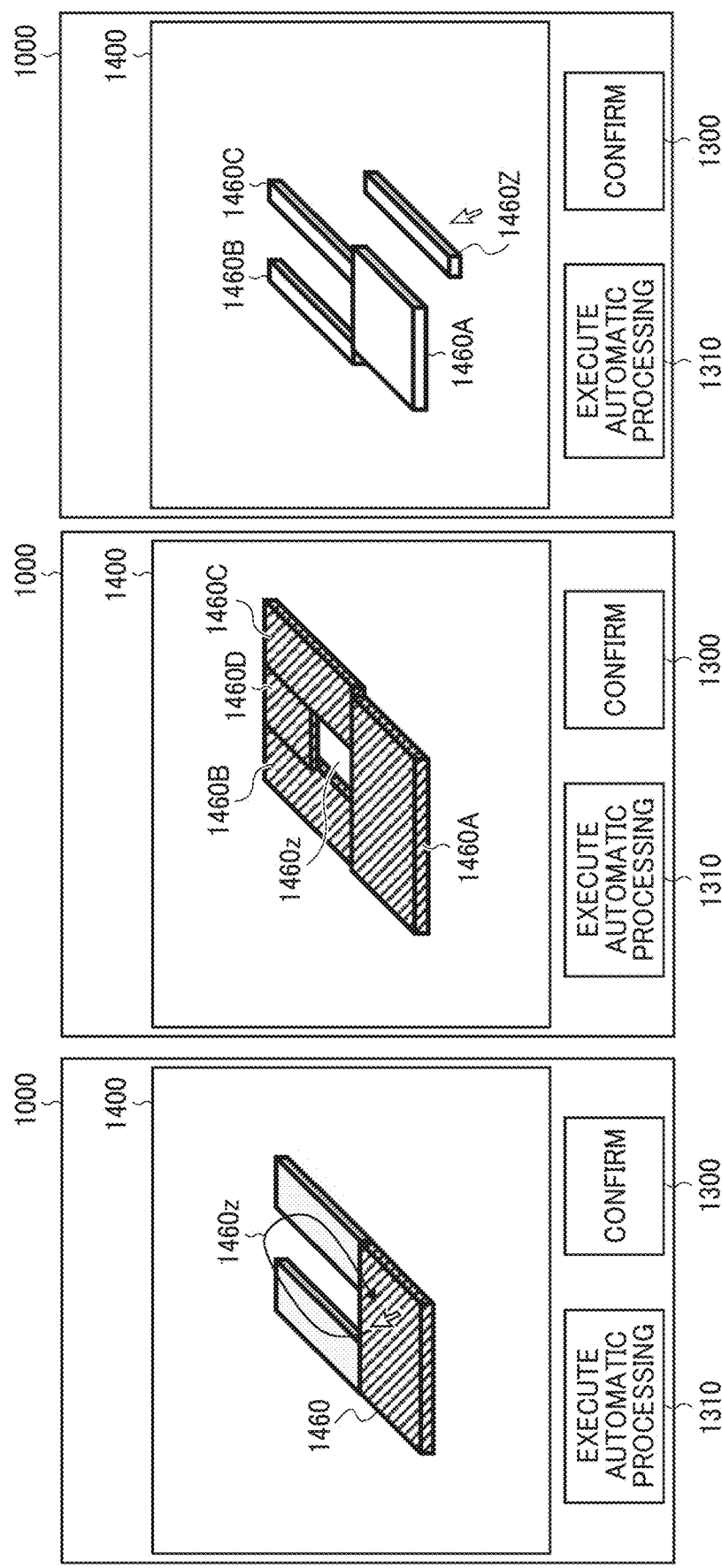

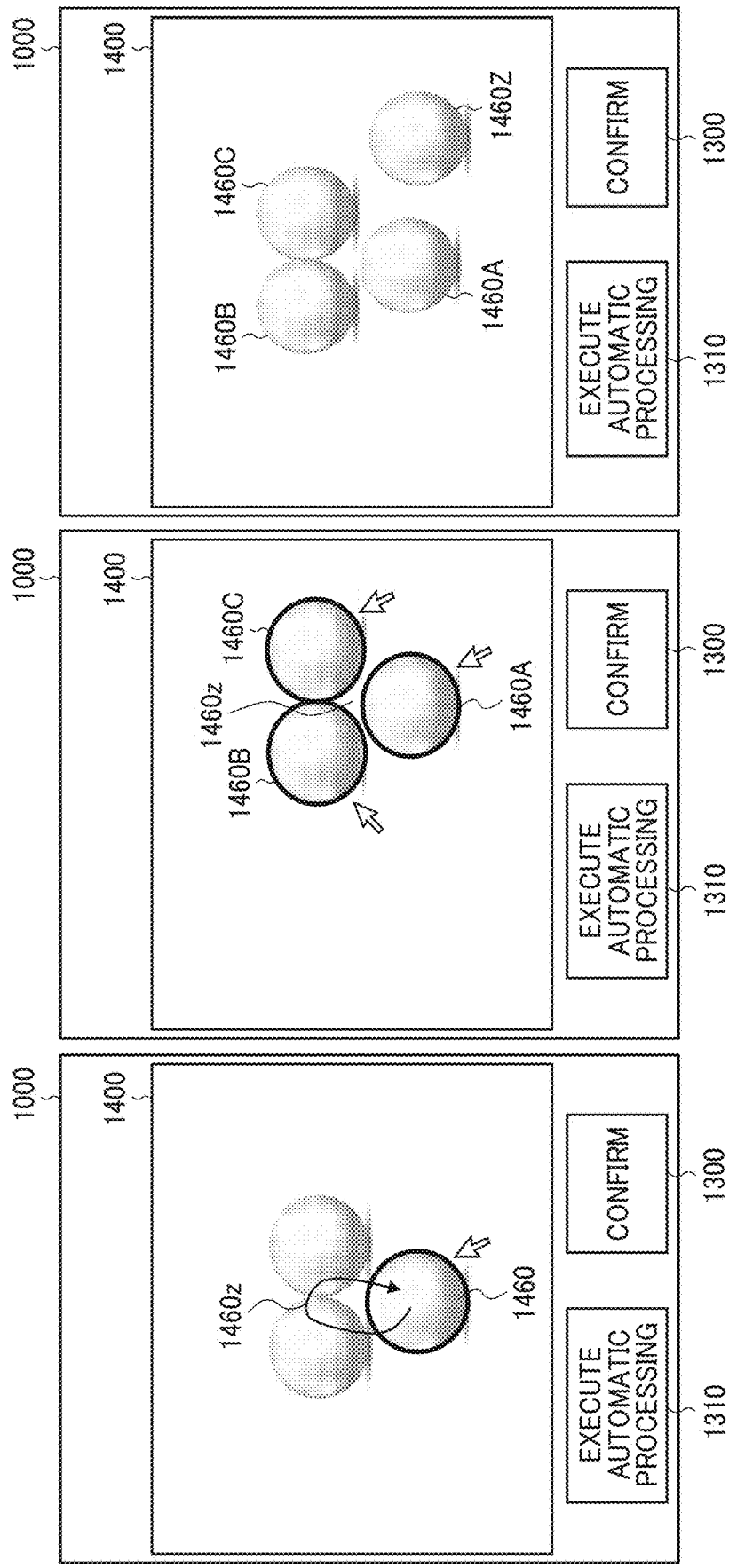

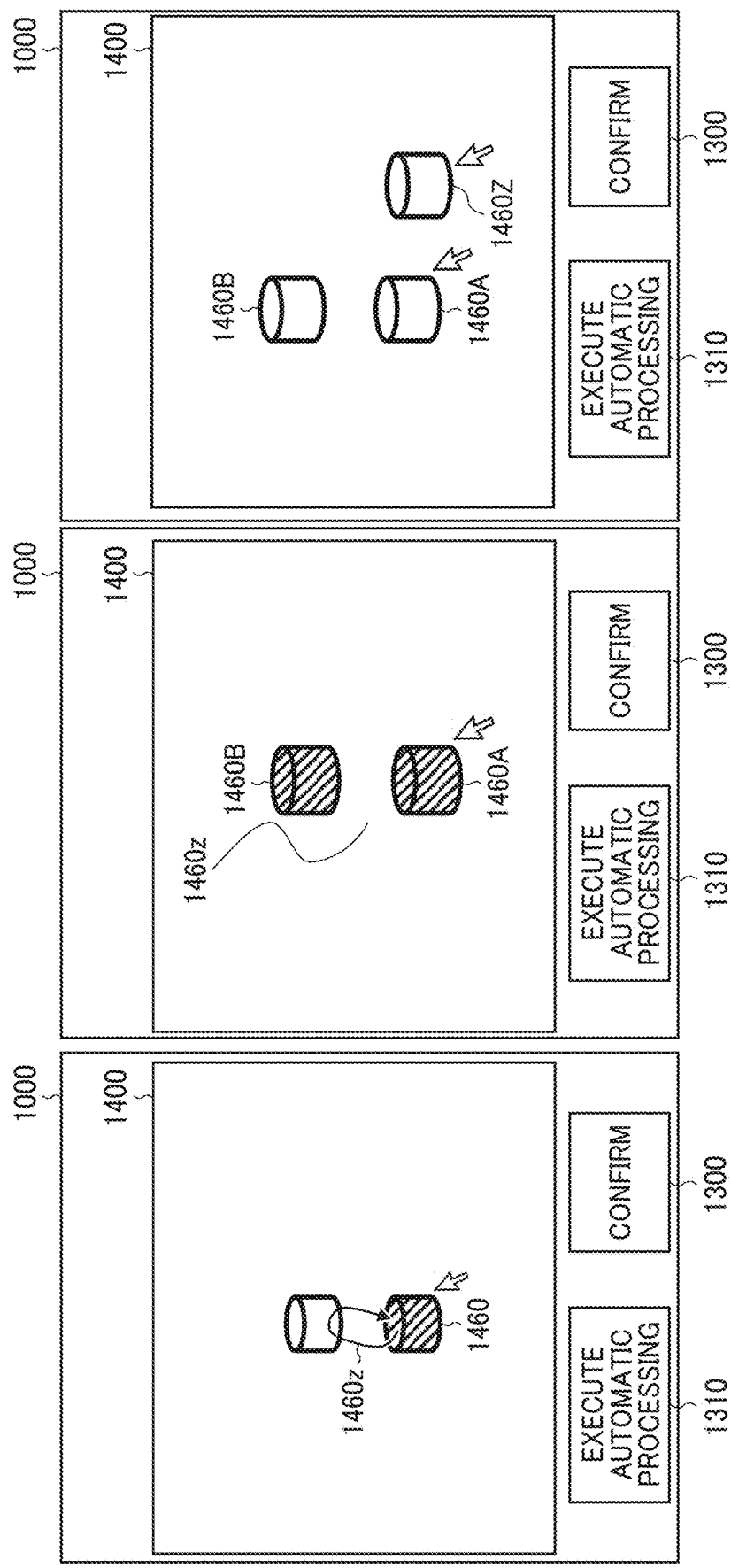

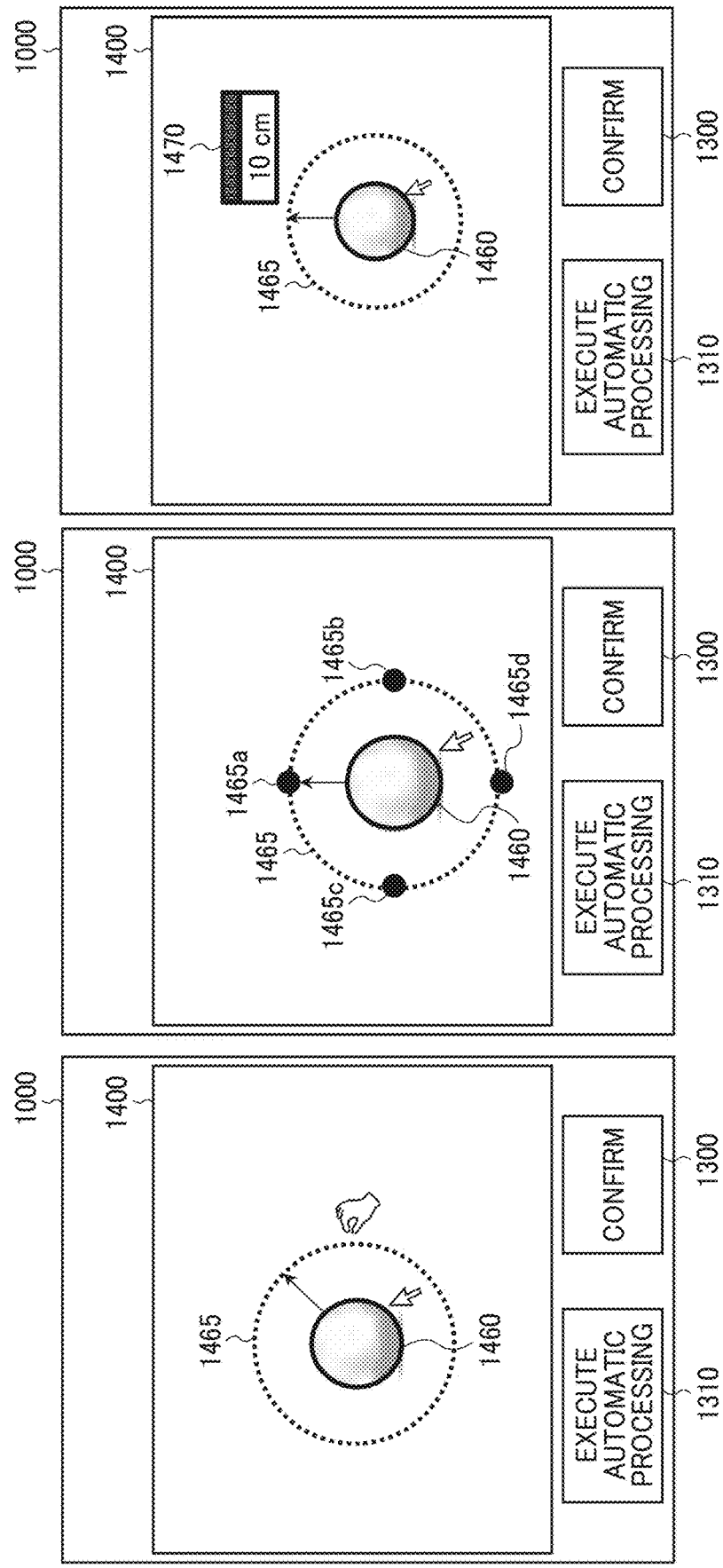

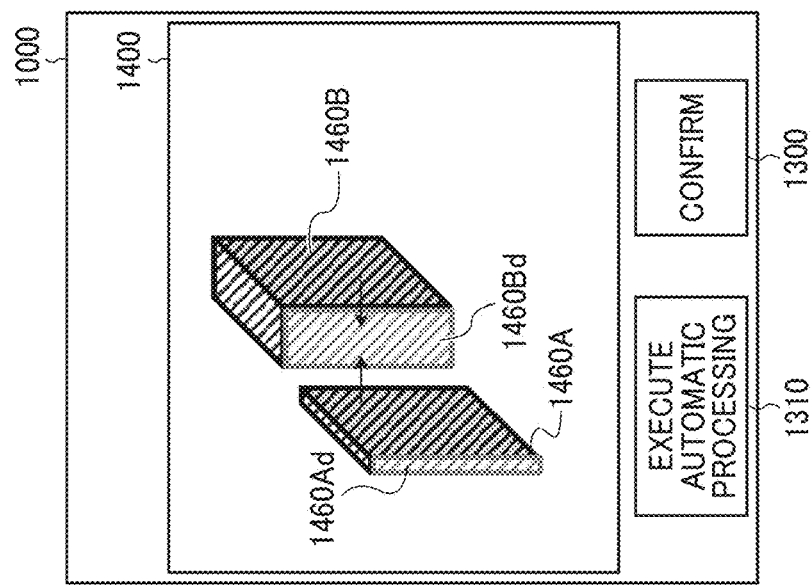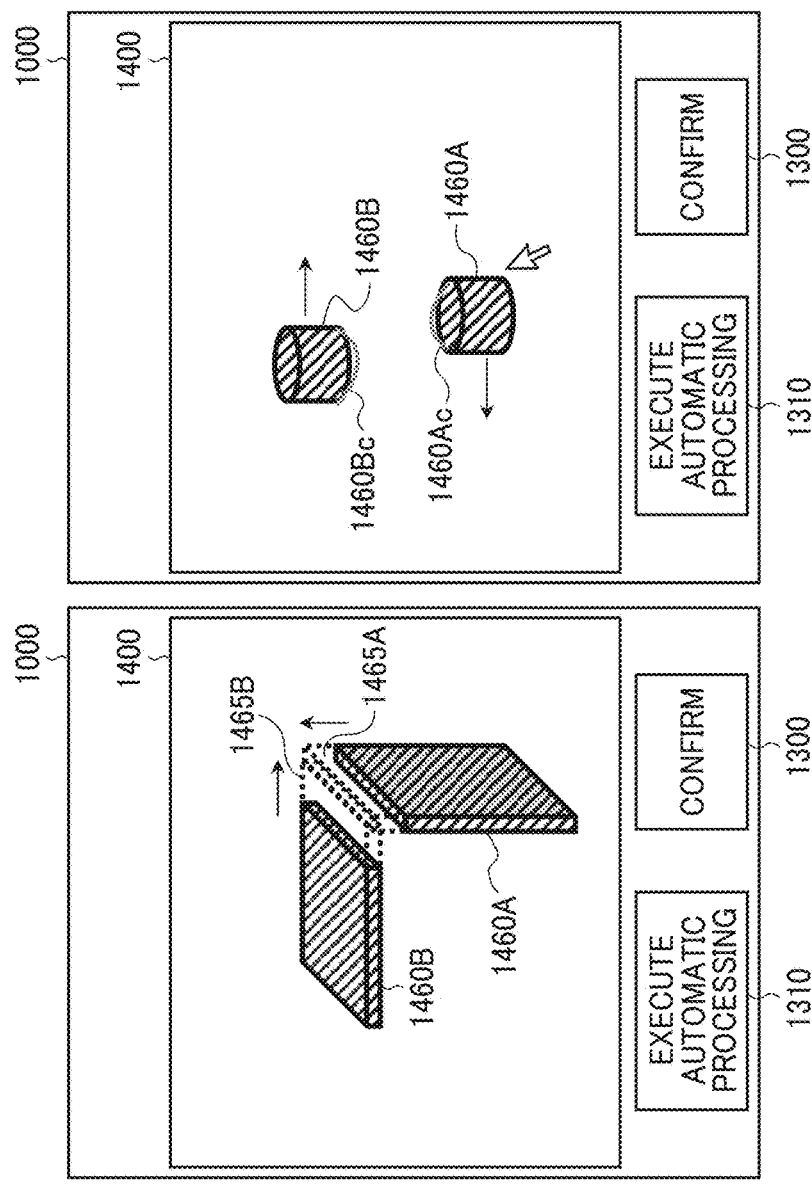

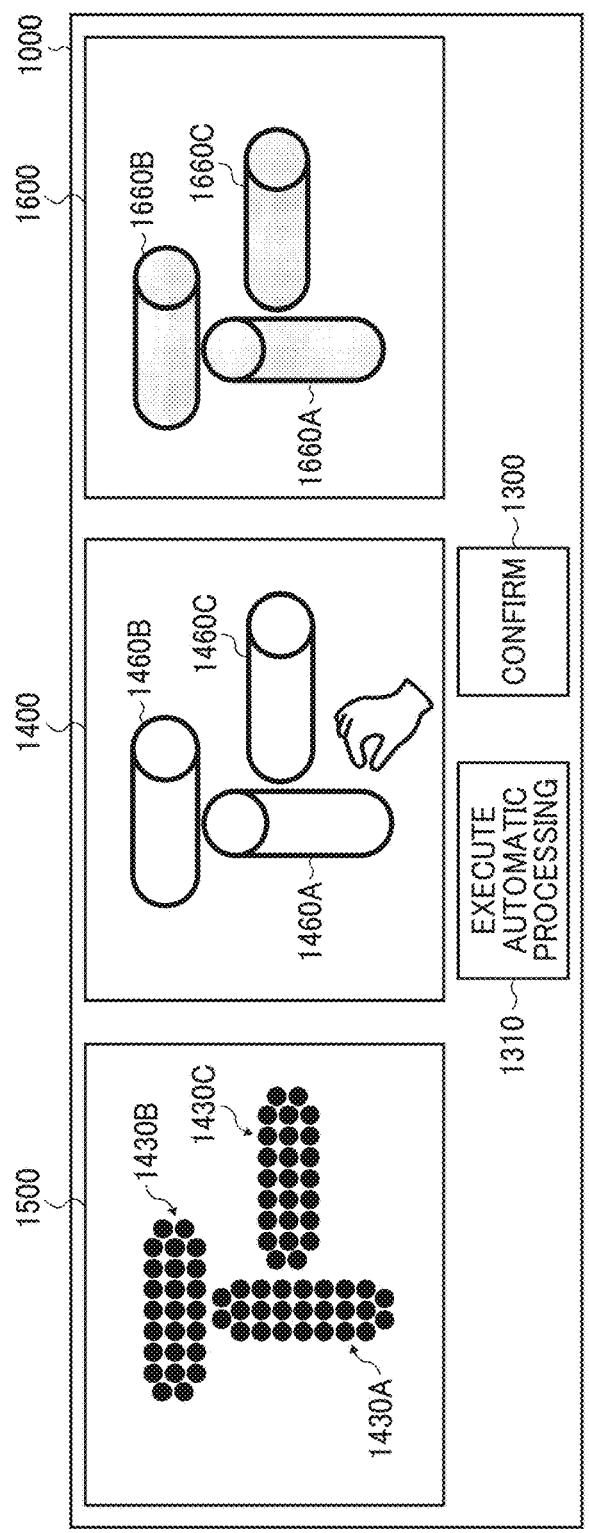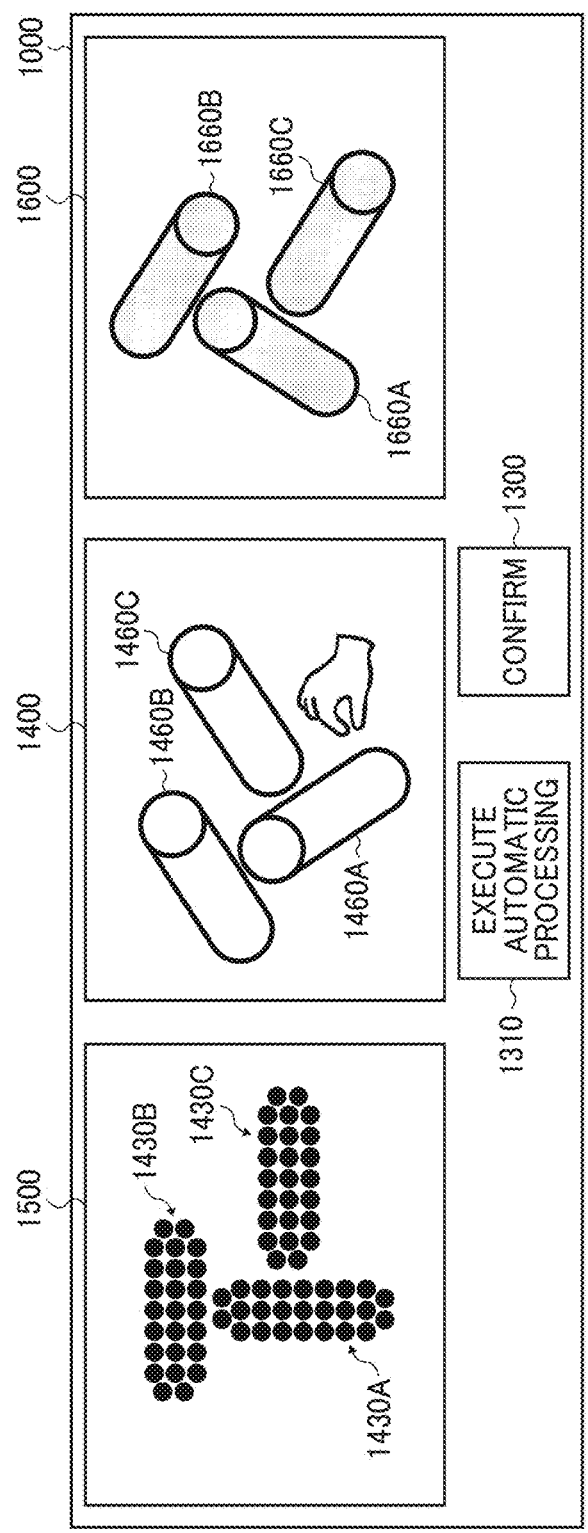

THREE-DIMENSIONAL SHAPE PROCESSING APPARATUS, THREE-DIMENSIONAL SHAPE PROCESSING SYSTEM, METHOD FOR CORRECTING THREE-DIMENSIONAL SHAPE INFORMATION, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2023-046127, filed on Mar. 23, 2023, in the Japan Patent Office, the entire disclosure of which is hereby incorporated by reference herein.

BACKGROUND

Technical Field

Embodiments of the present disclosure relate to a three-dimensional shape processing apparatus, a three-dimensional shape processing system, a method for correcting three-dimensional shape information, and a non-transitory recording medium.

Related Art

A three-dimensional (3D) model generation apparatus known in the art generates a 3D model having at least an outer shape of an object based on three-dimensional point cloud data of the object. The 3D model generation apparatus includes an abstraction 3D model acquisition means and a 3D model determination means. The abstraction 3D model acquisition means acquires an abstraction 3D model, whose dimension is changeable and which has an outer shape corresponding to each outer shape of the object. The 3D model determination means determines a matching degree between the 3D point cloud data and the abstraction 3D model while changing the dimension of the abstraction 3D model and determines, as the 3D model, an abstraction 3D model having a high matching degree.

SUMMARY

According to an embodiment, a three-dimensional shape processing apparatus includes circuitry to selectively execute one of first correction processing and second correction processing designated by an instruction operation on an instruction-receiving display component. In the first correction processing, correction of three-dimensional shape information is executed based on an input operation. In the second correction processing, the correction of the three-dimensional shape information is executed based on stored processing pre-stored in a memory.

According to another embodiment, a three-dimensional shape processing system includes a three-dimensional shape processing apparatus and a communication terminal. The three-dimensional shape processing apparatus includes first circuitry to transmit, to the communication terminal, screen information for displaying an instruction-receiving display component that receives an instruction operation designating one of first correction processing and second correction processing. In the first correction processing, correction of three-dimensional shape information is executed based on an input operation. In the second correction processing, the correction of the three-dimensional shape information is executed based on stored processing pre-stored in a memory. The communication terminal includes second circuitry to display the instruction-receiving display component on a display based on the screen information, receive the instruction operation input to the instruction-receiving display component, and transmit, to the three-dimensional shape processing apparatus, processing setting information designating the one of the first correction processing and the second correction processing based on the instruction operation. The first circuitry of the three-dimensional shape processing apparatus selectively executes the one of the first correction processing and the second correction processing designated by the processing setting information.

According to another embodiment, a method for correcting three-dimensional shape information includes selectively executing one of first correction processing and second correction processing designated by an instruction operation. In the first correction processing, correction of three-dimensional shape information is executed based on an input operation. In the second correction processing, the correction of the three-dimensional shape information is executed based on stored processing pre-stored in a memory.

According to another embodiment, a non-transitory recording medium stores a plurality of program codes which, when executed by one or more processors, causes the one or more processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a conceptual diagram illustrating a generation-setting information management table according to an embodiment of the present disclosure;

FIG. 6 is a conceptual diagram illustrating a correction-setting information management table according to an embodiment of the present disclosure;

FIGS. 9A and 9B (FIG. 9) are flowcharts of 3D shape generation processing according to an embodiment of the present disclosure;

FIG. 12 is a diagram illustrating a segmentation process according to an embodiment of the present disclosure;

FIG. 13 is a diagram illustrating a modeling process according to an embodiment of the present disclosure;

FIGS. 14A and 14B are diagrams each illustrating an operation screen in the 3D shape generation processing illustrated in FIG. 7;

FIGS. 18A to 18C are diagrams each illustrating model addition processes for a flat surface or a combination of flat surfaces, according to an embodiment of the present disclosure;

FIGS. 19A to 19C are diagrams each illustrating model addition processes for a curved surface or a combination of curved surfaces, according to an embodiment of the present disclosure;

FIGS. 20A to 20C are diagrams each illustrating model addition processes for a combination of a flat surface and a curved surface, according to an embodiment of the present disclosure;

FIGS. 22A, 22B, and 22C are diagrams each illustrating a model resizing process for to a curved surface or a combination of curved surfaces, according to an embodiment of the present disclosure;

FIGS. 30A to 30C are diagrams each illustrating a model position alignment process according to an embodiment of the present disclosure;

FIGS. 32A and 32B are diagrams each illustrating an operation screen in the 3D shape correction processing illustrated in FIG. 15.

Figure 1:
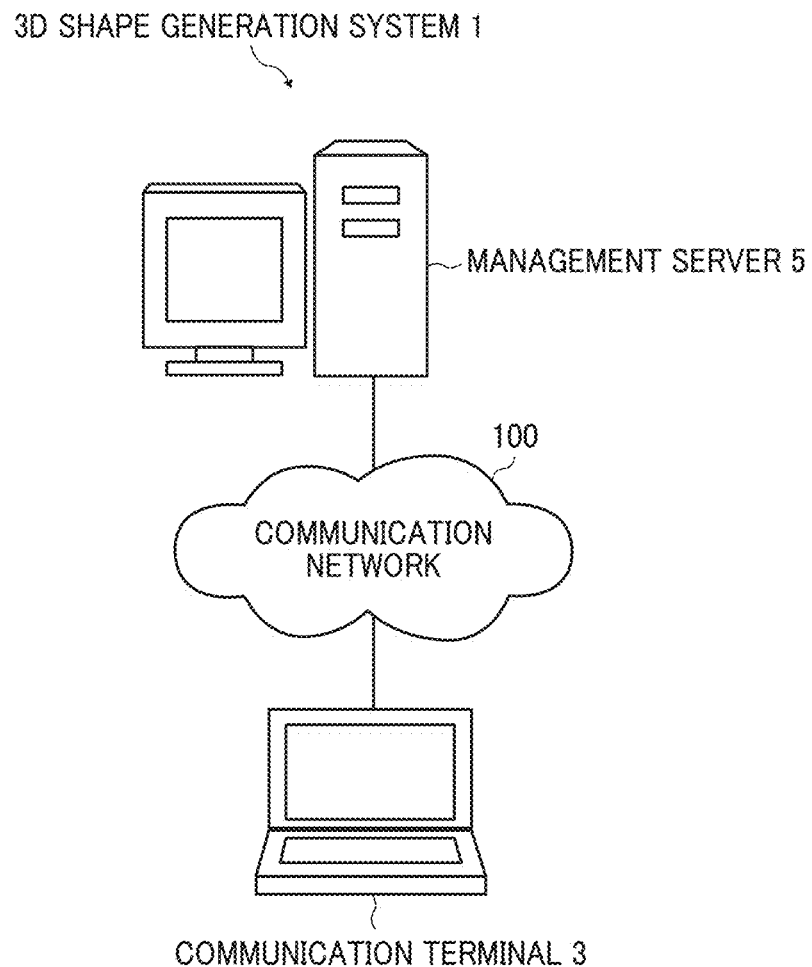
FIG. 1 is a diagram illustrating an overall configuration of a three-dimensional (3D) shape processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In civil engineering, construction, and other industries, the implementation of building information modeling (BIM)/construction information modeling (CIM) has been promoted for, for example, coping with the demographic shift toward an older population and increasing labor productivity.

Building information modeling (BIM) is a solution for utilizing information in a building database in which attribute data such as cost, finishing details, and management information is added to a three-dimensional (3D) digital model of a building created on a computer throughout the process including design of the building, construction work, maintenance, and management. The 3D digital model may be referred to as a 3D model in the following description.

CIM is a solution that has been proposed for the field of civil engineering (widely covering infrastructure such as roads, electricity, gas, and water supply) following BIM that has been advanced in the field of construction. Similar to BIM, CIM is promoted by aiming at sharing information centered around 3D models among parties concerned to increase the efficiency and sophisticate a series of construction production systems.

For promoting BIM/CIM, what is concerned is how to easily obtain a 3D model of a structure (e.g., a building or a public facility). The term "3D model" refers to, for example, a 3D point cloud retaining distance information of a space acquired by, for example, a laser scanner; a mesh object generated based on point cloud data representing a 3D point cloud; or a 3D computer-aided design (CAD) model. In the following description, a 3D point cloud may also be referred to as a point cloud.

In newly constructing a building, a complete building can be modeled from the beginning using 3D computer-aided design (CAD) software. Accordingly, the introduction of BIM/CIM is easier. By contrast, regarding an existing building, hurdles for promoting BIM/CIM are high. For example, the design drawing may be lost, or a current design may be different from that in the design drawing due to renovation or repair. Such BIM of an existing building is called, for example, "As-Build BIM," and is a challenge for promoting BIM/CIM in the future.

One way to achieve the As-Build BIM is a workflow of generating a CAD model from a point cloud (i.e., data points) obtained by spatial measurement using a laser scanner. In the related art, since a space is reconstructed based on, for example, measuring and sketching using photographs and a measuring tool, the reconstruction involves laborious work. The introduction of laser scanners has significantly increased the efficiency of this work.

In the As-Build BIM using a laser scanner, modeling is facilitated, but work called point cloud processing on point-cloud data is added. Typical point cloud processing includes multipoint measurement using a laser scanner, aligning data points (may be referred to as "points" in the following description) to construct a unified point cloud, removing unnecessary points such as noise, converting the point cloud into a mesh, mapping a texture on the mesh, and converting the point cloud into a 3D CAD model.

These processes are performed using commercially available point cloud processing software. Point cloud processing software has many functions for each of which many parameters are to be set. Accordingly, it is difficult for an inexperienced person to use point cloud processing software.

Although such software has the capability of automatically performing the processes, automation tends to fail when the difference between the situation and an ideal situation is large (e.g., points are not acquired due to, for example, occlusion.) In this case, it takes time and manpower for, for example, manually supplementing the missing portion while comparing the point cloud with a photograph.

An object of the present embodiment is to appropriately generate and correct 3D shape information according to the levels of knowledge and skill of a user.

FIG. 1 is a diagram illustrating an overall configuration of a 3D shape processing system according to the present embodiment. A 3D shape processing system 1 according to the present embodiment includes a communication terminal 3 and a management server 5 as an example of a 3D shape processing system.

The management server 5 is an example of a 3D shape generation apparatus that generates 3D shape information indicating a 3D shape corresponding to a 3D point cloud using model shape information indicating a 3D model shape.

A 3D point cloud represents a collection of points defined by coordinates (coordinate points) in a virtual 3D space and can be processed by, for example, a computer. A 3D point cloud may also be referred to as a point cloud. A 3D point cloud is a collection of coordinate points corresponding to measurement points on the surface of an object when a certain space in which the object is present is measured using, for example, a laser scanner. Color information may be added to each of the coordinate points, and the color information may be a red-green-blue (RGB) value of the coordinate point.

For example, a space including an object is measured by a laser scanner, and a red-green-blue (RGB) brightness image of the same space is captured by an image-capturing device. The coordinate points acquired by the laser scanner are aligned with the pixels of the brightness image acquired by the imaging device to obtain image information in which the 3D point cloud corresponds to the coordinates.

In the present embodiment, a laser scanner is used in the measurement for obtaining a 3D point cloud. In some embodiments, another optical measuring means or a mechanical measuring means may be used. Examples of optical measuring means include a method using a stereo camera and a method using visual simultaneous localization and mapping (SLAM).

3D shape information is information indicating the 3D shape of an object that can be handled by, for example, a computer. The information indicating a 3D shape geometrically specifies the 3D shape. For example, in the case of a sphere, the coordinates of the center and the radius correspond to the information indicating the 3D shape. When the 3D shape of an object is represented by a polyhedron (polygon), a set of coordinate points of the vertices of the polyhedron is an example of the information indicating the 3D shape. Further, the information indicating the 3D shape may be any information that uniquely defines the shape of an object.

The 3D shape information may include information about the color and material of the object in addition to the information indicating the 3D shape of the object.

The 3D model shape refers to a model such as an object model and a template used for generating 3D shape information from a 3D point cloud. The model shape information refers to information indicating a 3D model shape. One piece of model shape information corresponds to one 3D model shape.

The communication terminal 3 and the management server 5 communicate via a communication network 100. The communication network 100 is implemented by, for example, the Internet, a mobile communication network, or a local area network (LAN). The communication network 100 may include, in addition to wired communication networks, wireless communication networks in compliance with, for example, 5th generation (5G), Worldwide Interoperability for Microwave Access (WiMAX), or Long-Term Evolution (LTE). Further, the communication terminal 3 can establish communication by a short-range communication technology such as near field communication (NFC).

Figure 2A:
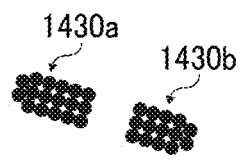
FIGS. 2A to 2C are diagrams each illustrating a sequence of 3D shape processing according to an embodiment of the present disclosure.
Figure 2B:
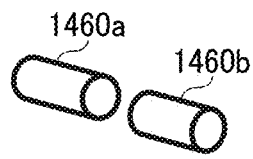
Figure 2C:

FIGS. 2A to 2C are diagrams each illustrating a sequence of 3D shape processing according to the present embodiment.

The 3D shape processing system 1 generates model information 1460a and 1460b (examples of 3D shape information) illustrated in FIG. 2B based on 3D point cloud 1430a and 1430b illustrated in FIG. 2A.

Further, the 3D shape processing system 1 corrects the model information 1460a and 1460b illustrated in FIG. 2B to generate model information 1460c illustrated in FIG. 2C.

The 3D shape processing system 1 generates model information suitable for a mass of point clouds. Accordingly, it is difficult to generate model information in consideration of facts that will be known after modeling such as the relation between multiple models at this stage.

Accordingly, the 3D shape processing system 1 needs to generate the model information 1460a and 1460b illustrated in FIG. 2B as intermediate data and correct the model information 1460a and 1460b illustrated in FIG. 2B in consideration of facts that will be known after modeling, such as the relation between the multiple models, thereby generating the model information 1460c illustrated in FIG. 2C.

Note that the 3D shape processing system 1 does not necessarily require a user to check the model information 1460a and 1460b (intermediate data) illustrated in FIG. 2B but can automatically correct the model information 1460a and 1460b illustrated in FIG. 2B to generate the model information 1460c illustrated in FIG. 2C.

Hardware Configuration

Figure 3:
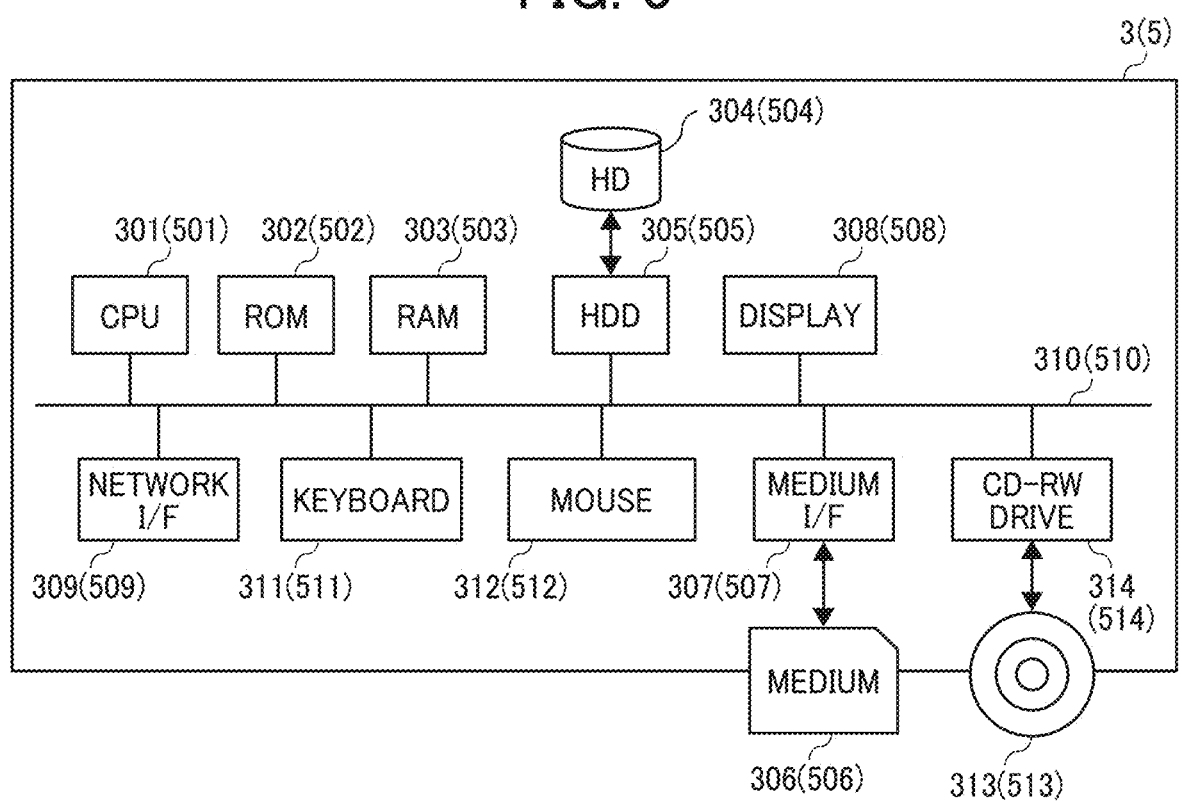
FIG. 3 is a block diagram illustrating a hardware configuration common to a communication terminal and a management server according to an embodiment of the present disclosure.

FIG. 3 is a block diagram illustrating a hardware configuration common to the communication terminal and the management server according to the present embodiment.

The hardware components of the communication terminal 3 are denoted by reference numerals in the 300s. The hardware components of the management server 5 are denoted by parenthesized numerals in the 500s.

The communication terminal 3 includes a central processing unit (CPU) 301, a read-only memory (ROM) 302, a random-access memory (RAM) 303, a hard disk (HD) 304, a hard disk drive (HDD) 305, a medium interface (I/F) 307 to which a medium 306 (storage medium) is connected, a display 308, a network I/F 309, a keyboard 311, a mouse 312, a compact disc-rewritable (CD-RW) drive 314, and a bus line 310.

The CPU 301 controls the entire operation of the communication terminal 3. The ROM 302 stores a control program for driving the CPU 301. The RAM 303 is used as a work area for the CPU 301. The HD 304 stores various data such as programs. The HDD 305 controls the reading or writing of various data to or from the HD 304 under the control of the CPU 301. The medium I/F 307 controls the reading or writing (storing) of data from or to the medium 306 (a storage medium) such as a flash memory. The display 308 displays various information such as a cursor, a menu, a window, characters, and images. The network I/F 309 is an interface for data communication via the communication network 100. The keyboard 311 is an input device provided with multiple keys for the user to input, for example, characters, numerals, and various instructions. The mouse 312 is an input device used to, for example, select an instruction, execute various instructions, select a target to be processed, and move a cursor being displayed. The CD-RW drive 314 reads and writes various data from and to a CD-RW 313, which is an example of a removable recording medium.

The management server 5 includes a CPU 501, a ROM 502, a RAM 503, an HD 504, an HDD 505, a medium I/F 507 to which a medium 506 (storage medium) is connected, a display 508, a network I/F 509, a keyboard 511, a mouse 512, a CD-RW drive 514, and a bus line 510. Since these components are similar in configuration to the above-described components (the CPU 301, the ROM 302, the RAM 303, the HD 304, the HDD 305, the medium 306, the medium I/F 307, the display 308, the network I/F 309, the keyboard 311, the mouse 312, the CD-RW drive 314, and the bus line 310). Thus, the description thereof is omitted.

The drive for a removable recording medium is not limited to the CD-RW drives 314 (514) but may be, for example, a compact disc-recordable (CD-R) drive. In one embodiment, each of the communication terminal 3 and the management server 5 is implemented by a single computer. In another embodiment, elements (functions, means, or storage areas) of the communication terminal 3 and the management server 5 are divided and are allocated to multiple computers as desired.

Figure 4:
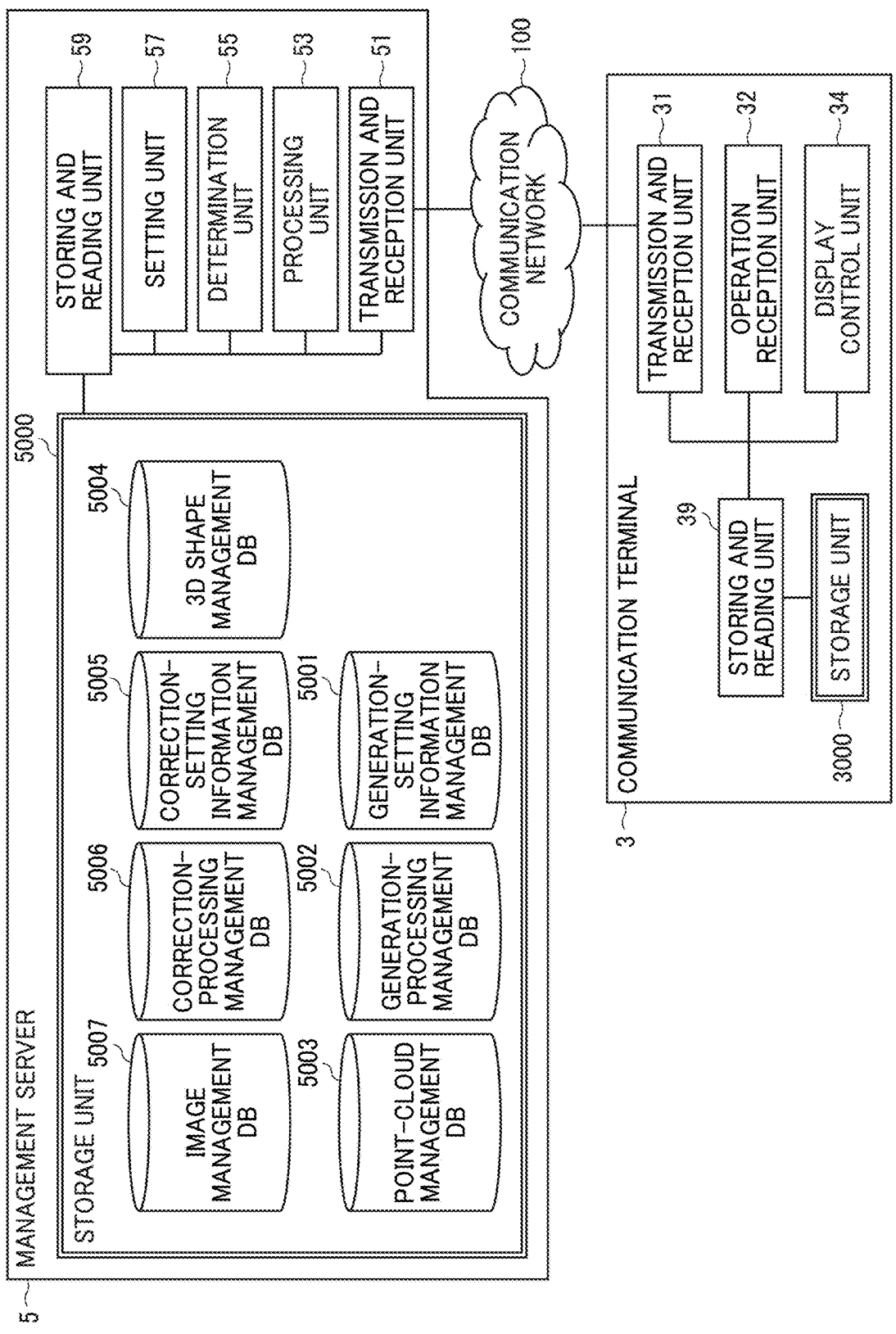
FIG. 4 is a block diagram illustrating a functional configuration of the 3D shape processing system illustrated in FIG. 1.

FIG. 4 is a block diagram illustrating a functional configuration of the 3D shape processing system according to the present embodiment.

Functional Configuration of Communication Terminal

As illustrated in FIG. 4, the communication terminal 3 includes a transmission and reception unit 31, an operation reception unit 32, a display control unit 34, and a storing and reading unit 39. These units of functions are implemented by or caused to function by one or more of the components illustrated in FIG. 3 operating according to instructions from the CPU 301 according to the control program loaded from the HD 304 to the RAM 303. The communication terminal 3 further includes a storage unit 3000 implemented by the RAM 303 and the HD 304 illustrated in FIG. 3.

Functional Configuration of Communication Terminal

A description is given below of the functional units of the communication terminal 3. The transmission and reception unit 31 is an example of a transmission means and implemented by instructions from the CPU 301 and the network I/F 309 in FIG. 3. The transmission and reception unit 31 transmits or receives various types of data (or information) to or from other communication terminals, devices, apparatuses, or systems through the communication network 100.

The operation reception unit 32 is an example of an operation reception means and is implemented by, for example, instructions from the CPU 301, the keyboard 311, and the mouse 312 in FIG. 3. The operation reception unit 32 receives various types of input received from the user.

The display control unit 34 is an example of a display control means and implemented by instructions from the CPU 301 in FIG. 3. The display control unit 33 controls the display 308 to display various images and screens (screen images).

The storing and reading unit 39 is an example of a storing control means and is implemented by instructions from the CPU 301 in FIG. 3 and the HDD 305, the medium I/F 307, and the CD-RW drive 314. The storing and reading unit 35 stores various types of data in the storage unit 3000, the medium 306, or the CD-RW 313 and reads the various types of data from the storage unit 3000, the medium 306, or the CD-RW 313.

Functional Configuration of Management Server

The management server 5 includes a transmission and reception unit 51, a processing unit 53, a determination unit 55, a setting unit 57, and a storing and reading unit 59. These units of functions are implemented by or caused to function by one or more of the components illustrated in FIG. 3 operating according to instructions from the CPU 501 executing a program loaded from the HD 504 to the RAM 503. The management server 5 further includes a storage unit 5000 implemented by the HD 504 illustrated in FIG. 3. The storage unit 5000 is an example of a storage means.

Functional Configuration of Management Server

A description is given below of the functional units of the management server 5. The management server 5 may be implemented by multiple computers to which the functions thereof are allocated. Although the management server 5 is a server computer that resides in a cloud environment in the following description, alternatively, the management server 5 may be a server that resides in an on-premises environment.

The transmission and reception unit 51 is an example of a transmission means and is implemented by instructions from the CPU 501 and the network I/F 509 illustrated in FIG. 3. The transmission and reception unit 51 transmits and receives various types of data (or information) to and from other terminals, devices, apparatuses, or systems via the communication network 100.

The processing unit 53 is implemented by instructions from the CPU 501 illustrated in FIG. 3 and performs various types of processing described later. The processing unit 53 is an example of a 3D information generation means that generates 3D shape information.

The determination unit 55 is implemented by instructions from the CPU 501 illustrated in FIG. 3 and performs various determinations described later.

The setting unit 57 is implemented by instructions from the CPU 501 illustrated in FIG. 3 and performs various determinations described later.

The storing and reading unit 59 is an example of a storing control means and implemented by instructions from the CPU 501 and the HDD 505, the medium I/F 507, and the CD-RW drive 514 illustrated in FIG. 3. The storing and reading unit 59 stores various types of data in the storage unit 5000, the medium 506, or the CD-RW 513 and reads the data from the storage unit 5000, the medium 506, or the CD-RW 513. The storage unit 5000, the medium 506, and the CD-RW 513 are examples of the storage means.

The storage unit 5000 includes a generation-setting information management database (DB) 5001 in the form of a generation-setting information management table, a generation-processing management DB 5002, a point-cloud management DB 5003, and a 3D shape management DB 5004, a correction-setting information management DB 5005, a correction-processing management DB 5006, and an image management DB 5007.

The generation-setting information management DB 5001 (an example of a generation-setting information management means) stores various types of setting information for generating a 3D shape. The generation-processing management DB 5002 (an example of a generation-processing management means) stores various processing programs for generating a 3D shape. The point-cloud management DB 5003 (an example of a point-cloud management means) stores 3D point-cloud information for generating a 3D shape. The 3D shape management DB 5004 (an example of a 3D shape management means) stores 3D shape information.

The correction-setting information management DB 5005 (an example of a correction-setting information management means) stores various types of setting information for correcting a 3D shape. The correction-processing management DB 5006 (an example of a correction-processing management means) stores various processing programs for correcting a 3D shape. The image management DB 5007 (an example of an image management means) stores image information in which 3D point-cloud information stored in the point-cloud management DB 5003 corresponds to coordinates.

The above-mentioned various processing programs stored in the generation-processing management DB 5002 are each an example of stored processing for performing a part of generation processes of 3D shape information. The above-mentioned various processing programs stored in the correction-processing management DB 5006 are examples of stored processing for performing a part of correction processes of the 3D shape information.

FIG. 5 is a conceptual diagram illustrating a generation-setting information management table according to the present embodiment.

The generation-setting information management table is a table for managing 3D point-cloud data used to generate a 3D shape and the execution sequence and the mode of a part of the generation processing of the 3D shape. The storage unit 5000 stores the generation-setting information management DB 5001 in the form of the generation-setting information management table as illustrated in FIG. 5. In the generation-setting information management table, the file name of the 3D point-cloud data is associated with the execution sequence and the mode of a part of generation processing of a 3D shape for each user ID.

A "part of generation processing of a 3D shape" includes registration, the processes of noise removal, segmentation, and modeling, which may be referred to as "generation processes."

The registration is the process of transforming multiple 3D point clouds into one unified 3D point cloud. Noise removal is the process of removing unnecessary points from the 3D point clouds.

Segmentation is the process of labeling a particular point cloud to be distinguished from other clouds in a 3D point cloud. Different labels may be assigned to the particular point clouds to mutually distinguish the points from one another. Segmentation may be performed in addition to clustering for grouping close point clouds of the labeled point clouds.

Modeling is the process of collating a particular point cloud within a 3D point cloud with a model shape and replacing the particular point cloud with the model shape.

The "mode" includes a manual mode, an automatic mode, and a mixed mode. The manual mode is for executing the entire or a part of the generation processing of 3D shape information based on an input operation without being based on processing pre-stored in a database such as the generation-processing management DB 5002. The automatic mode is for executing the entire or part of the generation processes of 3D shape information based on pre-stored processing and without being based on an input operation. The mixed mode, which is a combination of the automatic mode and the manual mode, is for executing the entire or part of the generation processing of 3D shape information based on an input operation and pre-stored processing.

The processing manually executed in the manual or mixed mode is referred to as manual processing, which is an example of a first generation processing in which the entire or part of the generation processing of 3D shape information is executed based on an input operation. In this disclosure, "manual/automatic mode" and "manual/automatic processing" may be used interchangeably. The processing automatically executed in the automatic or mixed mode is referred to as automatic processing, which is an example of a second generation processing in which the entire or part of the generation processing of 3D shape information is executed based on pre-stored processing and without being based on an input operation.

When the management server 5 is implemented by multiple computers to which functions are allocated, a first computer may execute the entire or part of the generation processing of 3D shape information based on an input operation without being based on stored processing, and a second computer may execute the entire or part of the generation processing of 3D shape information based on pre-stored processing without being based on an input operation.

FIG. 6 is a conceptual diagram illustrating a correction-setting information management table according to the present embodiment.

The correction-setting information management table is a table for managing the 3D shape data used to correct a 3D shape and the execution sequence and the mode of a part of correction processes of the 3D shape. The storage unit 5000 stores the correction-setting information management DB 5005 in the form of the correction-setting information management table as illustrated in FIG. 6. In the correction-setting information management table, the file name of 3D shape data is associated with the execution sequence and the mode of a part of correction processes of a 3D shape for each user ID.

A "part of correction processes of a 3D shape" includes model addition, model resizing, model moving, model deletion, model position alignment, model unification, and model separation processes.

A model shape converted from a point cloud in the modeling may have a missing portion in which points are not acquired. Model addition is the process of adding a model shape to such a missing portion.

Model resizing is the process of resizing a model shape converted from a point cloud in the modeling.

Model moving is the process of moving, relative to another model shape, a model shape converted from a point cloud in the modeling.

Model deletion is the process of deleting a portion of a model shape converted from a point cloud in the modeling.

Model alignment is the process of aligning multiple model shapes converted from one or more point clouds in the modeling.

Model unification is the process of unifying multiple model shapes converted from one or more point clouds in the modeling into one model shape.

Model separation is the process of dividing a model shape converted from a point cloud in the modeling into multiple model shapes.

The "mode" includes a manual mode, an automatic mode, and a mixed mode. The manual mode is for executing the entire or a part of the correction processes of 3D shape information based on an input operation without being based on processing pre-stored in a database such as the correction-processing management DB 5006. The automatic mode is for executing the entire or part of the correction processes of 3D shape information based on pre-stored processing and without being based on an input operation. The mixed mode, which is a combination of the automatic mode and the manual mode, is for executing the entire or part of the correction processes of 3D shape information based on an input operation and pre-stored processing.

The processing manually executed in the manual or mixed mode is referred to as manual processing, which is an example of first correction processing in which the entire or part of the correction processes of 3D shape information is executed based on an input operation. The processing automatically executed in the automatic or mixed mode is referred to as automatic processing, which is an example of second correction processing in which the entire or part of the correction processes of 3D shape information is executed based on pre-stored processing and without being based on an input operation.

When the management server 5 is implemented by multiple computers to which functions are allocated, a first computer may execute the entire or part of the correction processes of 3D shape information based on an input operation without being based on stored processing, and a second computer may execute the entire or part of the correction processes of 3D shape information based on pre-stored processing without being based on an input operation.

Figure 7:
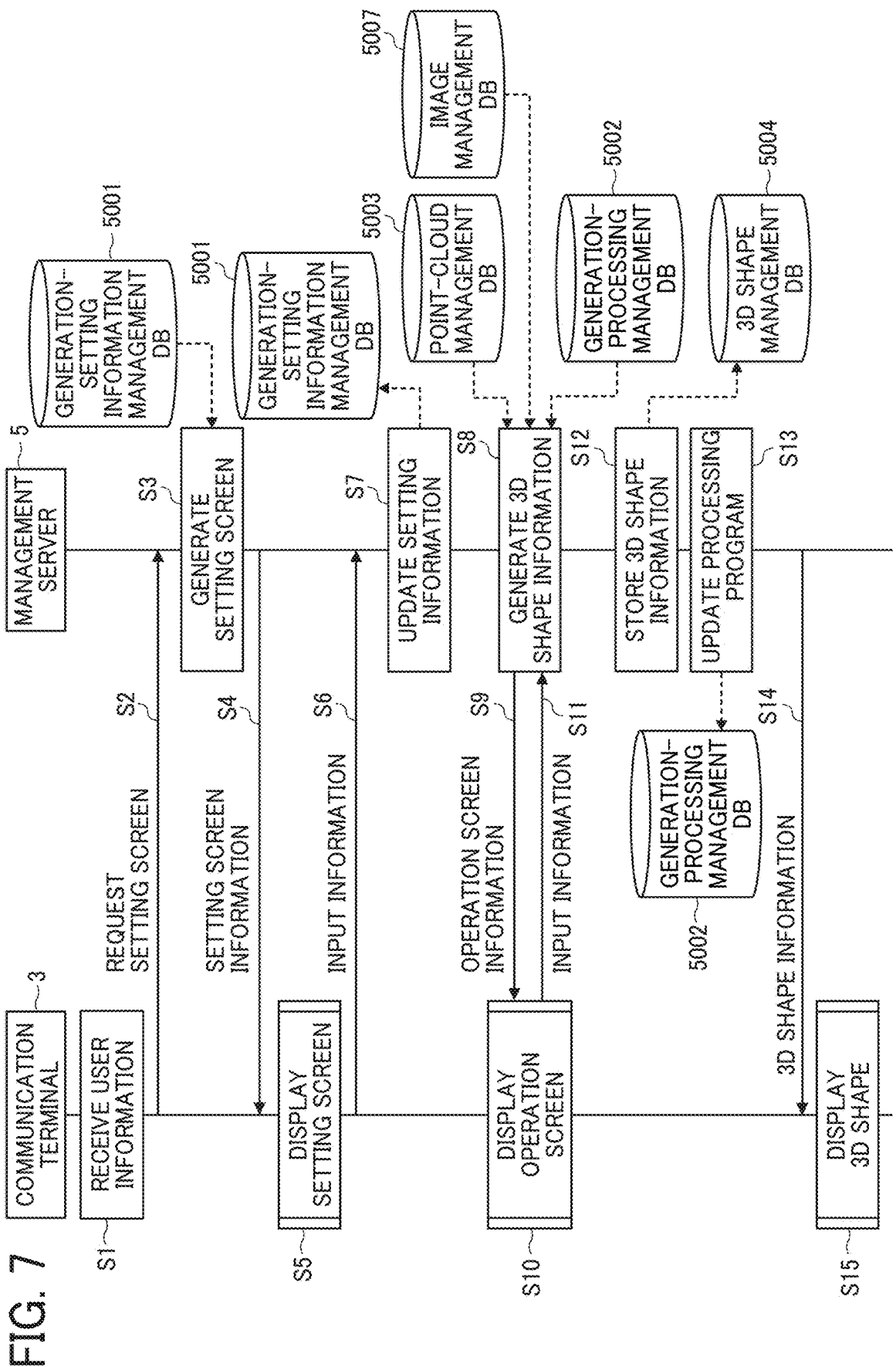
FIG. 7 is a sequence diagram of 3D shape generation processing according to an embodiment of the present disclosure.

FIG. 7 is a sequence diagram of 3D shape generation processing according to the present embodiment.

The operation reception unit 32 of the communication terminal 3 receives an operation for inputting information of the user, on an input/output screen displayed on the display 308 (Step S1). The transmission and reception unit 31 of the communication terminal 3 transmits to the management server 5 a request for a generation-setting screen including the user information received in Step S1. The transmission and reception unit 51 of the management server 5 receives the request including the user information from the communication terminal 3 (Step S S2).

The storing and reading unit 59 of the management server 5 searches the generation-setting information management DB 5001 using the user information included in the request received in Step S2 as a search key to retrieve the file name of a 3D point-cloud data relating to the user information and the execution sequence and the mode of the generation processing. The setting unit 57 of the management server 5 generates a generation-setting screen based on the file name, the execution sequence, and the mode retrieved by the storing and reading unit 59 (Step S3).

The generation-setting screen includes a point-cloud setting screen, a generation-processing setting screen, and an instruction-receiving display component (may be referred to as an instruction-receiving screen or visual representation that receives an instruction operation). The point-cloud setting screen receives a point-cloud setting operation for setting a 3D point cloud used to generate 3D shape information. The generation-processing area receives a processing setting operation for setting the execution sequence and the mode of a part of the generation processing of 3D shape information. The instruction-receiving display component receives an operation designating the first generation processing or the second generation processing.

The transmission and reception unit 51 transmits to the communication terminal 3 screen information for displaying the generation-setting screen generated in Step S3. The transmission and reception unit 31 of the communication terminal 3 receives the screen information from the management server 5 (Step S4). Screen information is used for displaying a screen (e.g., the generation-setting screen) and is described in, for example, Hyper Text Markup Language (HTML), Extended Markup Language (XML), Cascade Style Sheet (CSS), or JAVASCRIPT. Step S4 is an example of transmitting screen information for displaying the instruction-receiving display component. The transmission and reception unit 51 is an example of the transmission means.

Subsequently, the display control unit 34 of the communication terminal 3 displays on the display 308 the generation-setting screen based on the screen information received in Step S4 (Step S5). The operation reception unit 32 of the communication terminal 3 receives an input operation performed by the user on the generation-setting screen displayed. The input operation includes the point-cloud setting operation, the processing setting operation, and the instruction operation designating the first generation processing or the second generation processing. Step S5 is an example of receiving an instruction operation designating the first generation processing or the second generation processing.

The transmission and reception unit 31 transmits to the management server 5 input information corresponding to the input operation received by the operation reception unit 32. The transmission and reception unit 51 of the management server 5 receives the input information from the communication terminal 3 (Step S6). The input information includes point-cloud setting information indicating a 3D point cloud set by the point-cloud setting operation and processing setting information indicating the execution sequence and mode of the generation processing set by the processing setting operation.

The storing and reading unit 59 of the management server 5 updates the execution sequence and the mode of the generation processing, which are stored in association with the user information in the generation-setting information management DB 5001, based on the processing setting information included in input information received in Step S6 (Step S7).

The storing and reading unit 59 of the management server 5 searches the point-cloud management DB 5003 using the point-cloud setting information included in the input information received in Step S6 as a search key to retrieve the 3D point-cloud data associated with the point-cloud setting information, and retrieves from the image management DB 5007 the image data having coordinates matching the 3D point-cloud data retrieved from the point-cloud management DB 5003.

The storing and reading unit 59 searches the generation-processing management DB 5002 using the mode of the generation processing in the processing setting information included in the input information received in Step S6 as a search key, thereby retrieving the processing program associated with the processing setting information. The processing unit 53 of the management server 5 generates 3D shape information based on the 3D point-cloud data, the image data, and the processing program retrieved by the storing and reading unit 59, and the execution sequence and the mode in the processing setting information included in the input information received in Step S6 (Step S8).

Step S8 is an example of executing the first generation processing or the second generation processing to generate 3D information based on the point-cloud information indicating a 3D point cloud and the instruction operation received by the instruction-receiving display component that receives an instruction operation designating the first generation processing or the second generation processing.

When the mode specified in the processing setting information includes the manual mode or the mixed mode in which the manual processing is performed, the setting unit 57 of the management server 5 generates an operation screen that receives an input operation for generating 3D shape information. The transmission and reception unit 51 transmits operation screen information for displaying the operation screen to the communication terminal 3 (Step S9). The setting unit 57 generates an operation screen in which the 3D point cloud data retrieved in Step S8 is displayed and an image information display screen in which the image data retrieved in Step S8 is displayed. The transmission and reception unit 51 transmits display screen information for displaying the image information display screen in addition to operation screen information for displaying the operation screen to the communication terminal 3.

The transmission and reception unit 31 of the communication terminal 3 receives the operation screen information and the display screen information from the management server 5. The display control unit 34 of the communication terminal 3 displays on the display 308 the operation screen and the image information display screen based on the screen information received from the management server 5. The operation reception unit 32 of the communication terminal 3 receives a predetermined operation input by the user on the operation screen (Step S10).

The input operation includes an input operation for executing the entire or part of the generation processing of 3D shape information.

The transmission and reception unit 31 transmits to the management server 5 input information corresponding to the input operation received by the operation reception unit 32. The transmission and reception unit 51 of the management server 5 receives the input information from the communication terminal 3 (Step S11).

The input information includes an operation input information by the input operation for executing the entire or part of the generation processing of 3D shape information. The processing unit 53 of the management server 5 generates 3D shape information based on the operation input information included in the input information received in Step S11. The operation input information is an example of history information indicating the history of the first generation processing executed by the 3D information generation means.

The communication terminal 3 and the management server 5 repeat the process from Step S8 to Step S11 as desired.

The processing unit 53 converts the generated 3D shape information into, for example, CAD format. The storing and reading unit 59 stores the converted 3D shape information in the 3D shape management DB 5004, the medium 506, or the CD-RW 513 (Step S12). The CAD format is 3D shape information that can be manipulated by 3D CAD software. When the 3D shape information is manipulated with commercially available 3D CAD software, the 3D shape information is converted into the 3D CAD format.

The storing and reading unit 59 updates the processing program stored in the generation-processing management DB 5002 based on the input operation for executing the entire or part of the generation processing of 3D shape information in Step S10 (Step S13).

The storing and reading unit 59 is an example of an updating means that updates the stored processing based on the history information of the first generation processing executed by the 3D information generation means.

The transmission and reception unit 51 transmits the determined 3D shape information to the communication terminal 3 (Step S14). The transmission and reception unit 31 of the communication terminal 3 receives the 3D shape information from the management server 5. The display control unit 34 of the communication terminal displays on the display 308 the 3D shape represented by the received 3D shape information (Step S15). In some embodiments, the functional units of the management server 5 in FIG. 4 are integrated into the communication terminal 3, and the processing performed by the management server 5 described with reference to FIG. 5 is executed by the communication terminal 3.

Figure 8:
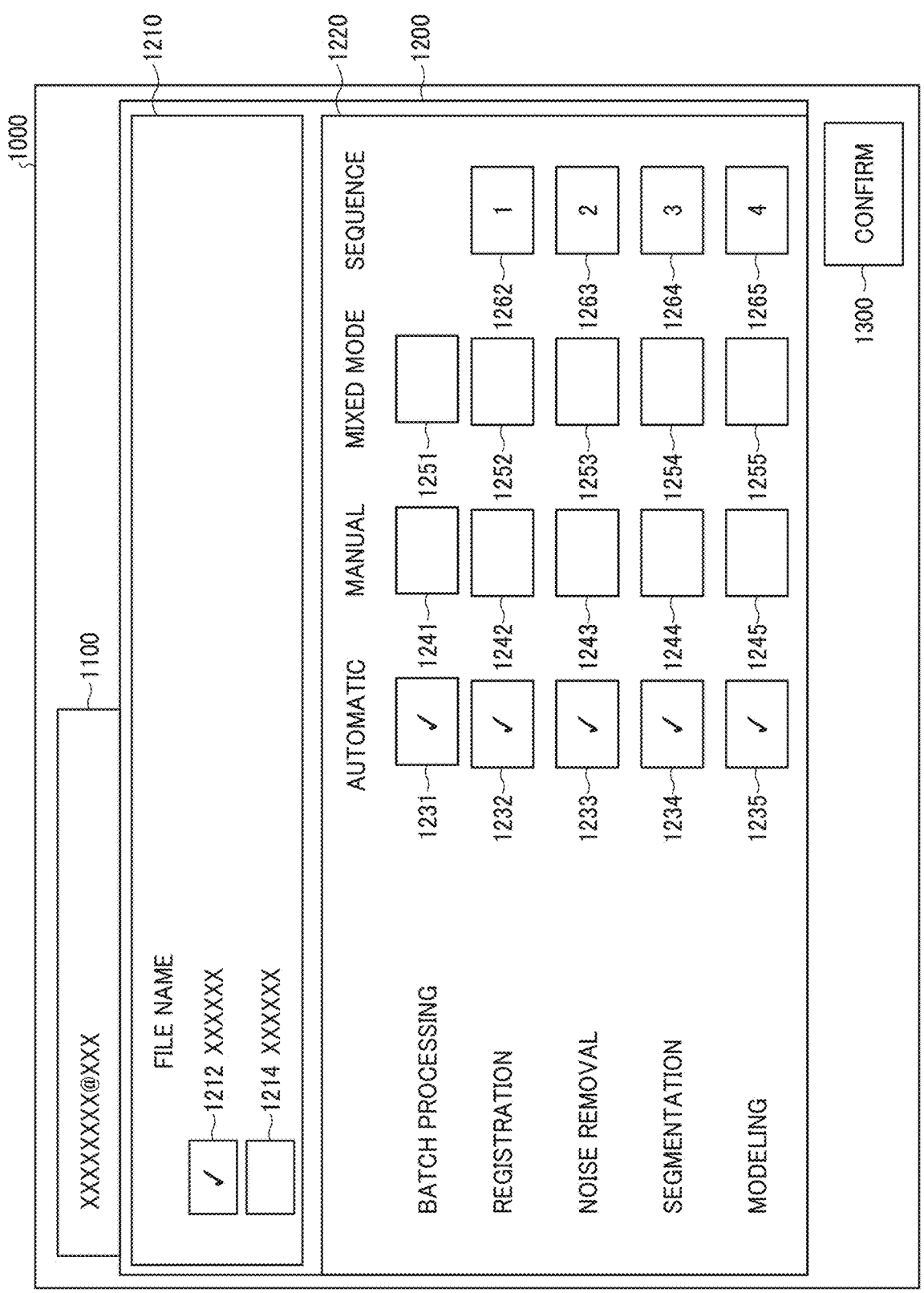
FIG. 8 is a diagram illustrating a generation-setting screen according to an embodiment of the present disclosure.

FIG. 8 is a diagram illustrating a generation-setting screen according to the present embodiment. FIG. 8 illustrates a display screen 1000 (a graphical user interface) to be displayed on the display 308 of the communication terminal 3 in Step S5 in the sequence diagram of FIG. 7.

The display control unit 34 of the communication terminal 3 displays a user information section 1100, a generation-setting screen 1200, and a confirmation button 1300 on the display screen 1000. The confirmation button 1300 is an example of the instruction-receiving display component for receiving an instruction operation.

The generation-setting screen 1200 includes a point-cloud setting screen 1210 and a generation-processing setting screen 1220.

The point-cloud setting screen 1210 is a screen that receives an operation for setting point-cloud information indicating a 3D point cloud used to generate 3D shape information. The display control unit 34 displays point-cloud setting boxes 1212 and 1214 in association with the respective file names of the multiple point-cloud data retrieved by the storing and reading unit 59. Multiple setting boxes (e.g., 1212 and 1214) can be set for point-cloud data.

The generation-processing setting screen 1220 is a screen that receives an operation for setting the execution sequence and the mode of a part of the generation processing of 3D shape information.

The generation-processing setting screen 1220 includes checkboxes for setting the automatic mode for generating 3D shape information based on the stored processing and without being based on an input operation. The checkboxes include an automatic-mode batch setting box 1231, an automatic registration setting box 1232, an automatic noise removal setting box 1233, an automatic segmentation setting box 1234, and an automatic modeling setting box 1235.

The generation-processing setting screen 1220 further includes checkboxes for setting the manual mode for generating 3D shape information based on an input operation and without being based on the stored processing. The checkboxes include a manual-mode batch setting box 1241, a manual registration setting box 1242, a manual noise removal setting box 1243, a manual segmentation setting box 1244, and a manual modeling setting box 1245.

The generation-processing setting screen 1220 further includes checkboxes for setting the mixed mode for generating 3D shape information based on an input operation and the stored processing. The checkboxes include a mixed-mode batch setting box 1251, a mixed-mode registration setting box 1252, a mixed-mode noise removal setting box 1253, a mixed-mode segmentation setting box 1254, and a mixed-mode modeling setting box 1255.

The generation-processing setting screen 1220 further includes sequence number setting boxes 1262, 1263, 1264, and 1265 used to individually set the sequence of multiple generation processes, i.e., the registration, noise removal, segmentation, and modeling processes.

The automatic-mode batch setting box 1231 is an operation-receiving display component that receives an operation for collectively selecting (setting) the automatic registration setting box 1232 to the automatic modeling setting box 1235.

The automatic registration setting box 1232 is an operation-receiving display component that receives an operation for setting the execution of automatic processing of the registration (i.e., in the automatic mode).

The automatic noise removal setting box 1233 an operation-receiving display component that receives an operation for setting the execution of automatic processing of the noise removal.

The automatic segmentation setting box 1234 is an operation-receiving display component that receives an operation for setting the execution of automatic processing of the segmentation.

The automatic modeling setting box 1235 is an operation-receiving display component that receives an operation for setting the execution of automatic processing of modeling.

The manual-mode batch setting box 1241 is an operation-receiving display component that receives an operation for collectively selecting (setting) the manual registration setting box 1242 to the manual modeling setting box 1245.

The manual registration setting box 1242 is an operation-receiving display component that receives an operation for setting the execution of manual processing of registration.

The manual noise removal setting box 1243 an operation-receiving display component that receives an operation for setting the execution of manual processing of noise removal (i.e., in the manual mode).

The manual segmentation setting box 1244 is an operation-receiving display component that receives an operation for setting the execution of manual processing of segmentation.

The manual modeling setting box 1245 is an operation-receiving display component that receives an operation for setting the execution of manual processing of modeling.

The mixed-mode batch setting box 1251 is an operation-receiving display component that receives an operation for collectively selecting (setting) the mixed-mode registration setting box 1252 to the mixed-mode modeling setting box 1255.

The mixed-mode registration setting box 1252 is an operation-receiving display component that receives an operation for setting the execution of mixed processing of registration (i.e., in the mixed mode).

The mixed-mode noise removal setting box 1253 is an operation-receiving display component that receives an operation for setting the execution of mixed processing of noise removal.

The mixed-mode segmentation setting box 1254 is an operation-receiving display component that receives an operation for setting the execution of mixed processing of segmentation.

The mixed-mode modeling setting box 1255 is an operation-receiving display component that receives an operation for setting the execution of mixed processing of modeling.

The processes for which the automatic/manual/mixed mode is collectively set by the automatic-mode batch setting box 1231, the manual-mode batch setting box 1241, and the mixed-mode batch setting box 1251 include the registration, noise removal, segmentation, and modeling processes.

The sequence number setting box 1262 is an operation-receiving display component that receives an operation for designating the sequence of the registration in the execution of the generation processing.

The sequence number setting box 1263 is an operation-receiving display component that receives an operation for designating the sequence of the noise removal in the execution of the generation processing.

The sequence number setting box 1264 is an operation-receiving display component that receives an operation for designating the sequence of the segmentation in the execution of the generation processing.

The sequence number setting box 1265 is an operation-receiving display component that receives an operation for designating the sequence of the modeling in the execution sequence of the execution of the generation processing.

In response to receiving the pointing of any of the various setting boxes by a pointing device such as the mouse 312 (see FIG. 3), the display control unit 34 displays a tick mark in the selected box. The operation reception unit 32 receives various setting operations and fixes the setting when the confirmation button 1300 is operated.

As described in Step S6 of FIG. 7, the transmission and reception unit 31 transmits to the management server 5 input information including the setting information of the various settings made by various operations received by the operation reception unit 32.

In another embodiment, the generation-processing setting screen 1220 may be configured to receive an operation for individually designating multiple executions of the registration, noise removal, segmentation, and modeling processes.

When a setting operation is not performed on any of the automatic-mode batch setting box 1231, the manual-mode batch setting box 1241, the mixed-mode batch setting box 1251, the automatic registration setting box 1232, the manual registration setting box 1242, and the mixed-mode registration setting box 1252, not executing the registration is set. This also applies to the noise removal, segmentation, and manual modeling.

Figure 9B:
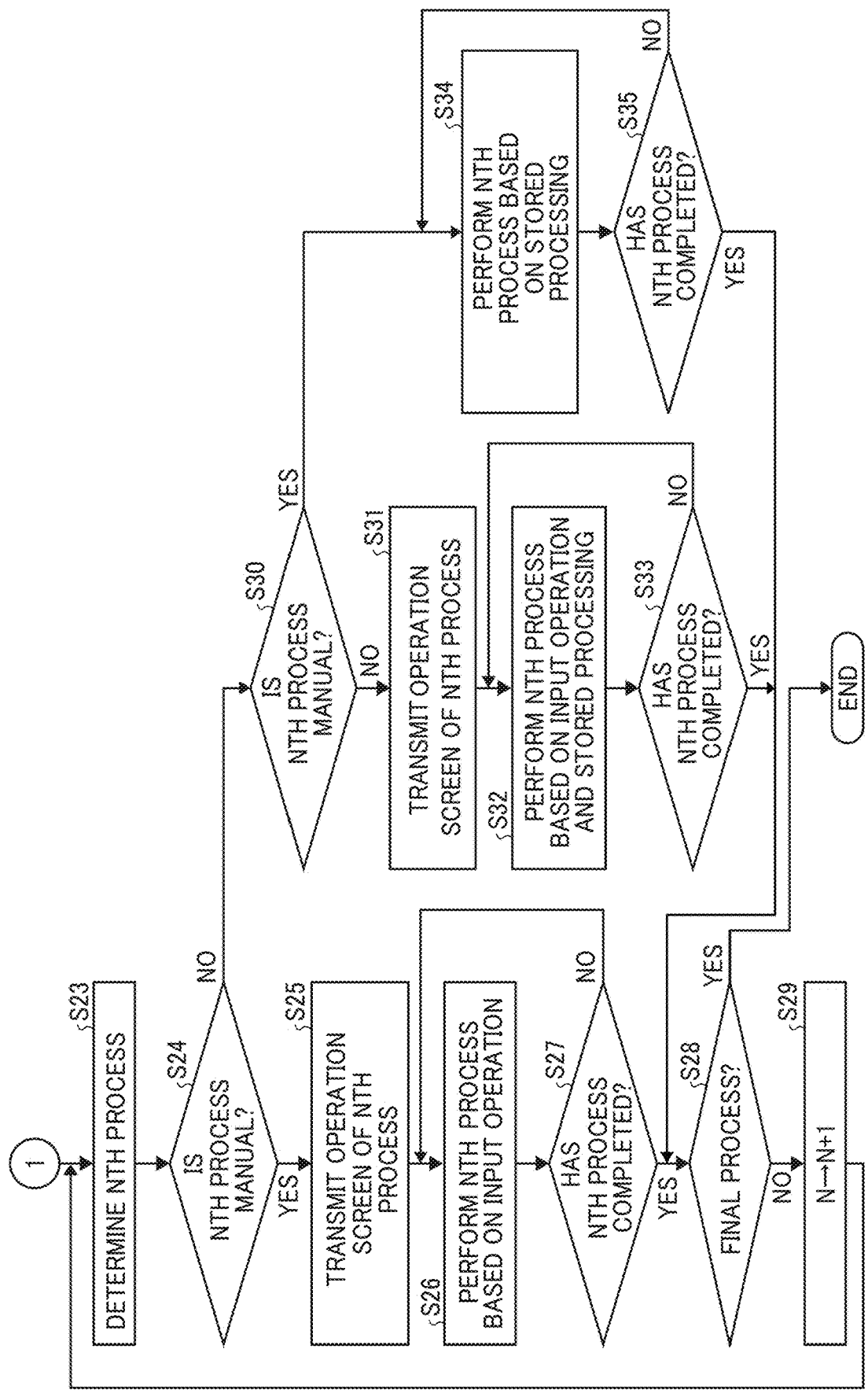

FIGS. 9A and 9B are flowcharts of 3D shape generation processing according to the present embodiment and illustrate the operation in Step S8 of FIG. 7.

The processing unit 53 of the management server 5 acquires the 3D point-cloud data retrieved by the storing and reading unit 59 (Step S21). The setting unit 57 sets to 1 a sequence number N of the generation process to be executed (Step S22).

The setting unit 57 determines the Nth process in the generation processing based on the execution sequence of the generation processing included in the processing setting information received in Step S6 (Step S23).

Based on the mode of the generation processing included in the processing setting information received in Step S6, the determination unit 55 determines whether the mode of the Nth process determined in Step S23 is the manual mode (Step S24).

When the determination unit 55 determines that the Nth process is to be executed in the manual mode (YES in Step S24), the setting unit 57 of the management server 5 generates an operation screen that receives an input operation for generating 3D shape information. The transmission and reception unit 51 transmits operation screen information for displaying the operation screen to the communication terminal 3 (Step S25).

The processing unit 53 of the management server 5 performs the Nth generation process based on the operation input information received in Step S11 in FIG. 7 (Step S26).

The determination unit 55 determines whether the Nth generation process has completed (Step S27). When the Nth generation process has not completed (NO in Step S27), the process returns to Step S26.

When determining that the Nth generation process has completed, the determination unit 55 determines whether the Nth generation process is the final generation process (Step S28). When the Nth generation process is not the final generation process, the setting unit 57 adds "1" to the sequence number N of the sequence of the generation processes (Step S29). Then, the process returns to Step S23.

When determining that the mode is not the manual mode in Step S24 (NO in Step S24), the determination unit 55 further determines whether the Nth generation process determined in Step S23 is set in the automatic mode (Step S30).

When the determination unit 55 determines that the mode is not the automatic mode (NO in Step S30), the setting unit 57 of the management server 5 generates an operation screen that receives an input operation for generating 3D shape information. The transmission and reception unit 51 transmits operation screen information for displaying the operation screen to the communication terminal 3 (Step S31). In another embodiment, instead of Step S30, the determination unit 55 determines whether the mode of the Nth generation processing determined in Step S23 is the mixed mode. When the mode is the mixed mode, the process proceeds to Step S31.

The processing unit 53 of the management server 5 performs the Nth generation process based on the operation input information received in Step S11 in FIG. 7 and the processing program associated with the processing setting information, retrieved from the generation-processing management DB 5002 (Step S32).

The determination unit 55 determines whether the Nth generation process has completed (Step S33). When the Nth generation process has not completed (NO in Step S33), the process returns to Step S32. When the Nth generation process has completed (YES in Step S33), the process proceeds to Step S28.

When the determination unit 55 determines that the mode is the automatic mode in Step S30, the processing unit 53 of the management server 5 performs the Nth generation process based on the processing program associated with the processing setting information, retrieved from the generation-processing management DB 5002 (Step S34).

The determination unit 55 determines whether the Nth generation process has completed (Step S35). When the Nth generation process has not completed (NO in Step S35), the process returns to Step S34. When the Nth generation process has completed (YES in Step S35), the process proceeds to Step S28.

Figure 10:
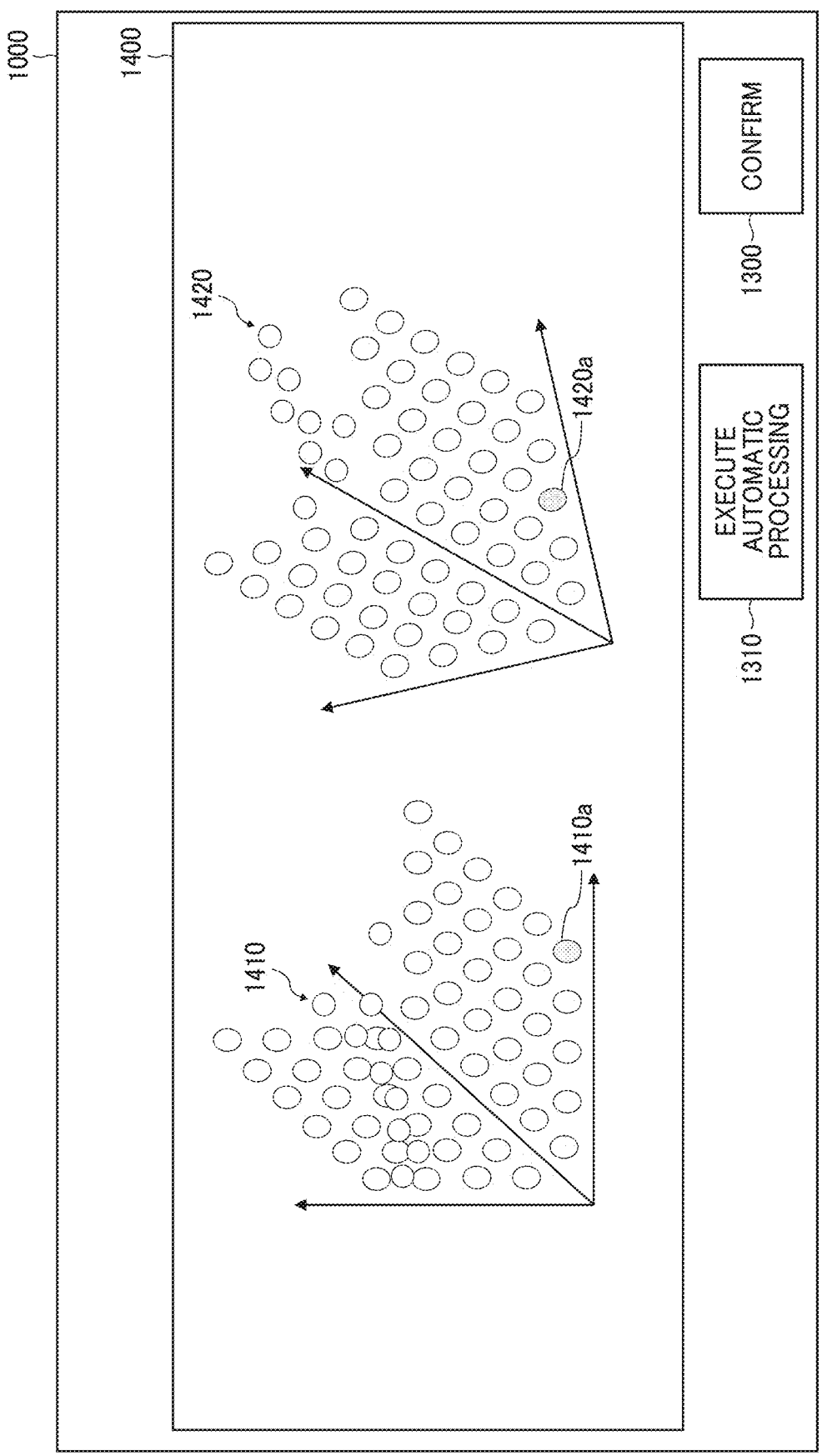
FIG. 10 is a diagram illustrating a registration process according to an embodiment of the present disclosure.

FIG. 10 is a diagram illustrating the registration according to the present embodiment.

FIGS. 10 to 13 each illustrate the display screen 1000, which is displayed on the display 308 of the communication terminal 3 in Step S10 of the sequence diagram in FIG. 7 when the mode is the mixed mode.

In FIGS. 10 to 13, the display control unit 34 of the communication terminal 3 displays an operation screen 1400, an automatic-processing execution button 1310, and a confirmation button 1300 on the display screen 1000.

The automatic-processing execution button 1310 is a setting-receiving display component that receives a setting operation instructing the management server 5 to execute a part of the generation processing by the processing program. When the mode is the manual mode, the automatic-processing execution button 1310 is not displayed. The operation input to the operation screen 1400 is an example of an input operation for executing the entire or part of the generation processing of 3D shape information.

In FIG. 10, the display control unit 34 of the communication terminal 3 displays, on the operation screen 1400, a first 3D point cloud 1410 and a second 3D point cloud 1420 as two-dimensional (2D) or 3D images. The user operates a pointing device such as the mouse 312 on the operation screen 1400 to perform the registration in various manners described below.

Manual Processing Only

On the operation screen 1400, the user moves the first 3D point cloud 1410 and the second 3D point cloud 1420 relative to one other by, for example, translation or rotation to overlap the first 3D point cloud 1410 with the second 3D point cloud 1420, aligns a feature point 1410a included in the first 3D point cloud 1410 with a feature point 1420a included in the second 3D point cloud 1420, and operates the confirmation button 1300. Then, the operation reception unit 32 of the communication terminal receives these input operations as the predetermined input operation on the displayed operation screen.

Then, the processing unit 53 of the management server 5 transforms the first 3D point cloud 1410 and the second 3D point cloud 1420 into one unified 3D point cloud based on the operation input information included in the input information received in Step S11 in FIG. 7, and ends the registration.

A skilled user selects a position to be a feature point and aligns the floors and the walls with reference to, for example, the density, an object, or a surface.

Alternatively, a position that can be a feature point is marked in each of the first 3D point cloud 1410 and the second 3D point cloud 1420 at the acquisition time thereof.

The first 3D point cloud 1410 is aligned with the second 3D point cloud 1420 such that the markers thereof overlap with one other.

Further, alignment is performed using, for example, a 3D mouse while viewing from various directions.

Manual Processing after Automatic Processing

When the user operates the automatic-processing execution button 1310 before inputting an operation to the operation screen 1400, the operation reception unit 32 receives setting information for the automatic-processing execution button 1310.

Then, based on the setting information included in the input information received in Step S11 in FIG. 7, the processing unit 53 of the management server 5 aligns the first 3D point cloud 1410 with the second 3D point cloud 1420 using the processing program for the registration retrieved from the generation-processing management DB 5002.

Subsequently, as in Step S9 in FIG. 7, the setting unit 57 of the management server 5 generates an operation screen including the first 3D point cloud 1410 and the second 3D point cloud 1420 aligned with each other by the processing program. The transmission and reception unit 51 transmits operation screen information for displaying the operation screen to the communication terminal 3.

When the user fine-tunes the relative positions between the first 3D point cloud 1410 and the second 3D point cloud 1420 aligned by the processing program and operates the confirmation button 1300, the processing unit 53 of the management server 5 transforms the first 3D point cloud 1410 and the second 3D point cloud 1420 whose relative positions have been fine-tuned by the user into one unified 3D point cloud and ends the registration.

Automatic Processing after Manual Processing

On the operation screen 1400, the user moves the first 3D point cloud 1410 and the second 3D point cloud 1420 relative to one other by, for example, translation or rotation to overlap the first 3D point cloud 1410 with the second 3D point cloud 1420, aligns the feature point 1410*a* included in the first 3D point cloud 1410 with the feature point 1420*a* included in the second 3D point cloud 1420, and operates the automatic-processing execution button 1310. Then, the operation reception unit 32 of the communication terminal receives these input operations as the predetermined input operation on the displayed operation screen and receives setting information to the automatic-processing execution button 1310.

Then, based on the operation input information and the setting information included in the input information received in Step S11 in FIG. 7, the processing unit 53 of the management server 5 fine-tunes the relative positions between the first 3D point cloud 1410 and the second 3D point cloud 1420, which have been aligned by the user, using the processing program for the registration retrieved from the generation-processing management DB 5002.

Subsequently, as in Step S9 in FIG. 7, the setting unit 57 of the management server 5 generates an operation screen including the first 3D point cloud 1410 and the second 3D point cloud 1420 whose relative positions are fine-tuned by the processing program. The transmission and reception unit 51 transmits operation screen information for displaying the operation screen to the communication terminal 3.

When the user checks the first 3D point cloud 1410 and the second 3D point cloud 1420 whose relative positions have been fine-tuned by the processing program and operates the confirmation button 1300, the processing unit 53 of the management server 5 transforms the first 3D point cloud 1410 and the second 3D point cloud 1420 whose relative positions have been fine-tuned by the processing program into one unified 3D point cloud and ends the registration.

Figure 11:
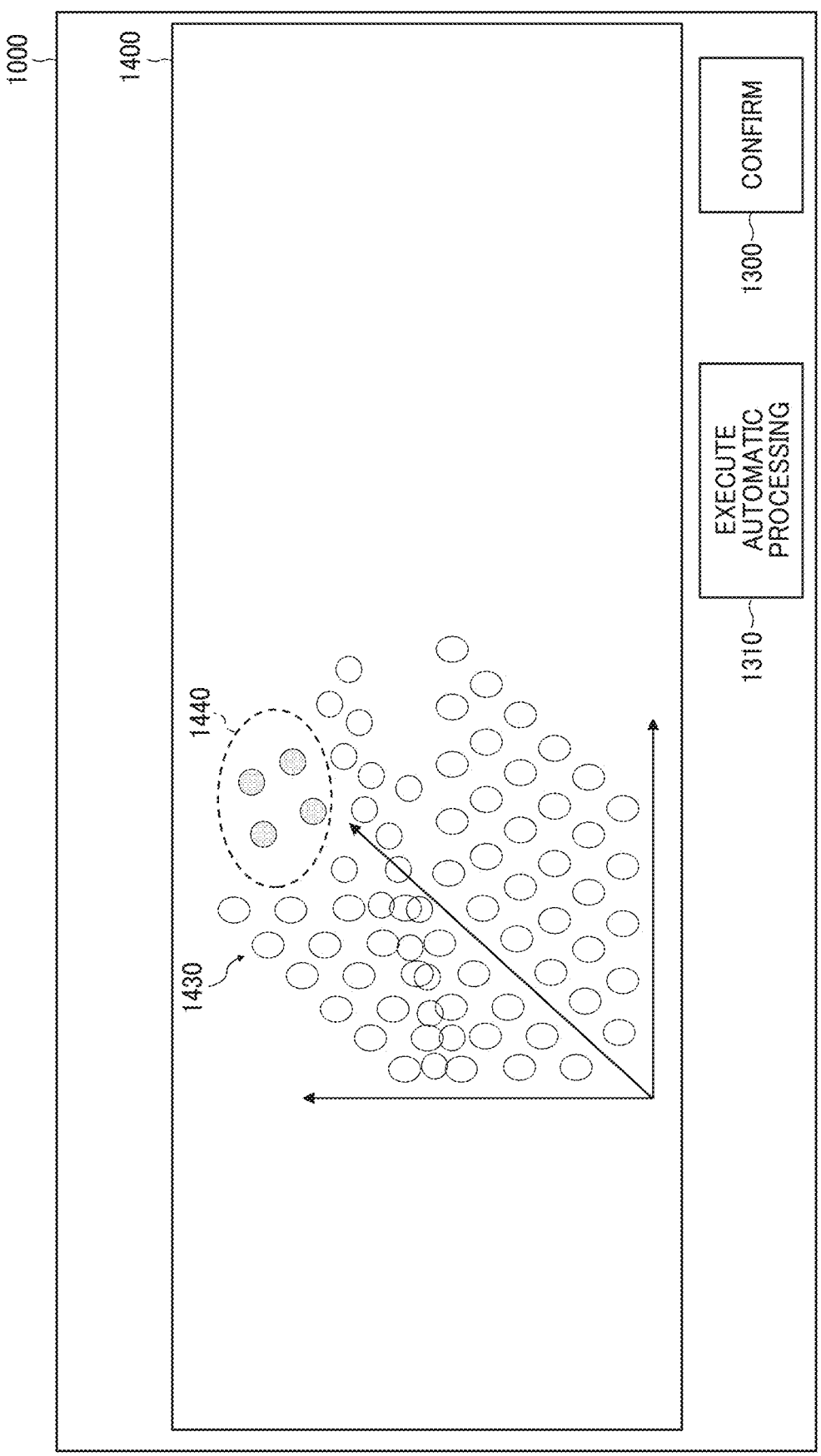
FIG. 11 is a diagram illustrating a noise removal process according to an embodiment of the present disclosure.

FIG. 11 is a diagram illustrating the noise removal according to the present embodiment.

In FIG. 11, the display control unit 34 of the communication terminal 3 displays, on the operation screen 1400, a 3D point cloud 1430 as 2D or 3D images. The user operates a pointing device such as the mouse 312 on the operation screen 1400 to perform the noise removal in various manners described below.

Manual Processing Only

When the user selects an unnecessary point cloud 1440 in the 3D point cloud 1430 and operates the confirmation button 1300, the operation reception unit 32 receives these input operations as a predetermined input operation to the displayed operation screen.

The processing unit 53 of the management server 5 removes unnecessary point cloud 1440 from the 3D point cloud 1430 based on the operation input information included in the input information received in Step S11 in FIG. 7 and ends the noise removal.

Manual Processing after Automatic Processing

When the user operates the automatic-processing execution button 1310 before inputting an operation to the operation screen 1400, the operation reception unit 32 receives setting information for the automatic-processing execution button 1310.

Then, based on the setting information included in the input information received in Step S11 in FIG. 7, the processing unit 53 of the management server 5 selects the unnecessary point cloud 1440 from the 3D point cloud 1430 using the processing program for the noise removal, retrieved from the generation-processing management DB 5002.

Subsequently, as in Step S9 in FIG. 7, the setting unit 57 of the management server 5 generates an operation screen including the 3D point cloud 1430 and the unnecessary point cloud 1440 selected by the processing program. The transmission and reception unit 51 transmits operation screen information for displaying the operation screen to the communication terminal 3.

When the user fine-tunes the area of the unnecessary point cloud 1440 selected by the processing program and operates the confirmation button 1300, the processing unit 53 of the management server 5 removes the unnecessary point cloud 1440 whose area has been fine-tuned by the user from the 3D point cloud 1430, and ends the noise removal. For example, the user expands or reduces the area of the unnecessary point cloud 1440 selected by the processing unit 53, or removes or adds some points to or from the area of the unnecessary point cloud 1440 selected by the processing unit 53.

Automatic Processing after Manual Processing

When the user selects the unnecessary point cloud 1440 in the 3D point cloud 1430 and operates the automatic-processing execution button 1310, the operation reception unit 32 receives these input operations as the predetermined input operation by the user to the displayed operation screen and the setting information to the automatic-processing execution button 1310.

Then, based on the operation input information and the setting information included in the input information received in Step S11 in FIG. 7, the processing unit 53 of the management server 5 fine-tunes the area of the unnecessary point cloud 1440 selected by the user using the processing program for the noise removal, retrieved from the generation-processing management DB 5002. For example, the processing unit 53 expands or reduces the area of the unnecessary point cloud 1440 selected by the user, or adds or removes some points to or from the area of the unnecessary point cloud 1440 selected by the user.

Subsequently, as in Step S9 in FIG. 7, the setting unit 57 of the management server 5 generates an operation screen including the 3D point cloud 1430 and the unnecessary point cloud 1440 whose area has been fine-tuned by the processing program. The transmission and reception unit 51 transmits operation screen information for displaying the operation screen to the communication terminal 3.

The user checks the unnecessary point cloud 1440 whose area has been fine-tuned by the processing program and operates the confirmation button 1300, the processing unit 53 of the management server 5 removes the unnecessary point cloud 1440 whose area has been fine-tuned by the processing program from the 3D point cloud 1430, and ends the noise removal.

FIG. 12 is a diagram illustrating the segmentation according to the present embodiment.

In FIG. 12, the display control unit 34 of the communication terminal 3 displays, on the operation screen 1400, the 3D point cloud 1430 as a 2D or 3D image. The user operates a pointing device such as the mouse 312 on the operation screen 1400 to perform the segmentation in various manners described below.

Manual Processing Only

When the user labels certain points in the 3D point cloud 1430, thereby generating a labeled point cloud 1450 (black circles in FIG. 12), and operates the confirmation button 1300, the operation reception unit 32 receives the predetermined input operation by the user to the displayed operation screen.

Then, the processing unit 53 of the management server 5 confirms the labeled point cloud 1450 based on the operation input information included in the input information received in Step S11 in FIG. 7, and ends the segmentation.

Manual Processing after Automatic Processing

When the user operates the automatic-processing execution button 1310 before inputting an operation to the operation screen 1400, the operation reception unit 32 receives setting information for the automatic-processing execution button 1310.

Then, based on the setting information included in the input information received in Step S11 in FIG. 7, the processing unit 53 of the management server 5 labels certain points in the 3D point cloud 1430, thereby generating the labeled point cloud 1450, using the processing program for the segmentation, retrieved from the generation-processing management DB 5002.

Subsequently, as in Step S9 in FIG. 7, the setting unit 57 of the management server 5 generates an operation screen including the 3D point cloud 1430 and the labeled point cloud 1450 generated by the processing program. The transmission and reception unit 51 transmits operation screen information for displaying the operation screen to the communication terminal 3.

When the user fine-tunes the labeled point cloud 1450 generated by the processing program and operates the confirmation button 1300, the processing unit 53 of the management server 5 confirms the labeled point cloud 1450 having been fine-tuned by the user and ends the segmentation.

Automatic Processing after Manual Processing

When the user labels certain points in the 3D point cloud 1430, thereby generating the labeled point cloud 1450 (black circles in FIG. 12), and operates the automatic-processing execution button 1310, the operation reception unit 32 receives the predetermined input operation by the user to the displayed operation screen and the setting information to the automatic-processing execution button 1310.

Then, based on the operation input information and the setting information included in the input information received in Step S11 in FIG. 7, the processing unit 53 of the management server 5 fine-tunes the labeled point cloud 1450, which has been generated by the user, using the processing program for the segmentation retrieved from the generation-processing management DB 5002.

Subsequently, as in Step S9 in FIG. 7, the setting unit 57 of the management server 5 generates an operation screen including the 3D point cloud 1430 and the labeled point cloud 1450 fine-tuned by the processing program. The transmission and reception unit 51 transmits operation screen information for displaying the operation screen to the communication terminal 3.

When the user checks the labeled point cloud 1450 fine-tuned by the processing program and operates the confirmation button 1300, the processing unit 53 of the management server 5 confirms the labeled point cloud 1450 having been fine-tuned by the processing program and ends the segmentation.

FIG. 13 is a diagram illustrating the modeling according to the present embodiment.

The modeling is the process of collating a particular area within the 3D point clouds with a model shape and replacing the particular area with the model shape.

In FIG. 13, the display control unit 34 of the communication terminal 3 displays, on the operation screen 1400, the 3D point cloud 1430 and model information 1460 including multiple model shapes 1461, 1462, and 1463 having different shapes, displayed as 2D or 3D images. On the operation screen 1400, the user operates the pointing device such as the mouse 312 to perform the modeling in various manners described below.

Manual Processing Only

The user collates the labeled point cloud 1450 (i.e., a particular area) in the 3D point cloud 1430 with the model shapes 1461, 1462, and 1463, selects the model shape to replace the particular area, and operates the confirmation button 1300. Then, the operation reception unit 32 receives the predetermined input operation to the displayed operation screen. When no optimum model shape is present, the user may adjust the size and shape of the selected model shape. In the present embodiment, for example, the distance between the model shape and each point of the point cloud is calculated, and the model shape having the smallest sum of the distances is determined as the optimum model shape.

Then, the processing unit 53 of the management server 5 replaces the labeled point cloud 1450 with the model shape based on the operation input information included in the input information received in Step S11 in FIG. 7, and ends the modeling.

As a result, even when the 3D point cloud 1430 includes a missing point area where some points are missing, the user can perform the modeling while considering the missing point area.

Specifically, when an area is divided into two areas by a missing point area, the processing program for the modeling replaces the two areas with two model shapes. By contrast, the user can treat the missing point area as an area having points and replace the divided areas with one model shape including the two areas.

Manual Processing after Automatic Processing

When the user operates the automatic-processing execution button 1310 before inputting an operation to the operation screen 1400, the operation reception unit 32 receives setting information for the automatic-processing execution button 1310.

Then, based on the setting information included in the input information received in Step S11 in FIG. 7, the processing unit 53 of the management server 5 collates a particular area within the 3D point cloud 1430 with the multiple model shapes 1461, 1462, and 1463 and selects one of the multiple model shapes 1461, 1462, and 1463 by the processing program for the modeling, retrieved from the generation-processing management DB 5002.

Subsequently, as in Step S9 in FIG. 7, the setting unit 57 of the management server 5 generates an operation screen including the 3D point cloud 1430 and the model shape selected by the processing program. The transmission and reception unit 51 transmits operation screen information for displaying the operation screen to the communication terminal 3.

The user may fine-tune the dimension or shape of the model shape selected by the processing program or replace the selected model shape with another model shape. When the confirmation button 1300 is operated, the processing unit 53 of the management server 5 replaces the labeled point cloud 1450 with the model shape fine-tuned and confirmed by the user, and ends the modeling.

Automatic Processing after Manual Processing

The user collates the labeled point cloud 1450 within the 3D point cloud 1430 with the multiple model shapes 1461, 1462, and 1463, selects one of the multiple model shapes 1461, 1462, and 1463, and operates the automatic-processing execution button 1310. Then, the operation reception unit 32 of the communication terminal receives these input operations as the predetermined input operation by the user to the displayed operation screen and the setting information to the automatic-processing execution button 1310.

Then, based on the operation input information and the setting information included in the input information received in Step S11 in FIG. 7, the processing unit 53 of the management server 5 fine-tunes the dimension or shape of the model shape selected by the user by the processing program for the modeling, retrieved from the generation-processing management DB 5002.

Subsequently, as in Step S9 in FIG. 7, the setting unit 57 of the management server 5 generates an operation screen including the 3D point cloud 1430 and the model shape adjusted by the processing program. The transmission and reception unit 51 transmits operation screen information for displaying the operation screen to the communication terminal 3.

When the user checks the model shape adjusted by the processing program and operates the confirmation button 1300, the processing unit 53 of the management server 5 replaces the labeled point cloud 1450 with the model shape adjusted by the processing program, and ends the modeling.

FIGS. 14A and 14B are diagrams each illustrating an operation screen in the 3D shape generation processing according to the present embodiment.

The display control unit 34 of the communication terminal 3 can further display an image information display screen 1600 on the display screen 1000 illustrated in FIGS. 10 to 13.

In FIGS. 14A and 14B, the display control unit 34 displays 3D point clouds 1430A, 1430B, and 1430C on the operation screen 1400 on the display screen 1000 and image information 1660A, 1660B, and 1660C respectively having coordinates corresponding to the 3D point clouds 1430A, 1430B, and 1430C on the image information display screen 1600.

Accordingly, the user can efficiently and accurately perform the various generation processes illustrated in FIGS. 10 to 13 on the 3D point clouds 1430A, 1430B, and 1430C while checking the image information 1660A, 1660B, and 1660C.

Figure 15:
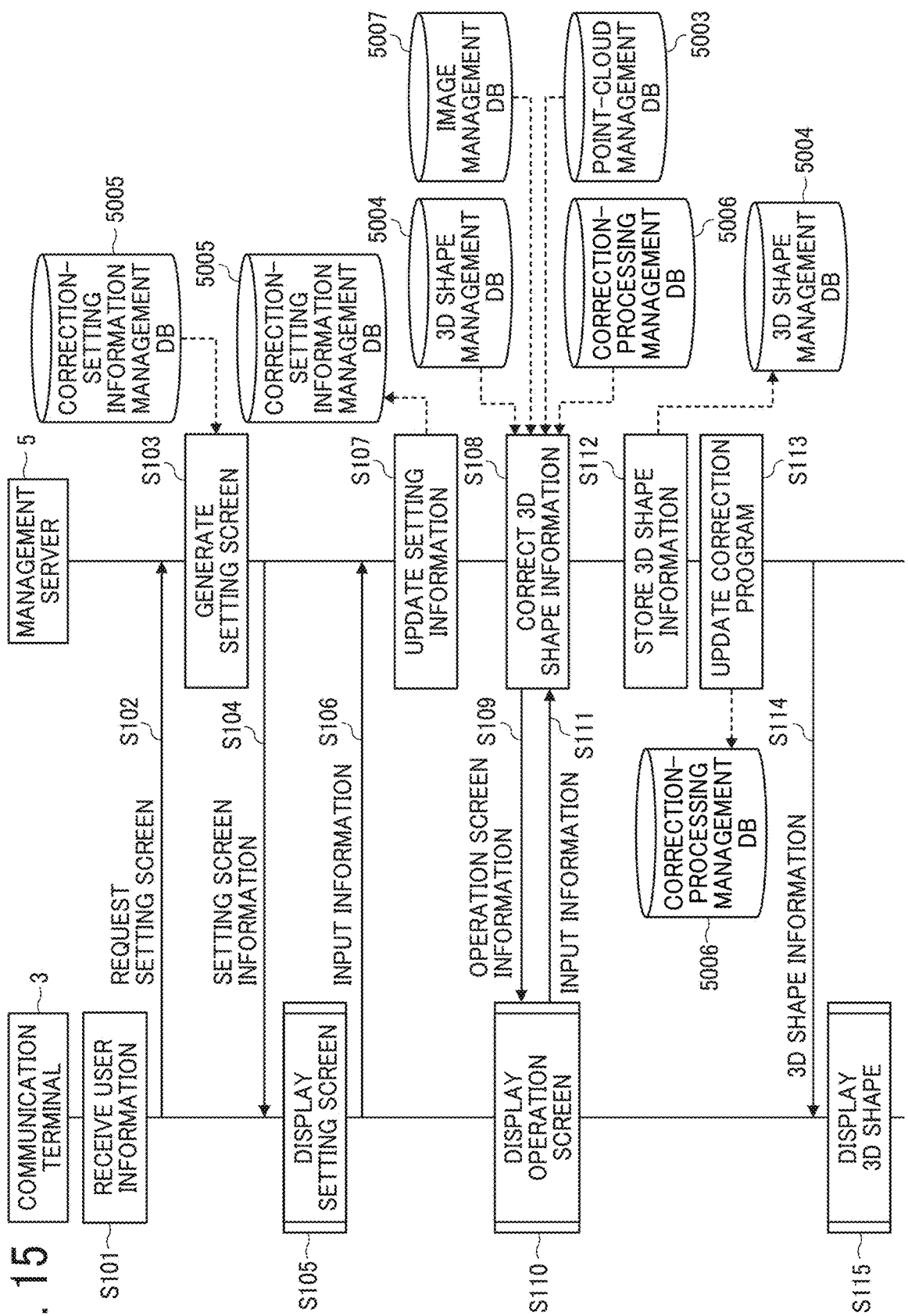
FIG. 15 is a sequence diagram of 3D shape correction processing according to an embodiment of the present disclosure.

FIG. 15 is a sequence diagram of 3D shape correction processing according to the present embodiment.

The operation reception unit 32 of the communication terminal 3 receives an operation for inputting information of the user, on an input/output screen displayed on the display 308 (Step S101). The transmission and reception unit 31 of the communication terminal 3 transmits to the management server 5 a request for a correction-setting screen including the user information received in Step S101. The transmission and reception unit 51 of the management server 5 receives the request from the communication terminal 3 (Step S102).

The storing and reading unit 59 of the management server 5 searches the correction-setting information management DB 5005 using the user information included in the request received in Step S102 as a search key to retrieve the file name of a 3D shape information, the execution sequence of correction process, and the mode of the correction process associated with the user information included in the request. The setting unit 57 of the management server 5 generates a correction-setting screen based on the file name, the execution sequence, and the mode retrieved by the storing and reading unit 59 (Step S103).

The correction-setting screen includes a 3D shape setting screen, a correction-processing setting screen, and an instruction-receiving display component. The 3D shape setting screen receives an operation for setting 3D shape information of a target to be corrected. The correction-processing setting screen receives an operation for setting the execution sequence and the mode of a part of part of correction processes of the 3D shape information. The instruction-receiving display component receives an operation designating first correction processing or second correction processing.

The transmission and reception unit 51 transmits to the communication terminal 3 screen information for displaying the correction-setting screen generated in Step S103. The transmission and reception unit 31 of the communication terminal 3 receives the screen information from the management server 5 (Step S104). Step S104 is an example of transmitting screen information for displaying the instruction-receiving screen. The transmission and reception unit 51 is an example of the transmission means.

Subsequently, the display control unit 34 of the communication terminal 3 displays on the display 308 the correction-setting screen based on the screen information received in Step S104 (Step S105). The operation reception unit 32 of the communication terminal 3 receives an input operation performed by the user on the correction-setting screen displayed. The input operation includes the 3D shape setting operation, the processing setting operation, and the instruction operation designating the first correction processing or the second correction processing. Step S105 is an example of receiving an instruction operation designating the first correction processing or the second correction processing.

The transmission and reception unit 31 transmits to the management server 5 input information corresponding to the input operation received by the operation reception unit 32.

The transmission and reception unit 51 of the management server 5 receives the input information from the communication terminal 3 (Step S106). The input information includes 3D shape setting information indicating the information set by the 3D shape setting operation and processing setting information indicating the execution sequence and the mode of the correction processes set by the processing setting operation.

The storing and reading unit 59 of the management server 5 updates the execution sequence and the mode of the correction, which are stored in association with the user information in the correction-setting information management DB 5005, based on the processing setting information included in input information received in Step S106 (Step S107).

Subsequently, the storing and reading unit 59 of the management server 5 searches the 3D shape management DB 5004 using the 3D shape setting information included in the input information received in Step S106 as a search key to retrieve the 3D shape information associated with the 3D shape setting information. The storing and reading unit 59 further retrieves from the point-cloud management DB 5003 the 3D point cloud having been used to generate the 3D shape information retrieved from the 3D shape management DB 5004, and retrieves from the image management DB 5007 the image data having coordinates corresponding to the 3D point cloud retrieved from the point-cloud management DB 5003.

The storing and reading unit 59 searches the correction-processing management DB 5006 using the mode of the correction in the processing setting information included in the input information received in Step S106 as a search key, thereby retrieving the processing program associated with the processing setting information. The processing unit 53 of the management server 5 corrects the 3D shape information based on the 3D shape information, the 3D point-cloud data, the image data, and the processing program retrieved by the storing and reading unit 59, and the execution sequence and the mode in the processing setting information included in the input information received in Step S106 (Step S108).

Step S108 is an example of executing the first correction processing or the second correction processing based on the 3D shape information indicating a 3D shape and the instruction operation received by the instruction-receiving display component that receives the instruction operation designating the first correction processing or the second correction processing.

When the mode specified in the processing setting information includes the manual mode or the mixed mode in which the manual processing is performed, the setting unit 57 of the management server 5 generates an operation screen that receives an input operation for correcting 3D shape information. The transmission and reception unit 51 transmits screen information for displaying the operation screen to the communication terminal 3 (Step S109).

The setting unit 57 generates an operation screen that displays the 3D shape information retrieved in Step S108, a point-cloud display screen that displays the 3D point-cloud data retrieved in Step S108, and an image information display screen that displays the image data retrieved in Step S8. The transmission and reception unit 51 transmits to the communication terminal 3 display screen information for displaying the point-cloud display screen and the image information display screen in addition to the operation screen information.

The transmission and reception unit 31 of the communication terminal 3 receives the operation screen information and the display screen information from the management server 5. The display control unit 34 of the communication terminal 3 displays on the display 308 the operation screen, the point-cloud display screen, and the image information display screen based on the screen information received from the management server 5. The operation reception unit 32 of the communication terminal 3 receives a predetermined operation input by the user on the operation screen (Step S110).

The input operation includes an input operation for executing the entire or part of the correction processes of 3D shape information.

The transmission and reception unit 31 transmits to the management server 5 input information corresponding to the input operation received by the operation reception unit 32. The transmission and reception unit 51 of the management server 5 receives the input information from the communication terminal 3 (Step S111).

The input information includes an operation input information by the input operation for executing the entire or part of the correction processes of 3D shape information. The processing unit 53 of the management server 5 corrects the 3D shape information based on the operation input information included in the input information received in Step S111.

The operation input information is an example of history information indicating the history of input operation for executing the first correction processing by the 3D information correction means.

The communication terminal 3 and the management server 5 repeat the process from Step S108 to Step S111 as desired.

The processing unit 53 converts the corrected 3D shape information into, for example, CAD format. The storing and reading unit 59 stores the converted 3D shape information in the 3D shape management DB 5004, the medium 506, or the CD-RW 513 (Step S112). The CAD format is 3D shape information that can be manipulated by 3D CAD software. When the 3D shape information is manipulated with commercially available 3D CAD software, the 3D shape information is converted into the 3D CAD format.

The storing and reading unit 59 updates the processing program stored in the correction-processing management DB 5006 based on the input operation for executing the entire or part of the correction processes of 3D shape information in Step S110 (Step S113).

The storing and reading unit 59 is an example of an updating means that updates the stored processing based on the history information of the first correction processing executed by the 3D information correction means.

The transmission and reception unit 51 transmits the determined 3D shape information to the communication terminal 3 (Step S114). The transmission and reception unit 31 of the communication terminal 3 receives the 3D shape information from the management server 5. The display control unit 34 of the communication terminal displays on the display 308 the 3D shape represented by the received 3D shape information (Step S115).

In some embodiments, the functional units of the management server 5 in FIG. 4 are integrated into the communication terminal 3, and the processing performed by the management server 5 described with reference to FIG. 15 is executed by the communication terminal 3.

Figure 16:
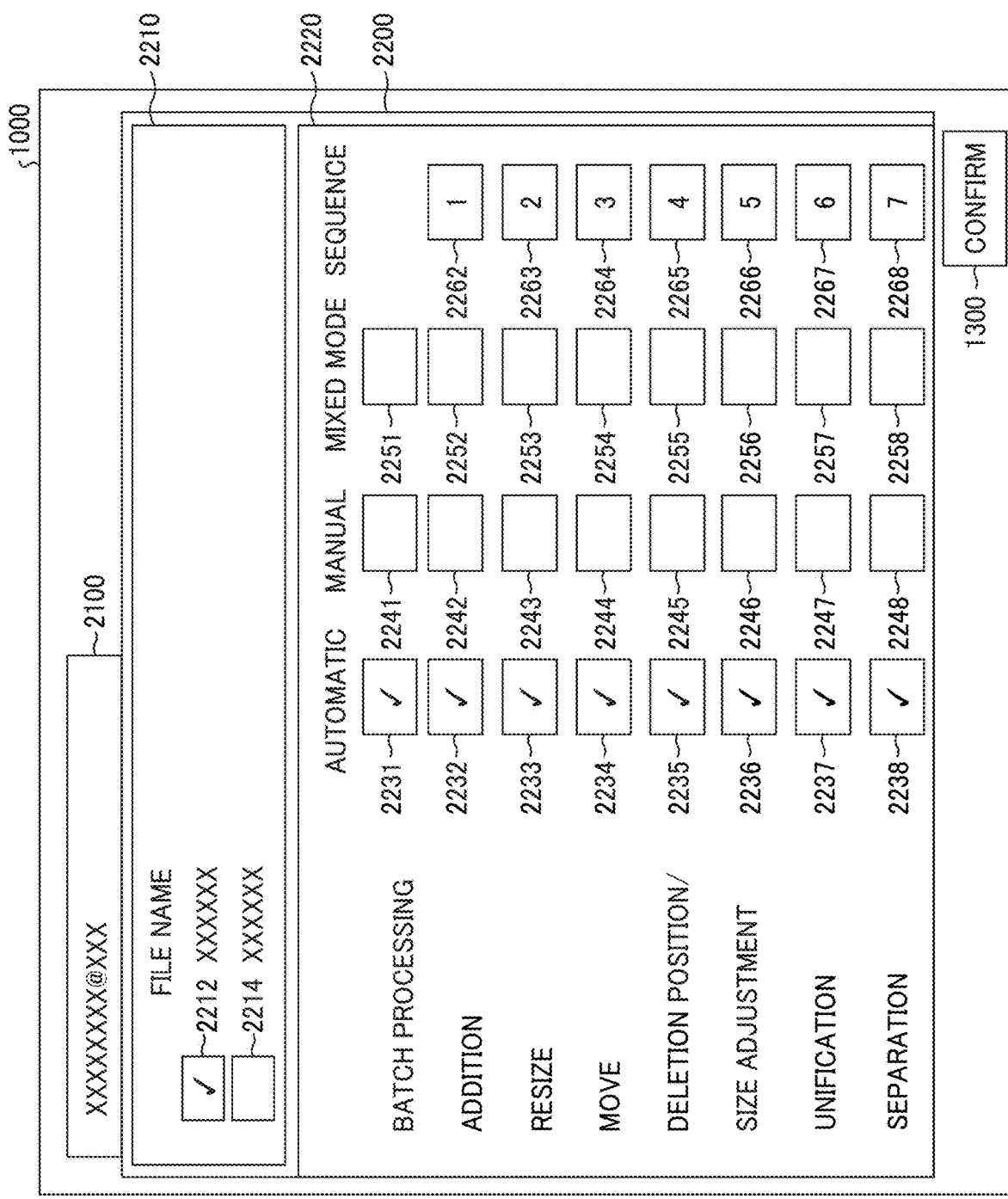
FIG. 16 is a diagram illustrating a correction-setting screen according to an embodiment of the present disclosure.

FIG. 16 is a diagram illustrating the correction-setting screen according to the present embodiment. FIG. 16 illustrates the display screen 1000 displayed on the display 308 of the communication terminal 3 in Step S105 of the sequence diagram in FIG. 15.

The display control unit 34 of the communication terminal 3 displays a user information section 2100, a correction-setting screen 2200, and the confirmation button 1300 on the display screen 1000. The confirmation button 1300 is an example of the instruction-receiving display component for receiving an instruction.

The correction-setting screen 2200 includes a 3D shape setting screen 2210 and a correction-processing setting screen 2220.

The 3D shape setting screen 2210 is a screen that receives an operation for setting 3D shape information indicating a 3D shape to be corrected. The display control unit 34 displays 3D shape setting boxes 2212 and 2214 in association with the respective file names of the multiple 3D shape information retrieved by the storing and reading unit 59. Multiple setting boxes (e.g., 2212 and 2214) can be set for 3D shapes.

The correction-processing setting screen 2220 is a screen that receives an operation for setting the execution sequence and the mode of a part of correction processes of 3D shape information.

The correction-processing setting screen 2220 includes checkboxes for setting the automatic mode for correcting 3D shape information based on the stored processing and without being based on an input operation. The checkboxes include an automatic-mode batch setting box 2231 and automatic-mode setting boxes 2232 to 2238 for model addition, model resizing, model moving, model deletion, model position alignment, model unification, and model separation.

The correction-processing setting screen 2220 further includes checkboxes for setting the manual mode for correcting 3D shape information based on an input operation and without being based on the stored processing. The checkboxes include a manual-mode batch setting box 2241 and manual-mode setting boxes 2242 to 2248 for model addition, model resizing, model moving, model deletion, model position alignment, model unification, and model separation.

The correction-processing setting screen 2220 further includes checkboxes for setting the mixed mode for correcting 3D shape information based on an input operation and the stored processing. The checkboxes include a mixed-mode batch setting box 2251 and mixed-mode setting boxes 2252 to 2258 for model addition, model resizing, model moving, model deletion, model position alignment, model unification, and model separation.

The correction-processing setting screen 2220 also includes sequence number setting boxes 2262 to 2268 used to individually set the sequence of multiple correction processes, i.e., the model addition, model resizing, model moving, model deletion, model position alignment, model unification, and model separation processes.

The automatic-mode batch setting box 2231 is an operation-receiving display component that receives a setting operation for collectively setting the automatic-mode setting boxes 2232 to 2238.

The automatic-mode setting boxes 2232 to 2238 are display components for individually receiving an operation for setting the execution of automatic processing of model addition, model resizing, model moving, model deletion, model position alignment, model unification, and model separation.

The manual-mode batch setting box 2241 is an operation-receiving display component that receives a setting operation for collectively setting the manual-mode setting boxes 2242 to 2248.

The manual-mode setting boxes 2242 to 2248 are display components for individually receiving an operation for setting the execution of manual processing of model addition, model resizing, model moving, model deletion, model position alignment, model unification, and model separation.

The mixed-mode batch setting box 2251 is an operation-receiving display component that receives a setting operation for collectively setting the mixed-mode setting boxes 2252 to 2258.

The mixed-mode setting boxes 2252 to 2258 are display components for individually receiving an operation for setting the execution of mixed processing of model addition, model resizing, model moving, model deletion, model position alignment, model unification, and model separation.

The sequence number setting boxes 2262 to 2268 are operation-receiving display components for individually receiving an operation for designating the sequence of model addition, model resizing, model moving, model deletion, model position alignment, model unification, and model separation.

In response to receiving the pointing of any of the various setting boxes by a pointing device such as the mouse 312 (see FIG. 3), the display control unit 34 displays a tick mark in the selected box. The operation reception unit 32 receives various setting operations and fixes the setting when the confirmation button 1300 is operated.

As described in Step S106 of FIG. 15, the transmission and reception unit 31 transmits to the management server 5 input information including the information on the various settings made by various setting operations received by the operation reception unit 32.

In another embodiment, the correction-processing setting screen 2220 may be configured to receive an operation for individually designating multiple executions of the model addition, model resizing, model moving, model deletion, model position alignment, model unification, and model separation processes.

When a setting operation is not performed on any of the automatic-mode batch setting box 2231, the manual-mode batch setting box 2241, the mixed-mode batch setting box 2251, the automatic-mode setting box 2232, the manual-mode setting box 2242, and the mixed-mode setting box 2252, not executing the model addition process is set. This also applies to the model resizing, model moving, model deletion, model position alignment, model unification, and model separation processes.

Figure 17:
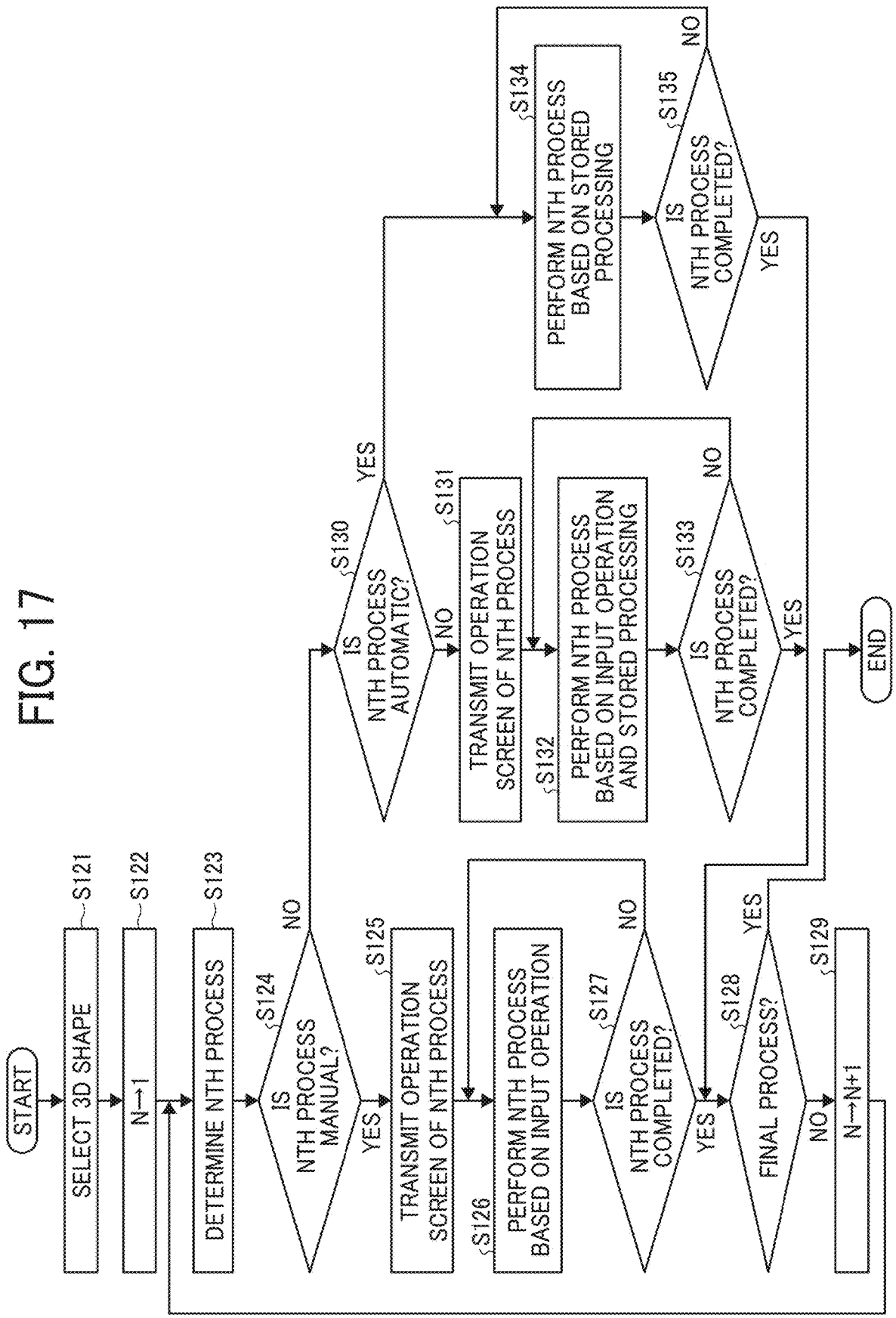
FIG. 17 is a flowchart of 3D shape correction processing according to an embodiment of the present disclosure.

FIG. 17 is a flowchart of 3D shape correction processing according to the present embodiment and illustrate the operation in Step S108 of FIG. 15.

The processing unit 53 of the management server 5 acquires the 3D shape information retrieved by the storing and reading unit 59 (Step S121). The setting unit 57 sets to 1 the sequence number N of the correction process to be executed (Step S122).

The setting unit 57 determines the Nth process in the correction based on the execution sequence of the correction included in the processing setting information received in Step S16 (Step S123).

Based on the mode of the correction included in the processing setting information received in Step S16, the determination unit 55 determines whether the mode of the Nth process determined in Step S123 is the manual mode (Step S124).

When the determination unit 55 determines that the Nth process is to be executed in the manual mode (YES in Step S124), the setting unit 57 of the management server 5 generates an operation screen that receives an input operation for correcting 3D shape information. The transmission and reception unit 51 transmits operation screen information for displaying the operation screen to the communication terminal 3 (Step S125).

The processing unit 53 of the management server 5 performs the Nth correction process based on the operation input information received in Step S111 (Step $126).

The determination unit 55 determines whether the Nth correction process has completed (Step S127). When the Nth correction process has not completed (NO in Step S127), the process returns to Step S126.

When determining that the Nth correction process has completed, the determination unit 55 determines whether the Nth correction process is the final correction process (Step S128). When the Nth correction process is not the final correction process, the setting unit 57 adds "1" to the sequence number N of the sequence of the correction process to be executed (Step S129). Then, the process returns to Step S123.

When determining that the mode is not the manual mode in Step S124, the determination unit 55 further determines whether the Nth correction process determined in Step S123 is set in the automatic mode (Step S130).

When the determination unit 55 determines that the mode is not the automatic mode, the setting unit 57 of the management server 5 generates an operation screen that receives an input operation for correcting 3D shape information. The transmission and reception unit 51 transmits operation screen information for displaying the operation screen to the communication terminal 3 (Step S131). In another embodiment, instead of Step S130, the determination unit 55 determines whether the mode of the Nth correction processing determined in Step S123 is the mixed mode. When the mode is the mixed mode, the process proceeds to Step S131.

The processing unit 53 of the management server 5 performs the Nth correction process based on the operation input information received in Step S111 and the processing program associated with the processing setting information, retrieved from the correction-processing management DB 5006 (Step S132).

The determination unit 55 determines whether the Nth correction process has completed (Step S133). When the Nth correction process has not completed, the process returns to Step S132. When the Nth correction process has completed, the process proceeds to Step S128.

When the determination unit 55 determines that the mode is the automatic mode in Step S130, the processing unit 53 of the management server 5 performs the Nth correction process based on the processing program associated with the processing setting information, retrieved from the correction-processing management DB 5006 (Step S134).

The determination unit 55 determines whether the Nth correction process has completed (Step S135). When the Nth correction process has not completed, the process returns to Step S134. When the Nth correction process has completed, the process proceeds to Step S128.

FIGS. 18A to 31C each illustrate the display screen 1000, which is displayed on the display 308 of the communication terminal 3 in Step S110 of the sequence diagram in FIG. 15 when the mode is the mixed mode.

In FIGS. 18A to 31C, the display control unit 34 of the communication terminal 3 displays the operation screen 1400, the automatic-processing execution button 1310, and the confirmation button 1300 on the display screen 1000.

The automatic-processing execution button 1310 is a setting-receiving display component that receives a setting operation instructing the management server 5 to execute a part of the generation processing by the processing program. When the mode is the manual mode, the automatic-processing execution button 1310 is not displayed.

In FIGS. 18A to 31C, the display control unit 34 of the communication terminal 3 displays, on the operation screen 1400, the model information 1460 as a 2D or 3D image. The user operates a pointing device such as the mouse 312 on the operation screen 1400 to perform the correction process in various manners described below. The operation input to the operation screen 1400 is an example of an input operation for executing the entire or part of the correction processes of 3D shape information.

Manual Processing Only

When the user performs an input operation for correcting the model shape represented by the model information 1460 illustrated in FIGS. 18A to 31C on the operation screen 1400 and operates the confirmation button 1300, the operation reception unit 32 receives the input operation of the user on the displayed operation screen 1400.

Then, the processing unit 53 of the management server 5 corrects the model shape represented by the model information 1460 based on the operation input information included in the input information received in Step S111 in FIG. 15.

Manual Processing after Automatic Processing

When the user operates the automatic-processing execution button 1310 before inputting an operation to the operation screen 1400, the operation reception unit 32 receives setting information for the automatic-processing execution button 1310.

Then, based on the setting information included in the input information received in Step S111 in FIG. 15, the processing unit 53 of the management server 5 corrects the model shape represented by the model information 1460 using the processing program for the correction, retrieved from the correction-processing management DB 5006.

Subsequently, as in Step S109, the setting unit 57 of the management server 5 generates an operation screen including the model shape represented by the model information corrected by the processing program. The transmission and reception unit 51 transmits operation screen information for displaying the operation screen to the communication terminal 3.

The user may fine-tune the model shape corrected by the processing program or correct the model shape corrected by the processing program in a different method. When the confirmation button 1300 is operated, the processing unit 53 of the management server 5 receives the model shape fine-tuned and confirmed by the user, and ends the correction of the model shape.

Automatic Processing after Manual Processing

When the user performs an input operation for correcting the model shape represented by the model information 1460 illustrated in FIGS. 18A to 31C on the operation screen 1400 and operates the automatic-processing execution button 1310, the operation reception unit 32 receives the input operation of the user on the displayed operation screen 1400 and the setting information to the automatic-processing execution button 1310.

Then, based on the operation input information and the setting information included in the input information received in Step S111 in FIG. 15, the processing unit 53 of the management server 5 fine-tunes the model shape represented by the model information 1460 corrected by the user, using the processing program for the correction, retrieved from the correction-processing management DB 5006.

Subsequently, as in Step S109, the setting unit 57 of the management server 5 generates an operation screen including the 3D point cloud 1430 the model shape represented by the model information adjusted by the processing program. The transmission and reception unit 51 transmits operation screen information for displaying the operation screen to the communication terminal 3.

When the user checks the model shape adjusted by the processing program and operates the confirmation button 1300, the processing unit 53 of the management server 5 fixes the model shape adjusted by the processing program and ends the correction of the model shape.

The following three patterns are exemplified for the model addition, model resizing, model moving, and model deletion processes illustrated in FIGS. 18A to 29B in accordance with the model shape.

1. 2D processing for a flat surface, or 3D processing for a combination of flat surfaces such as a rectangular parallelepiped.
2. 2D processing for a curved surface or 3D processing for a combination of curved surfaces such as a sphere.
3. 3D processing for a combination of a flat surface and a curved surface such as a column.

The different patterns are presented because the way of processing changes depending on the model shape. For example, the model resizing is described. When the model shape is a frame, a side is the reference and the length of the side is changed to control the enlargement/reduction. When the model shape is a circle, the radius with respect to the center is changed to change the size.

For the model addition process illustrated in FIGS. 18A to 20C, the following three patterns of correction are exemplified.

1. Addition Using a Mouse

A model shape to be the reference is selected, and a model shape is added to a missing portion of the region encircled by the mouse 312, starting from the selected model shape.

2. Addition Using Closed Space

A model shape to be the reference is selected, a closed space is searched for starting from the selected model shape, and a model shape that fills the detected closed space is added.

3. Add Model from the Menu

A model shape to be added is selected from the menu and arranged at the corresponding position by using the mouse 312.

FIGS. 18A to 18C are diagrams each illustrating a model addition processes for a flat surface or a combination of flat surfaces, according to the present embodiment.

FIG. 18A illustrates a process of selecting the model information 1460 representing a planar model shape to be the reference and determining a closed region encircled by the mouse 312, starting from the selected model shape, as a missing portion 1460z.

FIG. 18B illustrates a process of selecting the model information 1460A to 1460D representing a group of planar model shapes to the reference and determining a closed region surrounded by the selected group of model shapes as the missing portion 1460z.

FIG. 18C illustrates a process of selecting model information 1460Z representing a planar model shape to be added from the menu and arranging the selected model shape in a space including the group of planar model shapes represented by the model information 1460A to 1460C.

FIGS. 19A to 19C are diagrams each illustrating model addition processes for a curved surface or a combination of curved surfaces, according to the present embodiment.

FIG. 19A illustrates a process of selecting the model information 1460 representing a spherical model shape to be the reference and determining a closed region encircled by the mouse 312, starting from the selected model shape, as the missing portion 1460z.

FIG. 19B illustrates a process of selecting the model information 1460A to 1460C representing a group of spherical model shapes to be the reference and determining a closed region surrounded by the selected group of model shapes as the missing portion 1460z.

FIG. 19C illustrates a process of selecting the model information 1460Z representing a spherical model shape to be added from the menu and arranging the selected model shape in a space including the group of spherical model shapes represented by the model information 1460A to 1460C.

FIGS. 20A, 20B, and 20C are diagrams each illustrating model addition processes for a combination of a flat surface and a curved surface, according to the present embodiment.

FIG. 20A illustrates a process of selecting the model information 1460 representing a columnar model shape to be the reference and determining a closed region encircled by the mouse 312, starting from the selected model shape, as the missing portion 1460z.

FIG. 20B illustrates a process of selecting the model information 1460A and 1460B representing a group of columnar model shapes to be the reference and determining a closed region between the selected group of model shapes as the missing portion 1460z.

FIG. 20C illustrates a process of selecting the model information 1460Z representing a columnar model shape to be added from the menu and arranging the selected model shape in a space including the group of columnar model shapes represented by the model information 1460A and 1460B.

Figure 21A:
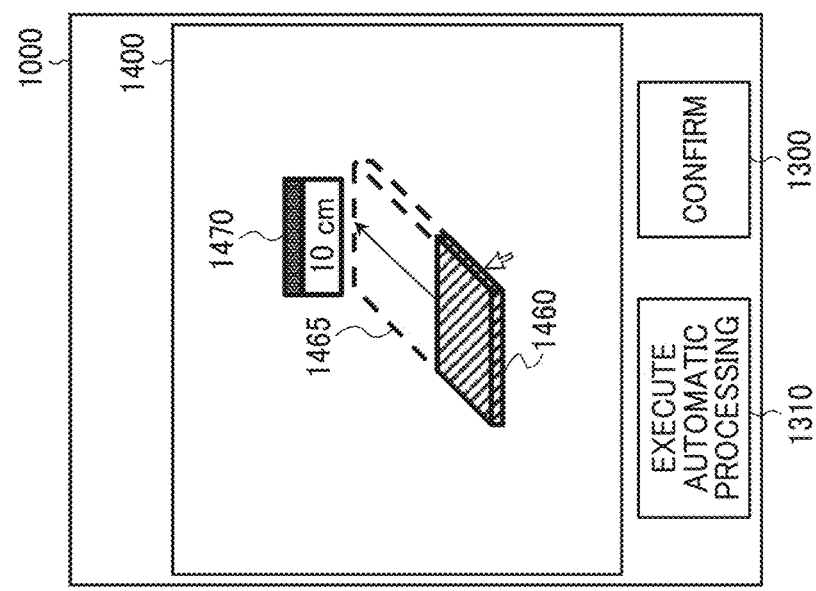
FIGS. 21A, 21B, and 21C are diagrams each illustrating a model resizing process for a flat surface or a combination of flat surfaces, according to an embodiment of the present disclosure.
Figure 21B:
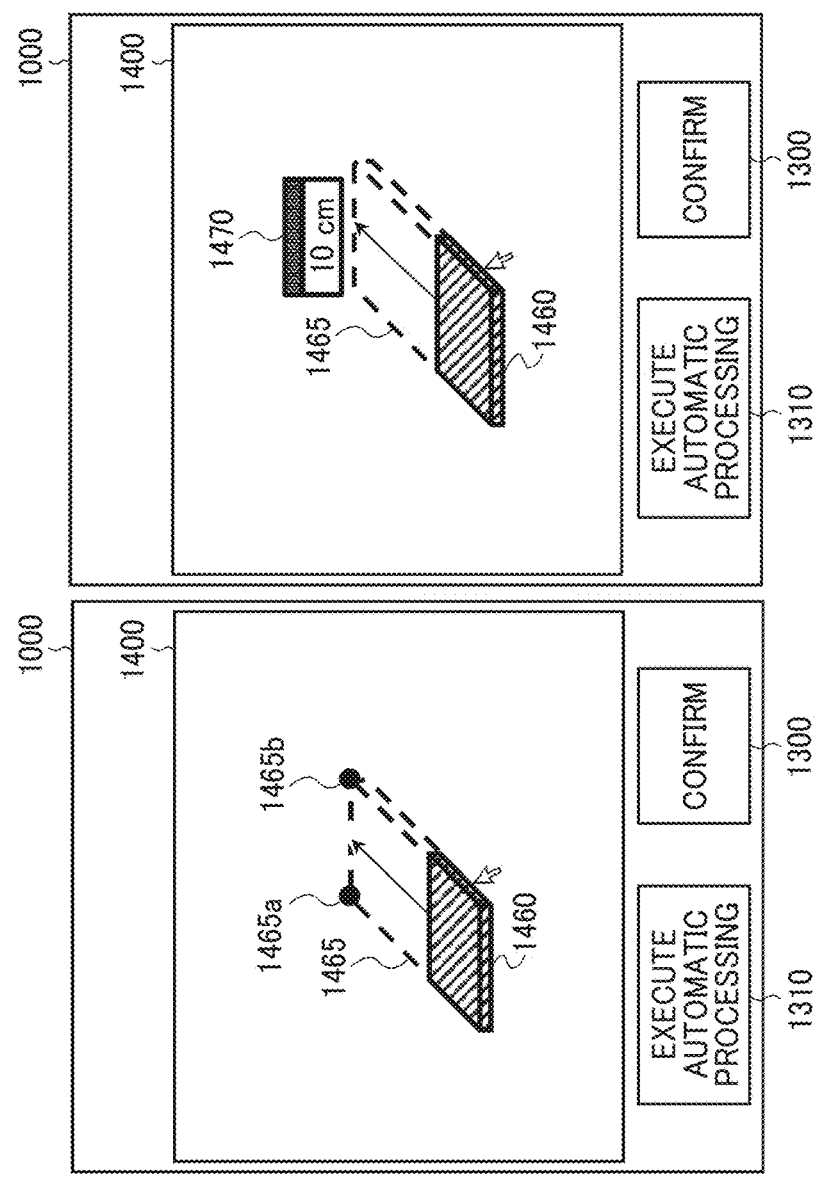
Figure 21C:
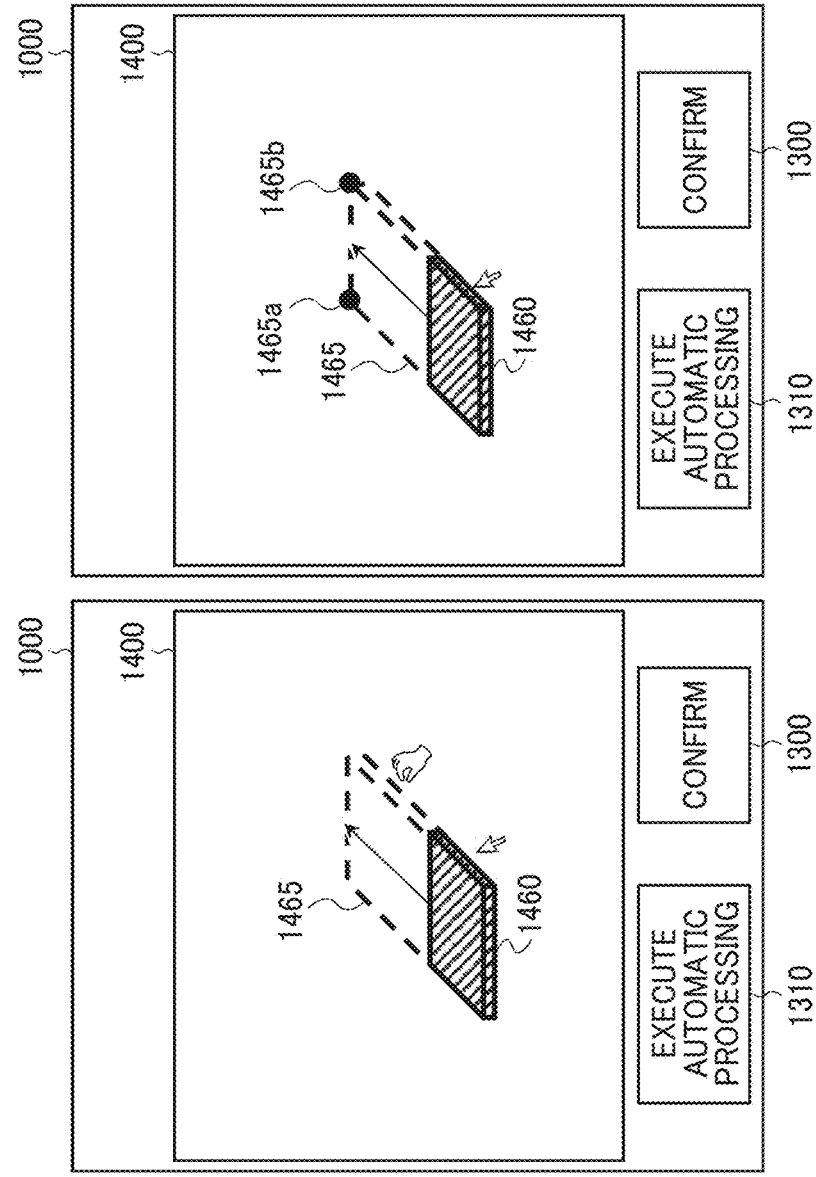

FIGS. 21A, 21B, and 21C are diagrams each illustrating a model resizing process for a flat surface or a combination of flat surfaces, according to the present embodiment. For the model resizing process illustrated in FIGS. 21A to 23C, the following three patterns of correction are exemplified.

1. Resizing Using a Mouse

A model shape to be the reference is selected, and the mouse 312a is dragged from the selected model shape to enlarge or reduce the model shape.

2. Resizing Using Endpoint Setting

A model shape to be the reference is selected, and the endpoints of the resized model shape starting from the selected model shape are set. The model shape is automatically resized such that the endpoints of the reference model shape match the set endpoints.

3. Resizing by Numerical Input

A model shape to be the reference is selected, the size of the resized model shape is input to an entry field, a side or an endpoint to be changed is selected, and the model shape is automatically resized such that the resized model shape matches the input numerical value. FIG. 21A illustrates a process of selecting the model information 1460 representing a planar model shape to be the reference, dragging the selected model shape with the mouse 312 to change the size to the model shape represented by model information 1465.

FIG. 21B illustrates a process of selecting the model information 1460 representing the planar model shape to be the reference, setting endpoints 1465*a* and 1465*b* of the resized model shape, and resizing the model shape to the model shape represented by the model information 1465 having the endpoints 1465*a* and 1465*b*.

FIG. 21C illustrates a process of selecting the model information 1460 representing the planar model shape to be the reference, inputting the size after the resizing to a size entry field 1470, and resizing the model shape to the model shape represented by the model information 1465 having the input size.

In FIGS. 21A to 21C, the size is changed with reference to the upper side of the model shape, but the size may be changed with reference to any portion of the model shape.

FIGS. 22A, 22B, and 22C are diagrams each illustrating a model resizing process for to a curved surface or a combination of curved surfaces, according to the present embodiment.

FIG. 22A illustrates a process of selecting the model information 1460 representing the spherical model shape to be the reference, dragging the selected model shape with the mouse 312 to change the size to the model shape represented by model information 1465.

FIG. 22B illustrates a process of selecting the model information 1460 representing the spherical model shape to be the reference, setting the endpoints 1465*a* to 1465*d* of the resized model shape, and resizing the model shape to the model shape represented by the model information 1465 having the endpoints 1465*a* to 1465*d*.

FIG. 22C illustrates a process of selecting the model information 1460 representing the spherical model shape to be the reference, inputting the radius after the resizing to the size entry field 1470, and resizing the model shape to the model shape represented by the model information 1465 having the input radius.

In FIGS. 22A to 22C, the size is changed with reference to the center of the model shape, but the size may be changed with reference to any portion of the model shape.

Figure 23A:
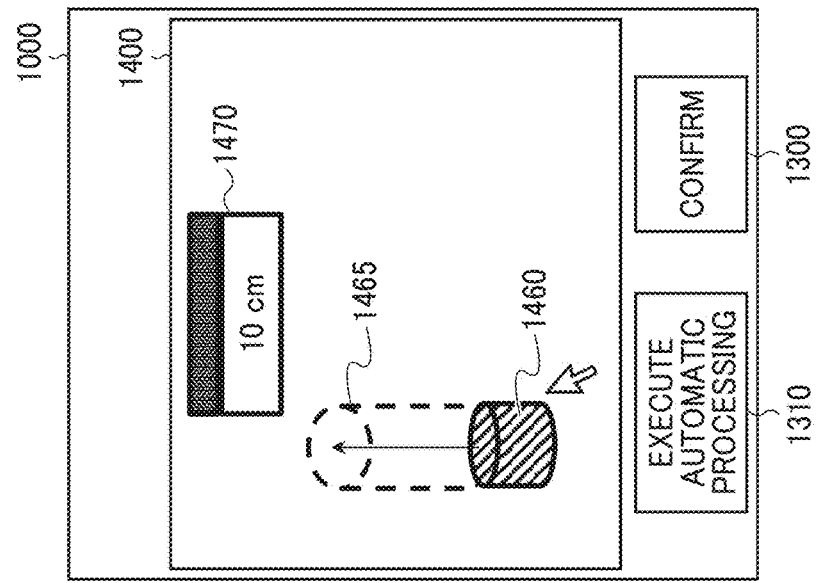
FIGS. 23A, 23B, and 23C are diagrams each illustrating a model resizing process for a combination of a flat surface and a curved surface, according to an embodiment of the present disclosure.
Figure 23B:
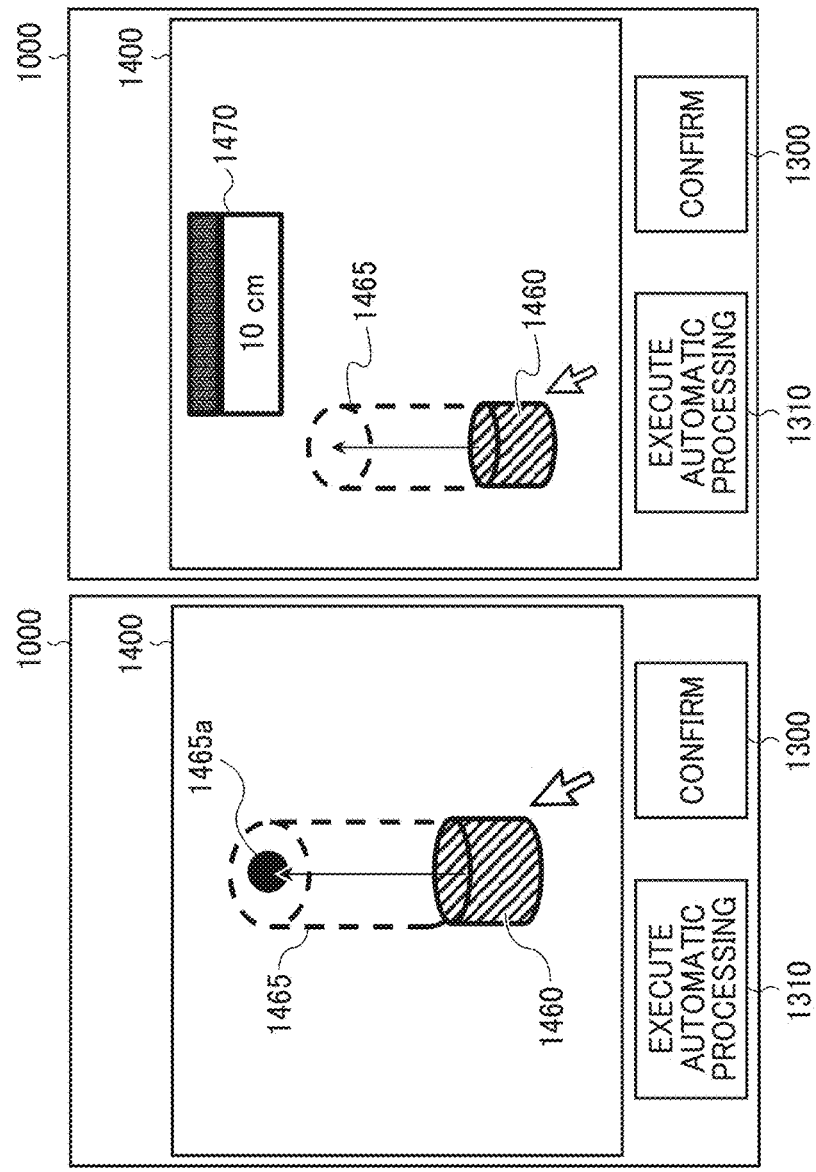
Figure 23C:
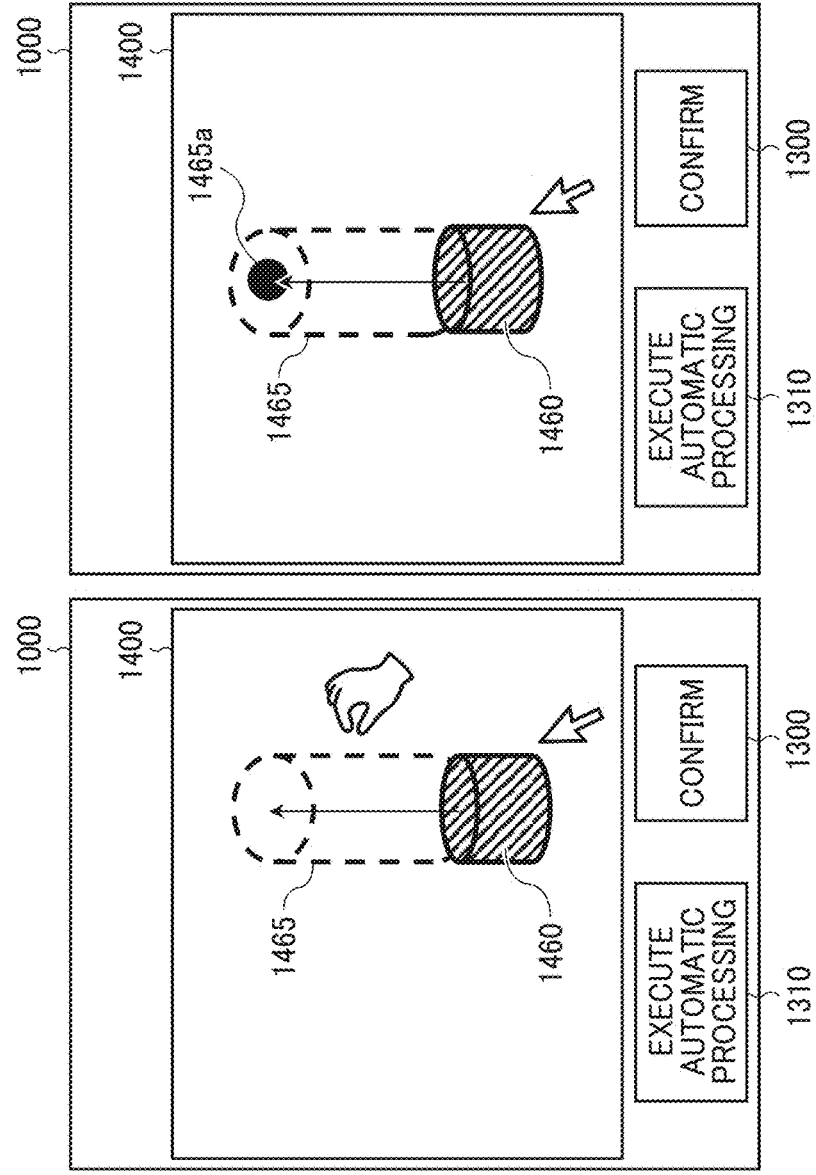

FIGS. 23A, 23B, and 23C are diagrams each illustrating a model resizing process for a combination of a flat surface and a curved surface, according to the present embodiment.

FIG. 23A illustrates a process of selecting the model information 1460 representing the columnar model shape to be the reference, dragging the selected model shape with the mouse 312 to change the size to the model shape represented by model information 1465.

FIG. 23B illustrates a process of selecting the model information 1460 representing the columnar model shape to be the reference, setting the endpoint 1465*a* of the resized model shape, and resizing the model shape to the model shape represented by the model information 1465 having the endpoint 1465*a*.

FIG. 23C illustrates a process of selecting the model information 1460 representing the columnar model shape to be the reference, inputting a size after the resizing to the size entry field 1470, and resizing the model shape to the model shape represented by the model information 1465 having the input size.

In FIGS. 23A to 23C, the size is changed with reference to the upper side and the center of the model shape, but the size may be changed with reference to any portion of the model shape.

Figure 24B:
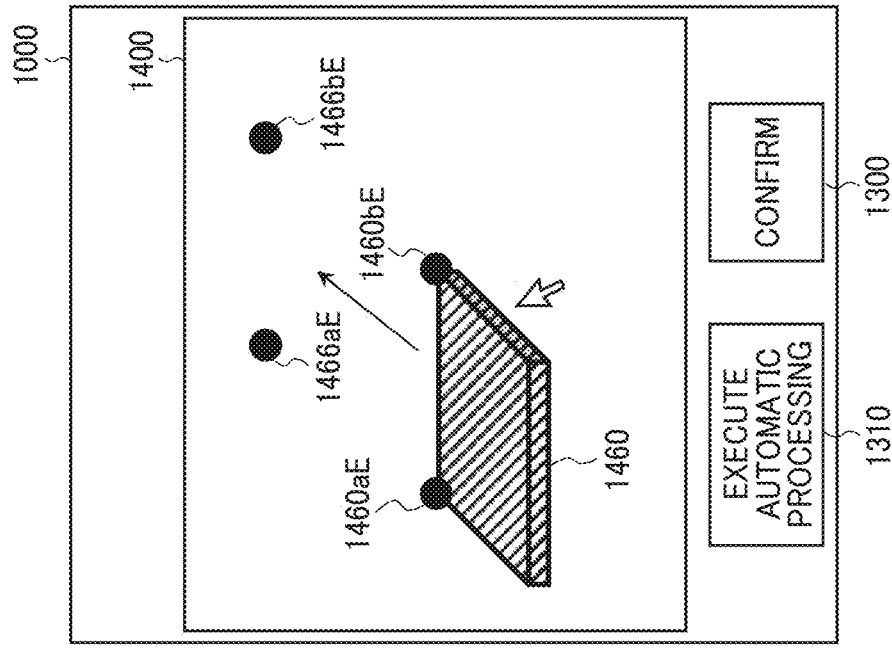
FIGS. 24A and 24B are diagrams each illustrating a model moving process for a flat surface or a combination of flat surfaces, according to an embodiment of the present disclosure.
Figure 24A:
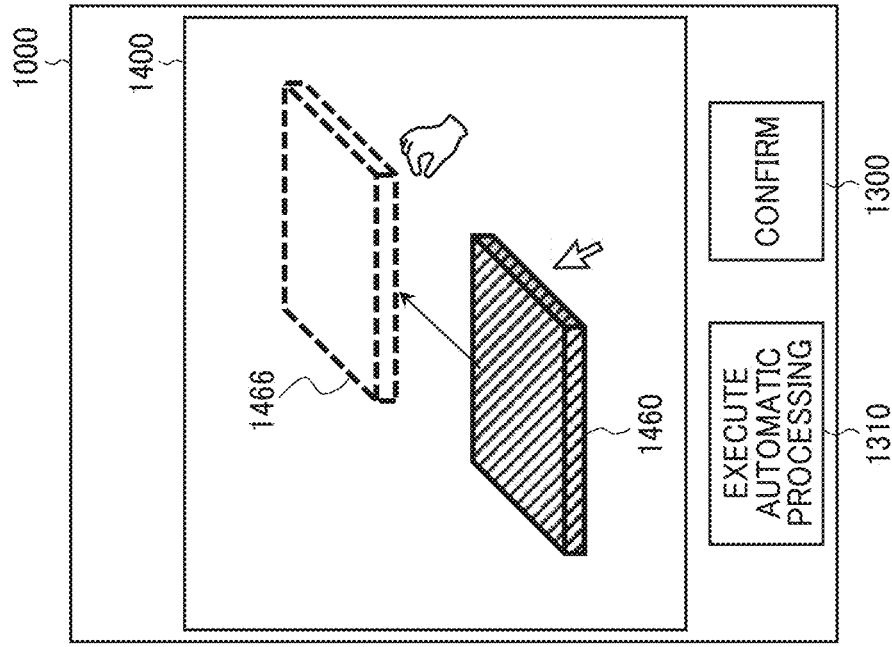

FIGS. 24A and 24B are diagrams each illustrating a model moving process for a flat surface or a combination of flat surfaces, according to the present embodiment.

For the model moving process illustrated in FIGS. 24A to 26C, the following two patterns of correction are exemplified.

1. Model Moving Using a Mouse

A model shape to be the reference is selected, and the mouse 312*a* is dragged from the selected model shape to move the model shape.

2. Model Moving Using Endpoint Setting

A model shape to be the reference is selected, and the endpoints of the moved model shape starting from the selected model shape are set. The model shape is automatically moved such that the endpoints of the reference model shape match the set endpoints.

FIG. 24A illustrates a process of selecting the model information 1460 representing a planar model shape to be the reference, dragging the selected model shape with the mouse 312 to the position of the moved model shape represented by model information 1466. The method of moving may be any of free moving, normal direction moving, and vertical and lateral moving.

FIG. 24B illustrates a process of selecting the model information 1460 representing the planar model shape to be the reference, setting endpoints 1460*a*E and 1460*b*E of the model shape before moving and endpoints 1466*a*E and 1466*b*E of the model shape after moving, and moving the model shape to the position of the model shape represented by the model information 1466 having the endpoints 1466*a*E and 1466*b*E. In FIGS. 24B, the movement is made with reference to the upper side of the model shape, but the reference of the movement may be any portion of the model shape.

Figure 25B:
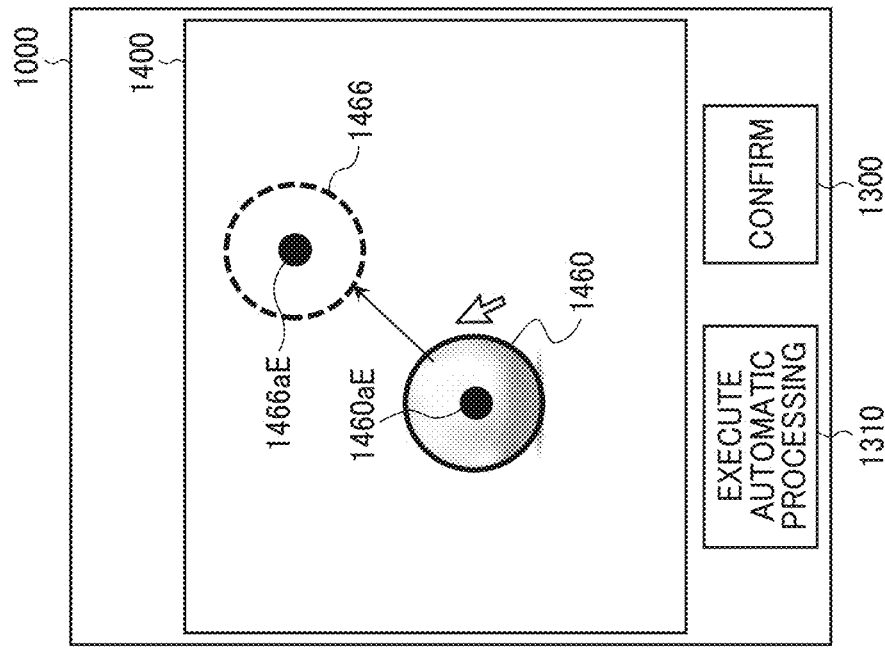
FIGS. 25A and 25B are diagrams each illustrating a model moving process for a curved surface or a combination of curved surfaces, according to an embodiment of the present disclosure.
Figure 25A:
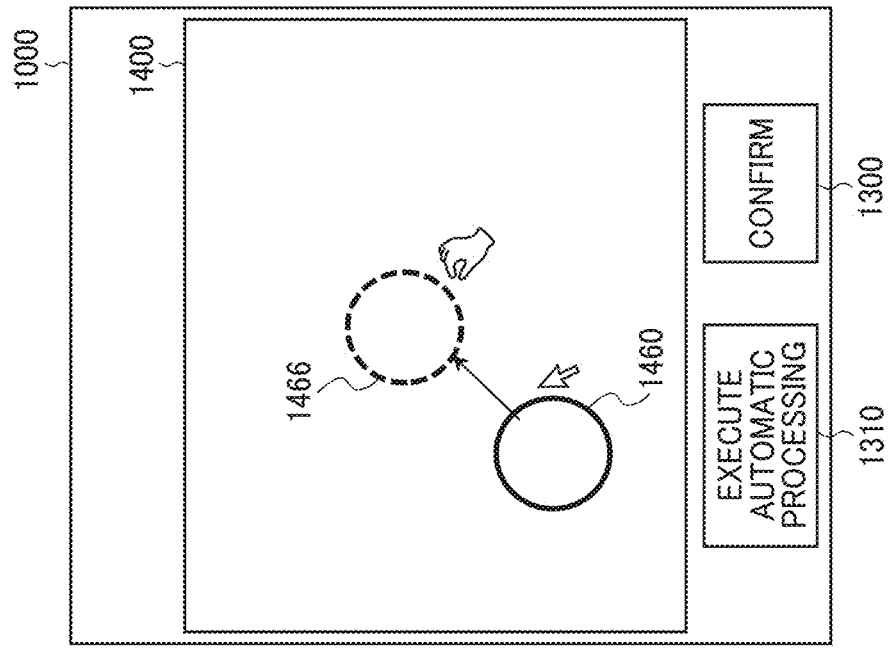

FIGS. 25A and 25B are diagrams each illustrating a model moving process for a curved surface or a combination of curved surfaces, according to the present embodiment.

FIG. 25A illustrates a process of selecting the model information 1460 representing a spherical model shape to be the reference, dragging the selected model shape with the mouse 312 to the position of the moved model shape represented by model information 1466. The method of moving may be any of free moving, normal direction moving, and vertical and lateral moving.

FIG. 25B illustrates a process of selecting the model information 1460 representing the spherical model shape to be the reference, setting the endpoint 1460*a*E of the model shape before moving and the endpoint 1466*a*E of the model shape after moving, and moving the model shape to the position of the model shape represented by the model information 1466 having the endpoint 1466*a*E. In FIGS. 24B, the movement is made with reference to the center of the model shape, but the reference of the movement may be any portion of the model shape.

Figure 26A:
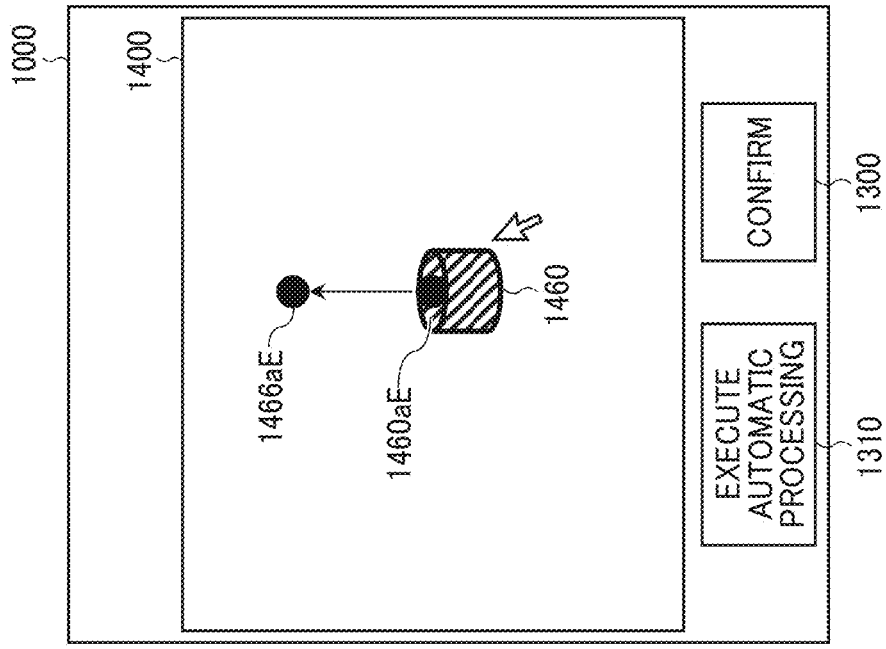
FIGS. 26A and 26B are diagrams each illustrating a model moving process for a combination of a flat surface and a curved surface, according to an embodiment of the present disclosure.
Figure 26B:
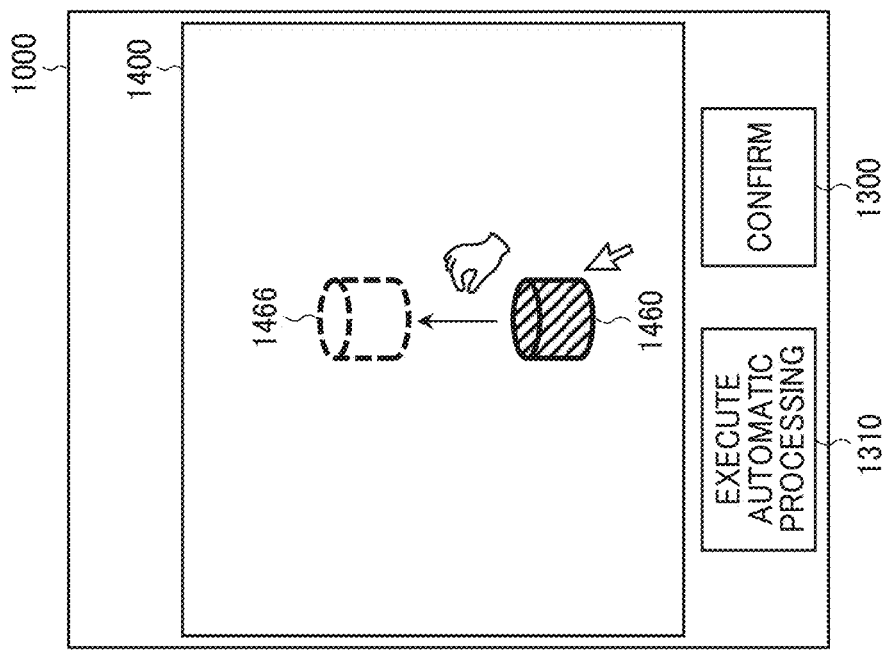

FIGS. 26A and 26B are diagrams each illustrating a model moving process for a combination of a flat surface and a curved surface, according to the present embodiment.

FIG. 26A illustrates a process of selecting the model information 1460 representing a columnar model shape to be the reference, dragging the selected model shape with the mouse 312 to the position of the moved model shape represented by model information 1466. The method of moving may be any of free moving, normal direction moving, and vertical and lateral moving.

FIG. 26B illustrates a process of selecting the model information 1460 representing the columnar model shape to be the reference, setting the endpoint 1460*a*E of the model shape before moving and the endpoint 1466*a*E of the model shape after moving, and moving the model shape to the position of the model shape represented by the model information 1466 having the endpoint 1466*a*E. In FIGS. 26B, the movement is made with reference to the upper side and the center of the model shape, but the reference of the movement may be any portion of the model shape.

Figure 27B:
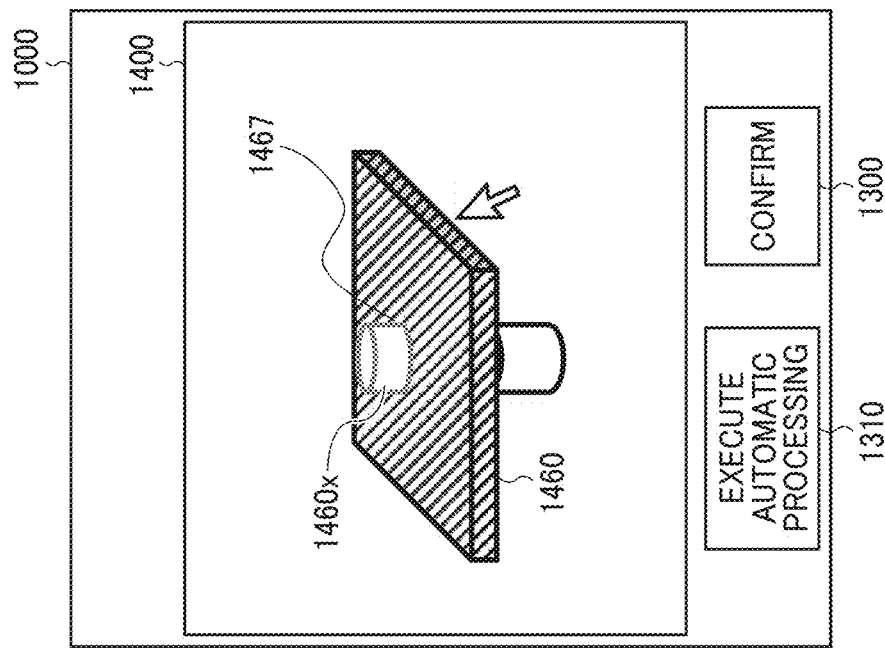
FIGS. 27A and 27B are diagrams each illustrating a model deletion process for a flat surface or a combination of flat surfaces, according to an embodiment of the present disclosure.
Figure 27A:
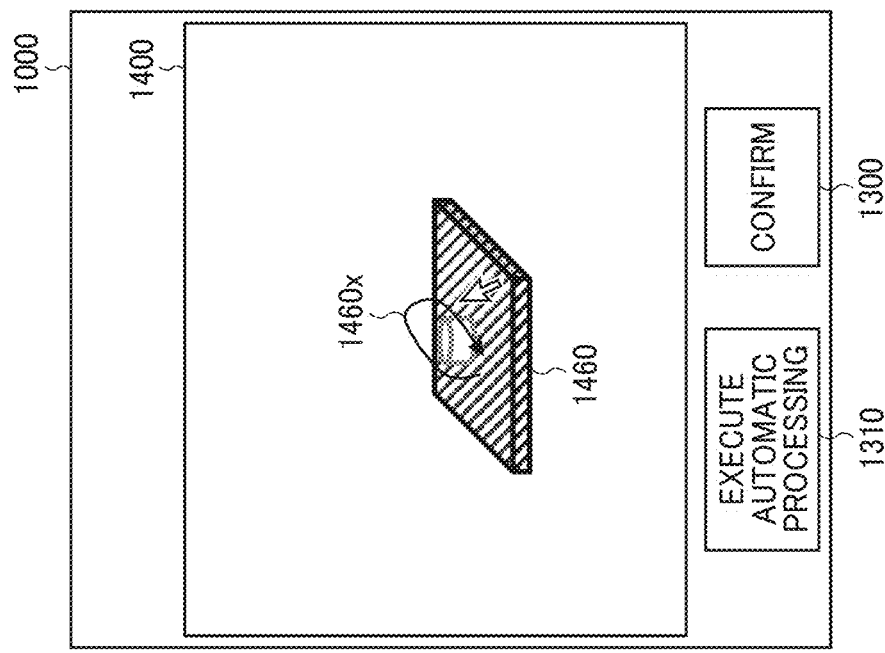

FIGS. 27A and 27B are diagrams each illustrating a model deletion process for a flat surface or a combination of flat surfaces, according to the present embodiment.

For the model deletion processes illustrated in FIGS. 27A to 29B, the following two patterns of correction are exemplified.

1. Deletion Using a Mouse

A model shape to be the reference is selected, and the mouse 312a is dragged from the selected model shape to delete a model shape located in an encircled region.

2. Deletion Using Intersection Between Models

A model shape to be a reference is selected, a model shape intersecting with the selected model shape is detected starting from the selected model shape, and the intersecting model shapes are divided at the intersection. Subsequently, the model shape to be deleted after the division is selected, and the model shape is deleted.

FIG. 27A illustrates a process of selecting the model information 1460 representing a planar model shape to be the reference and deleting a region 1460x (portion to be deleted) encircled by the mouse 312.

FIG. 27B illustrates a process of selecting the model information 1460 representing the planar model shape to be the reference, dividing the model shape intersecting with the reference model shape at an intersection 1467, selecting one of the divided model shapes as the region 1460x to be deleted, and deleting the region 1460x.

Figure 28A:
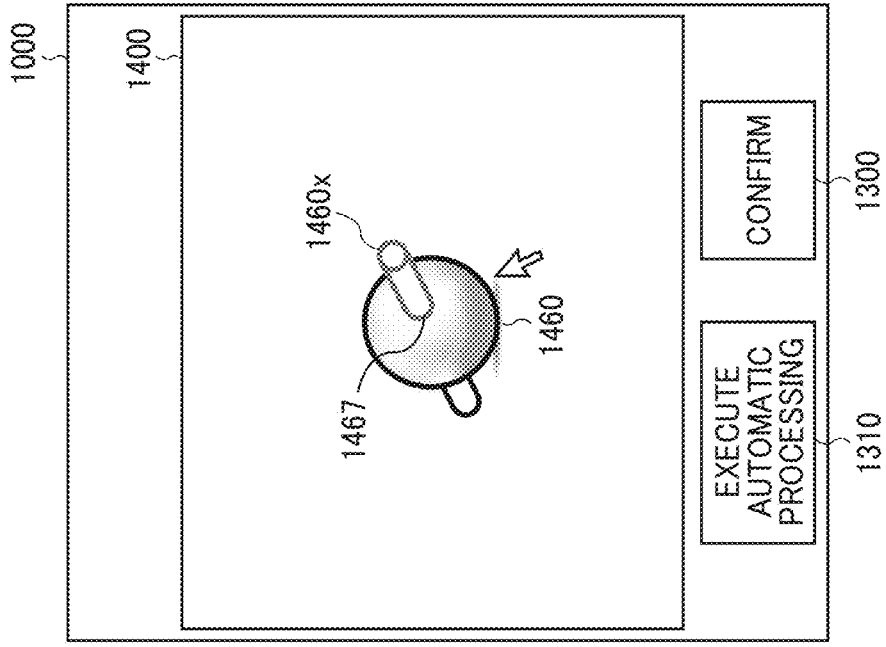
FIGS. 28A and 28B are diagrams each illustrating a model deletion process for a curved surface or a combination of curved surfaces, according to an embodiment of the present disclosure.
Figure 28B:
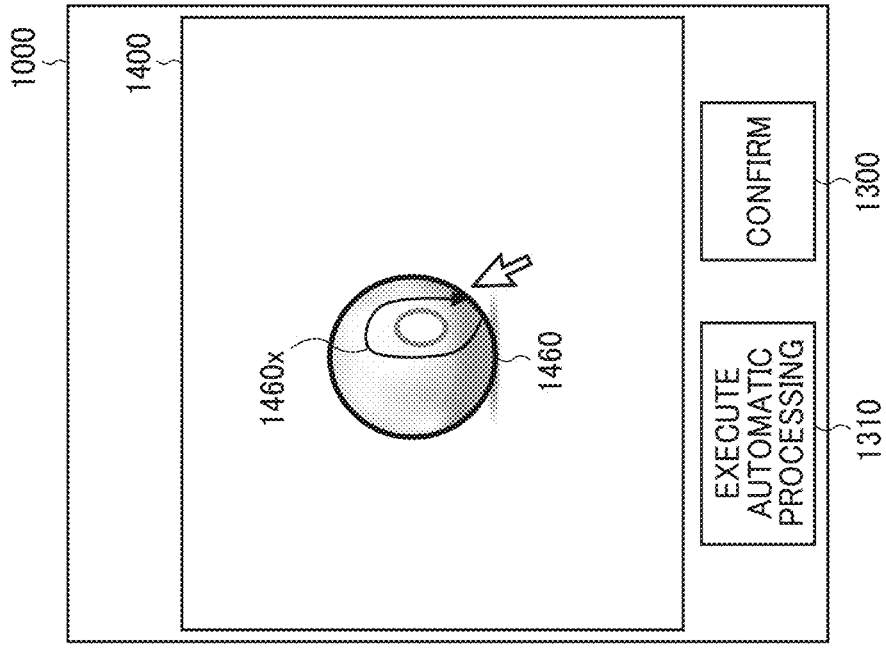

FIGS. 28A and 28B are diagrams each illustrating a model deletion process for a curved surface or a combination of curved surfaces, according to the present embodiment.

FIG. 28A illustrates a process of selecting the model information 1460 representing a spherical model shape to be the reference and deleting the region 1460x (portion to be deleted) encircled by the mouse 312.

FIG. 28B illustrates a process of selecting the model information 1460 representing the spherical model shape to be the reference, dividing the model shape intersecting with the reference model shape at an intersection 1467, selecting one of the divided model shapes as the region 1460x to be deleted, and deleting the region 1460x.

Figure 29A:
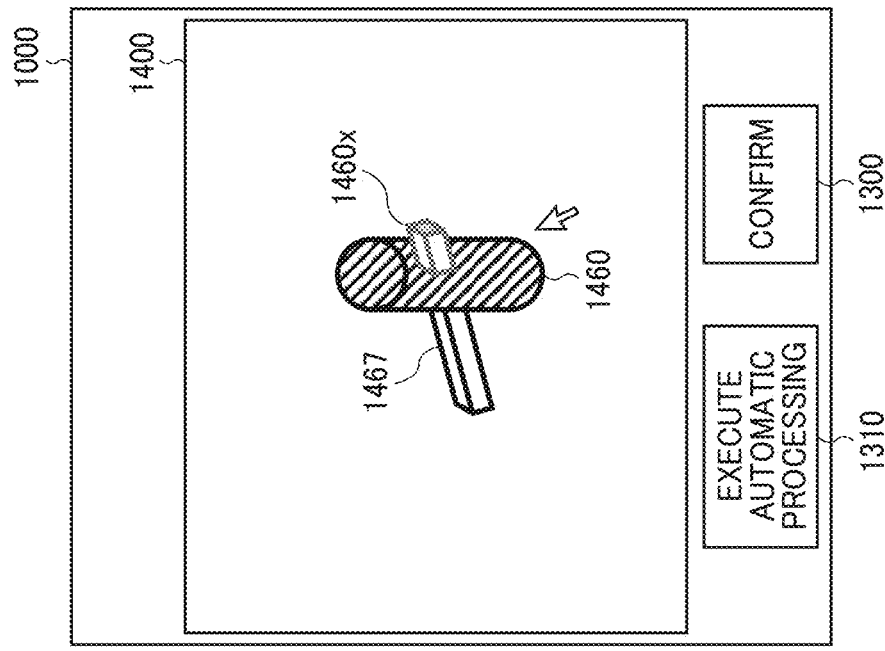
FIGS. 29A and 29B are diagrams each illustrating a model deletion process for a combination of a flat surface and a curved surface, according to an embodiment of the present disclosure.
Figure 29B:
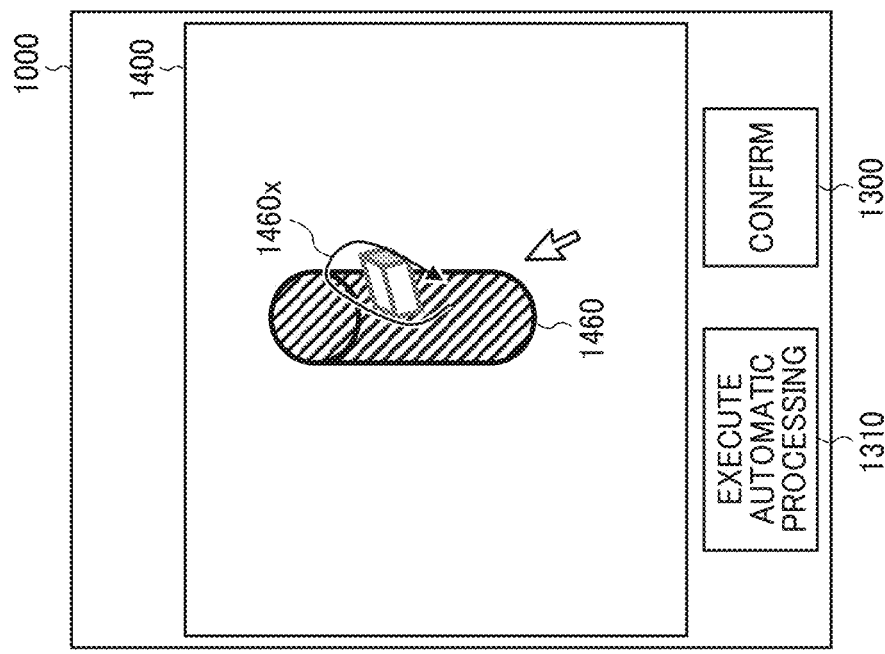

FIGS. 29A and 29B are diagrams each illustrating a model deletion process for a combination of a flat surface and a curved surface, according to the present embodiment.

FIG. 29A illustrates a process of selecting the model information 1460 representing a columnar model shape to be the reference and deleting the region 1460x (portion to be deleted) encircled by the mouse 312.

FIG. 29B illustrates a process of selecting the model information 1460 representing the columnar model shape to be the reference, dividing the model shape intersecting with the reference model shape at an intersection 1467, selecting one of the divided model shapes as the region 1460x to be deleted, and deleting the region 1460x.

FIGS. 30A to 30C are diagrams each illustrating a model position alignment process according to the present embodiment.

The various correction processes described with reference to FIGS. 18A to 29B, can be executed together with or in addition to the modeling process described in FIG. 13. However, it may be difficult to correct the model shape in consideration of the relative positions of two or more model shapes before the modeling process described in FIG. 13.

The correction in consideration of the relative positions of two or more model shapes is roughly classified into the model position alignment, model unification, and model separation processes.

The model position alignment process includes corner matching between model shapes arranged at different angles and orientations, surface matching between model shapes, and size matching between model shapes.

The corner matching between model shapes arranged at different angles and orientations is a correction method of eliminating the discontinuity between the model shapes. For example, the relation between a wall and a ceiling in a space is considered. In a case where a model shape is generated from a point cloud, it is possible that one object is modeled as multiple separate objects due to the influence of dispersion of the point cloud and noise and the model shapes of the wall and the ceiling are modeled at erroneous positions.

In the corner matching between the model shapes, such separated model shapes are corrected to be continuous. A conceivable correction method includes selecting multiple model shapes to be subjected to corner matching and automatically moving or resizing (e.g., extending or shortening) the model shapes until the model shapes intersect each other.

Another conceivable method includes two-dimensionally projecting model shapes in a certain direction and aligning the model shapes in a similar manner based on projection information. For example, the ceiling is excluded and a two-dimensional overhead view of the remaining model shapes is generated. Then, the model shapes of discontinuous walls may be extended until the model shapes intersect with each other and be connected in the manner similar to the above-described manner.

In an overhead view, model shapes are depicted as lines. The two-dimensional conversion can be performed from various angles, for example, by removing the floor surface or a certain wall surface that is a side surface. Performing the processing from multiple angles in this way can eliminate the discontinuity in all directions.

After the discontinuity between the model shapes is eliminated, the angle between the intersecting model shapes may be adjusted to a predetermined angle. For example, since walls and the ceiling intersect at 90 degrees in typical spaces, the model shapes of the ceiling, the walls, and the floor from which the discontinuity has been eliminated may be corrected to intersect at 90 degrees. Such correction can be automatically performed by inputting a numerical value as an option.

The surface matching between model shapes is a correction method of connecting predetermined surfaces of the model shapes. For example, in the case of piping in a space, it is possible that one pipe is erroneously modeled as two pipes due to an acquisition error of a point cloud.

In the surface matching between model shapes for this case, the designated surfaces of the model shapes are automatically aligned to be connected to each other. Further, when the connected model shapes are different in size, the size of other model shapes may be adjusted to the size of the reference model shape. For example, a method of automatically adjusting the radius of a column to the radius of the reference model shape is known.

The size matching between the model shapes is a method of correcting the model shapes such that their sizes match with each other. For example, consider two planar members present in a space and having the same thickness. In this case, the model of one of the planar members has a different thickness, the model can be automatically adjusted to the other model having the correct thickness, thereby correcting the thickness.

FIG. 30A is a diagram illustrating the corner matching process between model shapes according to the present embodiment. FIG. 30A illustrates a process of selecting the model information 1460A and 1460B representing two planar model shapes to be the references, and manually or automatically resizing the selected two model shapes to be the model shapes intersecting with each other, represented by the model information 1465A and 1465B. When the two model shapes represented by the model information 1465 and 1465 intersect, the relative angle between these model shapes is corrected to, for example, 90 degrees.

FIG. 30B is a diagram illustrating the surface matching process between model shapes according to the present embodiment. FIG. 30B illustrates a process of selecting the model information 1460A and 1460B representing two columnar model shapes to be the references, setting respective surfaces 1460Ac and 1460Bc of the model shapes to be mated, and moving one or both of the two model shapes to overlap the surface 1460Ac with the surface 1460Bc.

FIG. 30C is a diagram illustrating the size matching process between the model shapes according to the present embodiment. FIG. 30C illustrates a process of selecting the model information 1460A and 1460B representing two planar model shapes to be the references, selecting their respective reference surfaces 1460Ad and 1460Bd of the model shapes, and resizing the reference surface 1460Bd to match the size of the reference surface 1460Ad.

Figure 31C:
FIGS. 31A to 31C are diagrams each illustrating a model unification/separation process according to an embodiment of the present disclosure.
Figure 31B:
Figure 31A:

FIGS. 31A to 31C are diagrams each illustrating a model unification/separation process according to the present embodiment.

The model unification process is a correction method of unifying multiple model shapes into one model shape.

As described above, when a part of the point cloud is missing, it is possible that one object is modeled as two or more divided model shapes.

In the model unification process, such model shapes are corrected to be unified. Conceivable unification methods are a method of modeling such model shapes by a circumscribed rectangle including the multiple model shapes and a method of simply unifying the multiple model shapes into one. Further, a method of unifying only an overlapping region of the model shapes is conceivable.

The model separation process is a process reverse to the model unification process and is a correction method of dividing one model shape into multiple model shapes. For example, consider a case of one model shape erroneously generated from multiple small objects. In this case, designating a surface to be separated by a slice to divide one model shape into two or more model shapes is conceivable, and separating the model shape into a more complicated shapes using a free curve is also conceivable.

FIG. 31A is a diagram illustrating the model unification process according to the present embodiment. FIG. 31A illustrates a process of selecting the model information 1460A and 1460B representing two model shapes to be the references, and unifying the two model shapes while maintaining the original shapes.

FIG. 31B is a diagram illustrating the model unification process according to the present embodiment. FIG. 31B illustrates a process of selecting the model information 1460A and 1460B representing the two model shapes to be the references, supplementing missing portions 1468A and 1468B of the two model shapes based on a circumscribed rectangle including the two model shapes.

FIG. 31C is a diagram illustrating the model separation process according to the present embodiment. FIG. 31aC illustrates a process of selecting the model information 1460 representing the model shape to be the reference, positioning a separation surface 1460e, and separating the model shape with the separation surface 1460e. The separation surface 1460e may be set as a line connecting multiple endpoints.

FIGS. 32A and 32B are diagrams each illustrating an operation screen in the 3D shape correction processing according to the present embodiment.

The display control unit 34 of the communication terminal 3 further displays a point-cloud display screen 1500 and the image information display screen 1600 on the display screen 1000 illustrated in FIGS. 18A to 31C.

In the following description, for a certain object, information including only model information and point-cloud information is referred to as single-modal information, and information including image information in addition to the model information and the point-cloud information is referred to as multimodal information.

In this disclosure, a description is given of the use of image information and point-cloud information as multimodal information in the model change, deletion, and addition processes.

The change process is a process of changing a model having an incorrect shape to a model having a correct shape.

For example, if data points of multiple columnar pipes in a scene are arranged in prismatic shapes, the pipes are erroneously modeled as prisms. In this case, although the correctness cannot be determined only by the point-cloud information, whether the objects are columnar or prismatic can be determined by referring to the image information. As a result, incorrect models can be replaced with correct models by referring to the modeling result and the image information. In this case, conceivably, an existing model is deleted, a new model is added, or the model is clicked and replaced with another model selected from the menu.

The deletion process is a process of deleting a model generated in an area where the model should not be generated. For example, when there are many noise point clouds, the noise point clouds may be regarded as forming an object and are erroneously modeled. In this case, as in the change process, since the absence of an object can be determined by referring to the image information and the point-cloud information can be determined to be noise, the model can be deleted.

The addition process is a process of adding a model to a vacant region in which the model should be present. When the acquisition of the point cloud fails due to, for example, occlusion, a model may be missing in the region. In this case, as in the above-described case, since the acquisition error of point cloud can be determined by referring to the image information, a model of the missing portion can be added.

In this way, when the single-modal information is insufficient to generate a correct model, the correction process using the multimodal information can increase the accuracy of the model generation result by referring to another modal such as the image information. In FIGS. 32A and 32B, the display control unit 34 displays, on the display screen 1000, the operation screen 1400 presenting the model information 1460A, 1460B, and 1460C; the point-cloud display screen 1500 presenting the 3D point clouds 1430A, 1430B, and 1430C respectively used for generating the model information 1460A, 1460B, and 1460C; and the image information display screen 1600 presenting the image information 1660A, 1660B, and 1660C having the coordinates respectively corresponding to the 3D point clouds 1430A, 1430B, and 1430C. The image information 1660A, 1660B, and 1660C also have the coordinates corresponding to the model information 1460A, 1460B, and 1460C, respectively.

Accordingly, the user can efficiently and accurately correct the model information 1460A, 1460B, and 1460C by the various correction processes illustrated in FIGS. 18A to 31C while checking the 3D point clouds 1430A, 1430B, and 1430C and the image information 1660A, 1660B, and 1660C.

To be specific, comparing the image information 1660 with the 3D point cloud 1430 facilitates identifying a missing portion in the point clouds and correcting the missing portion with respect to the model information 1460.

In FIG. 32A, when the user performs an operation of moving the model information 1460A on the operation screen 1400, the display control unit 34 moves the 3D point cloud 1430A displayed on the point-cloud display screen 1500 in conjunction with the user operation and moves the image information 1660A displayed on the image information display screen 1600 in conjunction with the user operation.

This enables the correction of the model information 1460 while viewing the 3D point cloud 1430 and the image information 1660 at the same angle.

By control circuit, in FIG. 32A, even when the user performs an operation of moving the model information 1460A on the operation screen 1400, the display control unit 34 does not move the 3D point cloud 1430A displayed on the point-cloud display screen 1500 in conjunction with the user operation and does not move the image information 1660A displayed on the image information display screen 1600 in conjunction with the user operation.

This enables the correction of the model information 1460 while viewing the 3D point cloud 1430 and the image information 1660 at a different angle.

The display control unit 34 can switch between the display mode illustrated in FIG. 32A and the display mode illustrated in FIG. 32B.

The display control unit 34 may superimpose the 3D point cloud 1430 or the image information 1660 on the model information 1460 or may switch between the 3D point cloud 1430 and the image information 1660 on the operation screen 1400. Further, the display control unit 34 may display only one of the point-cloud display screen 1500 and the image information display screen 1600 together with the operation screen 1400 on the display screen 1000.

The display control unit 34 may display, for example, an overhead view of a space including the model information 1460, a mesh object or a textured mesh object generated based on the 3D point cloud 1430 used to generate the model information 1460, a message indicating the content of processing executed to generate the model information 1460 on the display screen 1000 in association with the model information 1460.

In this case, the various correction processes illustrated in FIGS. 18A to 31C on the model information 1460 can be efficiently and accurately performed while checking, for example, the overhead view, the mesh object, the textured mesh object, and the message.

A description is given below of correction based on the relation of whether objects adjoin (or are in contact with each other) among the attributes. When the adjoining relation of the objects is considered, there are combinations that are impossible. For example, lighting fixtures may adjoin the ceiling, and desks may adjoin the floor. Desks, however, do not adjoin the ceiling. Similarly, windows may adjoin the wall or the ceiling, but windows do not adjoin the floor.

In this way, there are combinations of objects that can be and cannot be adjoin, and the modeling result may be corrected based on such relations.

For example, the following method is conceivable. Possible adjoining relations and impossible adjoining relations are predefined. Then, the attributes between the models in the adjoining relation in the modeling result are referred to, the predefined relation is referred to, and the group of impossible combination of models is highlighted.

The highlighted models are manually corrected.

As described above, even in the same category of flat surface, the relative positions of the floor and the ceiling change, and the type of adjoining objects also changes. Such adjoining relations can be used to correct erroneously modeled models.

First Aspect

As described above, the management server 5 as an example of the 3D shape processing apparatus according to an embodiment of the present disclosure includes the processing unit 53 as an example of the 3D information correction means to correct 3D shape information. The processing unit 53 is executable first correction processing in which the entire, a part, or one of the correction processes of the 3D shape information is executed based on an input operation and second correction processing based on stored processing pre-stored in a memory. The processing unit 53 executes the first correction processing or the second correction processing based on an instruction operation designating the first correction processing or the second correction processing, received on the confirmation button 1300 that is an example of an instruction-receiving screen (or instruction-receiving display component) that receives the instruction operation.

This configuration allows a skilled person to execute the first correction processing to correct desired 3D shape information and allows a non-skilled person to execute the second correction processing to easily correct 3D shape information. This enables the correction of 3D shape information according to the user's level of skill and knowledge. In other words, this configuration allows the user to select a mode for correction processes of 3D shape information and allows the 3D shape processing apparatus to execute the correction processes in the mode selected by the user according to the user's proficiency level.

Second Aspect

In the management server 5 of the first aspect, the processing unit 53 is also an example of the 3D information generation means that generates 3D shape information based on point cloud information representing a 3D point cloud.

Third Aspect

In the first aspect or the second aspect, the communication terminal 3 in which the functions of the management server 5 are integrated includes the operation reception unit 32 that receives the instruction operation on the confirmation button 1300.

Fourth Aspect

The management server 5 of the first aspect or the second aspect further includes a transmission and reception unit 51 that is an example of the transmission means that transmits instruction-receiving screen information to the communication terminal 3 that communicates with the management server 5. The instruction-receiving screen information is used for displaying the confirmation button 1300.

This configuration enables the management server 5 to correct 3D shape information based on the instruction operation designating the first correction processing or the second correction processing, received by the communication terminal 3.

Fifth Aspect

In the management server 5 of the fourth aspect, the transmission and reception unit 51 further transmits to the communication terminal 3 operation screen information for displaying the operation screen 1400 to receive the input operation.

This configuration enables the management server 5 to correct 3D shape information based on the input operation received by the communication terminal 3.

Sixth Aspect

The transmission and reception unit 51 further transmits, to the communication terminal 3, display screen information for displaying the point-cloud display screen 1500 that presents the 3D point cloud used for generating the 3D shape. This allows the user to perform various correction processes efficiently and accurately on the 3D shape information while checking the 3D point cloud used to generate the 3D shape.

Seventh Aspect

The transmission and reception unit 51 further transmits to the communication terminal 3 display screen information for displaying the image information display screen 1600 that presents the image information having coordinates corresponding to the 3D shape. This allows the user to perform various correction processes on the 3D shape information efficiently and accurately while checking the image information having the coordinates corresponding to the 3D shape.

Eighth Aspect

In any one of the first aspect to the seventh aspect, the processing unit 53 executes the first correction processing or the second correction processing based on the instruction operation and the setting operation received on the correction-setting screen 2200 for receiving the setting operation for setting the first correction processing or the second correction processing.

This configuration allows a skilled person to set the first correction processing to correct desired 3D shape information and allows a non-skilled person to set the second correction processing to easily correct 3D shape information. This enables the correction of 3D shape information according to the user's level of skill and knowledge.

Ninth Aspect

In the eighth aspect, the transmission and reception unit 51 further transmits, to the communication terminal 3, correction-setting screen information for displaying the correction-setting screen 2200.

This configuration enables the management server 5 to correct 3D shape information based on the setting operation setting the first correction processing or the second correction processing, which is received by the communication terminal 3.

Tenth Aspect

The management server 5 of any one of the first aspect to the ninth aspect further includes the setting unit 57 as an example of a setting means that generates setting information indicating the first correction processing or the second correction processing based on user information received by the operation reception unit 32 serving as a user information reception means to receive the user information. The processing unit 53 performs the first correction processing or the second correction processing based on the instruction operation and the setting information indicating the first correction processing or the second correction processing by the setting unit 57.

As a result, the 3D shape information can be corrected by the first correction processing or the second correction processing to be set based on the user information.

Eleventh Aspect

In any one of the first to tenth aspects, the first correction processing includes executing the correction process based on the operation input without based on the stored process, or executing the correction process based on the operation input and the stored process; and the second correction processing includes executing the correction process based on the stored process without based on the operation input.

This configuration allows a person skilled in all the processes of the correction to perform the processing to correct desired 3D shape information based on the operation input and without being based on the stored processing. This configuration further allows a person skilled in a portion of the correction to selectively use the processing based on the operation input and the processing based on the stored processing depending on which of the processes the person is skilled in. In other words, the 3D shape information can be corrected according to the level of skill and knowledge of the skilled people.

Twelfth Aspect

In any one of the first to eleventh aspects, the processing unit 53 is executable multiple correction processes including model resizing, model moving, model deletion, model position alignment, model unification, and model separation processes for correcting 3D shape information. The processing unit 53 executes the first correction processing or the second correction processing for at least one of the multiple correction processes based on an instruction operation designating the first correction processing or the second correction processing for at least one of the multiple correction processes.

As a result, the multiple correction processes can be executed individually in a suitable manner according to the user's individual level of skill and knowledge of multiple correction processes.

Thirteenth Aspect

In any one of the first to twelfth aspects, the processing unit 53 is executable multiple correction processes including model resizing, model moving, model deletion, model position alignment, model unification, and model separation processes for correcting 3D shape information. The processing unit 53 executes the multiple correction processes in a designated sequence based on the instruction operation and the setting operation received on the sequence number setting boxes 2262, 2263, 2264, and 2265 on the correction-setting screen 2200 that receives the setting operation for designating the sequence of the multiple correction processes.

This configuration allows the skilled person to execute the multiple correction processes in a desired sequence.

Fourteenth Aspect

In the management server 5 of the thirteenth aspect, the processing unit 53 executes the multiple correction processes in the sequence pre-stored in the correction-setting information management DB 5005 and not based on the setting operation.

This configuration allows the non-skilled person to easily perform the multiple correction processes without setting the sequence.

Fifteenth Aspect

The management server 5 of any one of the first aspect to the fourteenth aspect further includes the storing and reading unit 59 as an example of the updating means that updates the stored processing based on history information of the first correction processing executed by the processing unit 53.

As a result, the stored processing is updated based on the history of input operation of the skilled person, and the accuracy of subsequent 3D shape correction in the second correction processing executed by the non-skilled person increases.

Sixteenth Aspect

The management server 5 of any one of the first aspect to the fifteenth aspect, further includes the storing and reading unit 59 as an example of the storing control means that stores the 3D shape information in a storage means (or a memory) such as the 3D shape management DB 5004, the medium 506, or the CD-RW 513.

Seventeenth Aspect

In the management server 5 of any one of the first aspect to the sixteenth aspect, the transmission and reception unit 51 transmits the 3D shape information to the communication terminal 3. This allows the 3D shape information to be checked on the communication terminal 3.

Eighteenth Aspect

In any one of the first aspect to the seventeenth aspect, the correction includes multiple processes, and the processing unit 53 executes the first correction processing and the second correction processing based on an instruction operation instructing the first correction processing as a part of the correction and the second correction processing as another part of the correction.

Nineteenth Aspect

A 3D shape processing method according to an embodiment of the present disclosure is a method for correcting a 3D shape information. The method includes transmitting, to the communication terminal 3, display information for displaying the confirmation button 1300 as an example of the instruction-receiving display component that receives an instruction operation designating first correction processing in which entire, a part, or a single process of correction processing of 3D shape information is executed based on an input operation or second correction processing in which entire or part of the correction is executed based on pre-stored processing. The method further includes executing one of the first correction processing and the second correction processing designated by the instruction operation received on the confirmation button 1300.

Twentieth Aspect

A 3D shape processing method according to another embodiment of the present disclosure is a method for correcting a 3D shape information. The method includes receiving an instruction operation designating first correction processing in which the entire, a part, or a single process of correction processing of 3D shape information is executed based on an input operation or second correction processing in which the entire or part of the correction is executed based on pre-stored processing. The method further includes executing one of the first correction processing and the second correction processing designated by the instruction operation.

Twenty First Aspect

A program according to an embodiment of the present disclosure causes a computer to execute the above-described 3D shape processing method of the nineteenth aspect or the twentieth aspect.

Twenty Second Aspect

The 3D shape processing system 1 according to an embodiment of the present disclosure includes the management server 5 that executes correction processing of 3D shape information and the communication terminal 3 that communicate with the management server 5. The management server 5 is executable first correction processing in which the entire, a part, or a single process of the correction of the 3D shape information is executed based on an input operation and second correction processing in which the correction is executed based on stored processing pre-stored in a memory. The management server 5 includes the transmission and reception unit 51 to transmit, to the communication terminal 3, display information for displaying the confirmation button 1300 as an example of the instruction-receiving display component that receives an instruction operation designating the first correction processing or the second correction processing; and 3D information correction means to execute the first correction processing or the second correction processing based on an instruction operation received on the confirmation button 1300. The communication terminal 3 includes the display control unit 34 to display the confirmation button 1300 on the display 308, and the operation reception unit 32 as an example of an operation reception means to receive the instruction operation on the confirmation button 1300.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A three-dimensional shape processing apparatus comprising
    circuitry configured to selectively execute one of first correction processing and second correction processing designated by an instruction operation on an instruction-receiving display component,
        the first correction processing being processing in which correction of three-dimensional shape information is executed based on an input operation,
        the second correction processing being processing in which the correction of the three-dimensional shape information is executed based on stored processing pre-stored in a memory.

2. The three-dimensional shape processing apparatus according to claim 1,
    wherein the circuitry is further configured to generate the three-dimensional shape information based on point-cloud information indicating a three-dimensional point cloud.

3. The three-dimensional shape processing apparatus according to claim 1,
    wherein the circuitry is further configured to receive the instruction operation.

4. The three-dimensional shape processing apparatus according to claim 1,
    wherein the circuitry is further configured to transmit screen information for displaying the instruction-receiving display component to a communication terminal that communicates with the three-dimensional shape processing apparatus.

5. The three-dimensional shape processing apparatus according to claim 4,
    wherein the circuitry is further configured to transmit, to the communication terminal, operation screen information for displaying an operation screen that receives the instruction operation.

6. The three-dimensional shape processing apparatus according to claim 5,
    wherein the circuitry is configured to transmit, to the communication terminal, screen information for displaying a point-cloud display screen on which a three-dimensional point cloud used for generating the three-dimensional shape is displayed.

7. The three-dimensional shape processing apparatus according to claim 5,
    wherein the circuitry is configured to transmit, to the communication terminal, screen information for displaying an image information display screen that presents image information having coordinates corresponding to the three-dimensional shape.

8. The three-dimensional shape processing apparatus according to claim 1,
    wherein the circuitry is configured to execute the one of the first correction processing and the second correction processing based on the instruction operation and a setting operation for setting executing of the first correction processing or the second correction processing, received on a setting screen that receives the setting operation.

9. The three-dimensional shape processing apparatus according to claim 8,
    wherein the circuitry is further configured to transmit screen information for displaying the setting screen to a communication terminal that communicates with the three-dimensional shape processing apparatus.

10. The three-dimensional shape processing apparatus according to claim 1,
    wherein the circuitry is further configured to:
        generate setting information indicating the one of the first correction processing and the second correction processing based on user information; and
        execute the one of the first correction processing and the second correction processing based on the setting information and the instruction operation.

11. The three-dimensional shape processing apparatus according to claim 1,
    wherein the first correction processing includes execution of one of:
        the correction based on the input operation and without being based on the stored processing; and
        the correction based on the input operation and based on the stored processing, and
    wherein the second correction processing includes execution of the correction based on the stored processing without based on the input operation.

12. The three-dimensional shape processing apparatus according to claim 1,
    wherein the circuitry is configured to:
        execute multiple correction processes for correcting the three-dimensional shape information, and
        execute the one of the first correction processing and the second correction processing for at least one of the multiple correction processes based on the instruction operation.

13. The three-dimensional shape processing apparatus according to claim 1,
    wherein the circuitry is configured to execute multiple correction processes for correcting the three-dimensional shape information based on the instruction operation and in a sequence designated by a setting operation on a setting-receiving display component.

14. The three-dimensional shape processing apparatus according to claim 1,
    wherein the circuitry is configured to execute multiple correction processes for correcting the three-dimensional shape information in a sequence pre-stored in the memory.

15. The three-dimensional shape processing apparatus according to claim 1,
wherein the circuitry is further configured to update the stored processing based on history information indicating a history of the input operation based on which the first correction processing has been executed.

16. The three-dimensional shape processing apparatus according to claim 1,
wherein the circuitry is further configured to transmit the three-dimensional shape information to a communication terminal that communicates with the three-dimensional shape processing apparatus.

17. The three-dimensional shape processing apparatus according to claim 1,
wherein the circuitry is configured to:
execute multiple correction processes for correcting the three-dimensional shape; and
based on an instruction operation designating the first correction processing for one part of the multiple correction processes and the second correction processing for another part of the multiple correction processes, execute the first correction processing for the one part of the multiple correction processes and execute the second correction processing for the another part of the multiple correction processes.

18. A three-dimensional shape processing system comprising:
a three-dimensional shape processing apparatus; and
a communication terminal,
the three-dimensional shape processing apparatus including first circuitry configured to transmit, to the communication terminal, screen information for displaying an instruction-receiving display component that receives an instruction operation designating one of first correction processing and second correction processing, the first correction processing being processing in which correction of three-dimensional shape information is executed based on an input operation, the second correction processing being processing in which the correction of the three-dimensional shape information is executed based on stored processing pre-stored in a memory,
the communication terminal including second circuitry configured to:
display the instruction-receiving display component on a display based on the screen information;
receive the instruction operation input to the instruction-receiving display component; and
transmit, to the three-dimensional shape processing apparatus, processing setting information designating the one of the first correction processing and the second correction processing based on the instruction operation,
the first circuitry of the three-dimensional shape processing apparatus being configured to selectively execute one of the first correction processing and the second correction processing designated by the processing setting information.

19. A method for correcting three-dimensional shape information, the method comprising
selectively executing one of first correction processing and second correction processing designated by an instruction operation, the first correction processing being processing in which correction of three-dimensional shape information is executed based on an input operation, the second correction processing being processing in which the correction of the three-dimensional shape information is executed based on stored processing pre-stored in a memory.

20. A non-transitory recording medium storing a plurality of program codes which, when executed by one or more processors, causes the one or more processors to perform a method, the method comprising
selectively executing one of first correction processing and second correction processing designated by an instruction operation, the first correction processing being processing in which correction of three-dimensional shape information is executed based on an input operation, the second correction processing being processing in which the correction is executed based on stored processing pre-stored in a memory.

* * * * *